United States Patent
Anderson et al.

(10) Patent No.: US 7,416,039 B1
(45) Date of Patent: Aug. 26, 2008

(54) REGENERATIVE SELF PROPELLED VEHICLES

(76) Inventors: Donald C. Anderson, 58 Ashbrook Pl., Moraga, CA (US) 94556; Edmund S. Lee, III, 104 Field stone Dr., Terrace Park, OH (US) 45174

( * ) Notice: Subject to any disclaimer, the term of this patent is extended or adjusted under 35 U.S.C. 154(b) by 13 days.

(21) Appl. No.: 10/251,945

(22) Filed: Sep. 20, 2002

(51) Int. Cl.
*B60K 1/00* (2006.01)
*B60K 8/00* (2006.01)

(52) U.S. Cl. ..................... 180/165; 180/65.1
(58) Field of Classification Search ............... 180/165, 180/65.1, 65.3, 65.6, 65.7
See application file for complete search history.

(56) References Cited

U.S. PATENT DOCUMENTS

| | | | | |
|---|---|---|---|---|
| 2,935,899 A * | 5/1960 | Nallinger | ................ | 74/731.1 |
| 3,476,201 A | 11/1969 | Swaine | | |
| 3,493,066 A | 2/1970 | Dooley | | |
| 3,497,026 A | 2/1970 | Calvert | | |
| 3,585,473 A * | 6/1971 | Huxtable et al. | ............ | 318/140 |
| 3,736,188 A * | 5/1973 | Kaye | ................ | 429/99 |
| 3,858,674 A | 1/1975 | Tabor | | |
| 3,882,950 A * | 5/1975 | Strohlein | ................ | 180/165 |
| 3,986,575 A * | 10/1976 | Eggmann | ................ | 180/302 |
| 4,131,171 A * | 12/1978 | Keyes | ................ | 180/54.1 |
| 4,198,878 A * | 4/1980 | Lewis et al. | ................ | 74/572 |
| 4,222,450 A | 9/1980 | Fobbs | | |
| 4,309,620 A | 1/1982 | Bock | | |
| 4,423,794 A | 1/1984 | Beck | | |
| 4,458,156 A | 7/1984 | Maucher et al. | | |
| 4,499,965 A | 2/1985 | Oetting et al. | | |
| 4,588,040 A | 5/1986 | Albright et al. | | |
| 4,591,016 A | 5/1986 | Matthews | | |
| 4,597,463 A * | 7/1986 | Barnard | ................ | 180/165 |
| 4,632,205 A | 12/1986 | Lewis | | |
| 4,680,986 A | 7/1987 | Elsner | | |
| 4,741,410 A | 5/1988 | Tunmore | | |
| 5,081,365 A * | 1/1992 | Field et al. | ................ | 290/45 |
| 5,125,469 A * | 6/1992 | Scott | ................ | 180/65.2 |
| 5,212,026 A * | 5/1993 | Mitchell | ................ | 429/160 |
| 5,244,054 A * | 9/1993 | Parry | ................ | 180/165 |
| 5,332,630 A * | 7/1994 | Hsu | ................ | 429/20 |
| 5,427,194 A * | 6/1995 | Miller | ................ | 180/165 |
| 5,678,647 A * | 10/1997 | Wolfe et al. | ................ | 180/65.3 |
| 5,808,448 A * | 9/1998 | Naito | ................ | 322/13 |
| 5,999,864 A * | 12/1999 | Thiel et al. | ................ | 701/22 |
| 6,175,178 B1 * | 1/2001 | Tupper et al. | ................ | 310/166 |
| 6,242,828 B1 * | 6/2001 | Rose, Sr. | ................ | 310/74 |
| 6,476,529 B1 * | 11/2002 | Tilbor | ................ | 310/74 |

* cited by examiner

Primary Examiner—Frank B Vanaman

(57) ABSTRACT

An electric motor powered vehicle includes an energy reservoir provided by a battery-mass flywheel having a diameter approximately equal to the vehicle lateral wheel spacing, allowing a compact configuration. The flywheel may include a pair of counter rotating wheels mounted on concentric shafts and may be enclosed in a containment device. A shoe-rail electrical connection facilitates transfer of current to and from the batteries. The flywheel may include fuel cells charged from a remote hydrogen source. Flywheel, alternator and friction braking may be controlled by pedal movement. Energy may be transferred to the battery mass flywheel independently of vehicle motor drive. The motor-flywheel drive connections are made through inputs to a differential gear drive. The fuel cells may charge the batteries, and a second alternator may recover flywheel energy at vehicle shut-down.

133 Claims, 19 Drawing Sheets

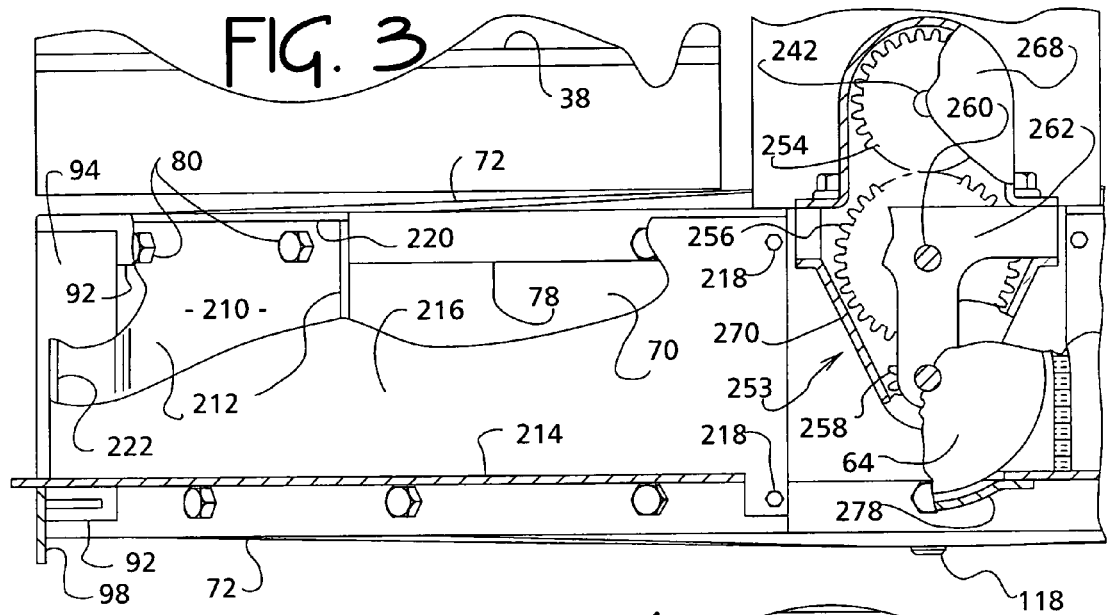
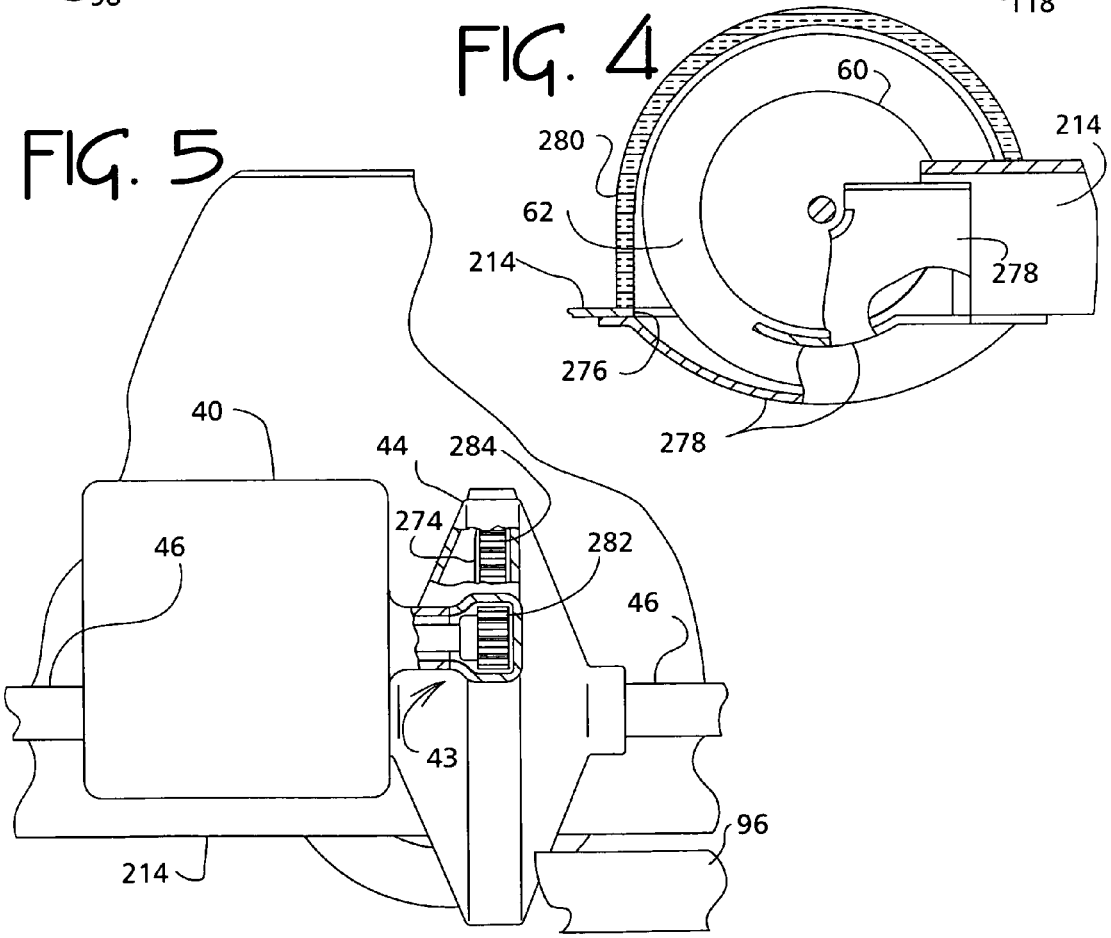

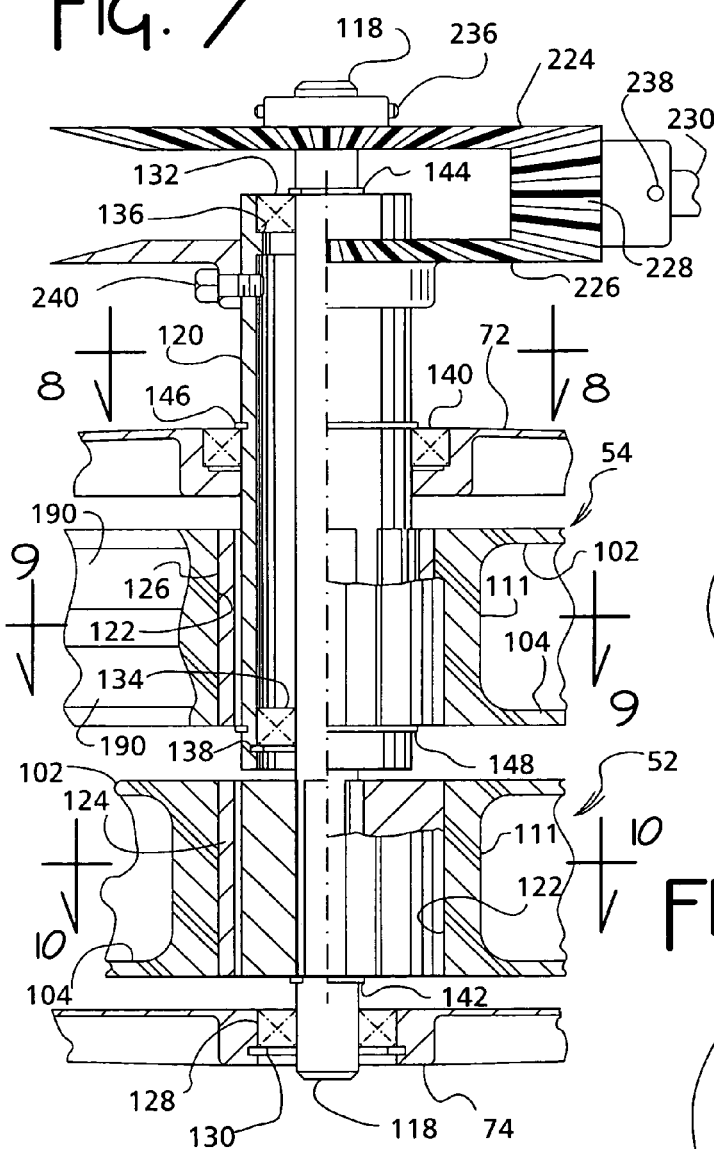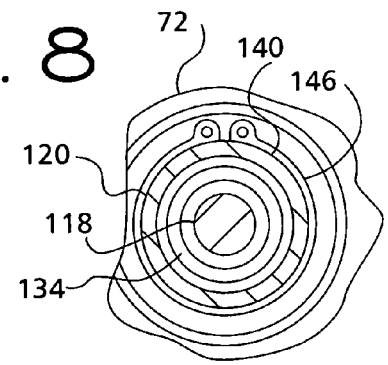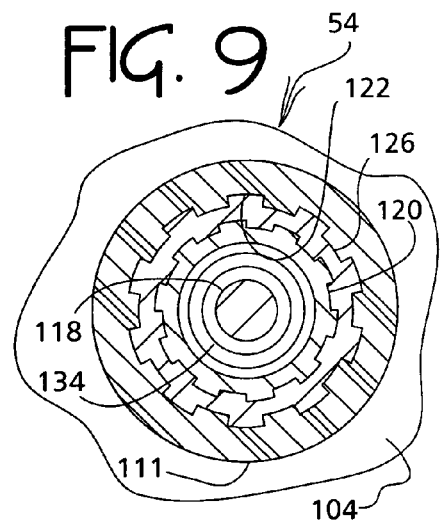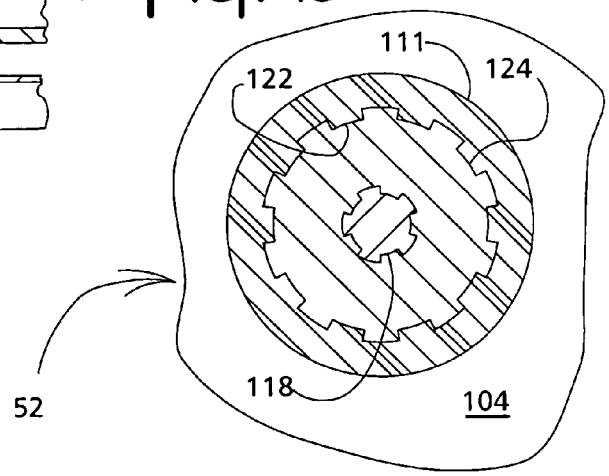

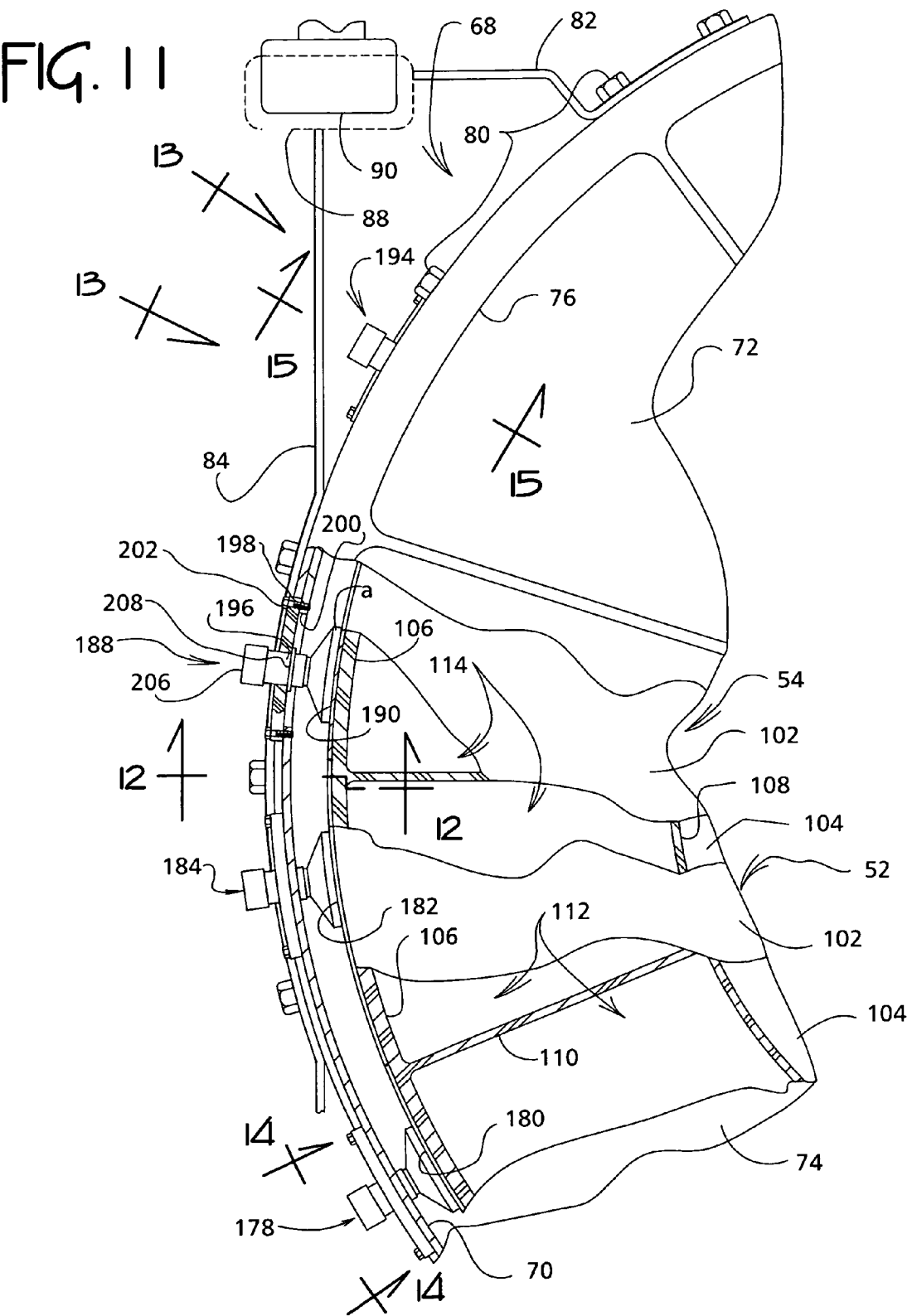

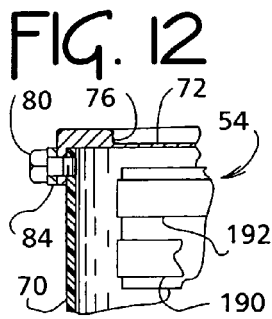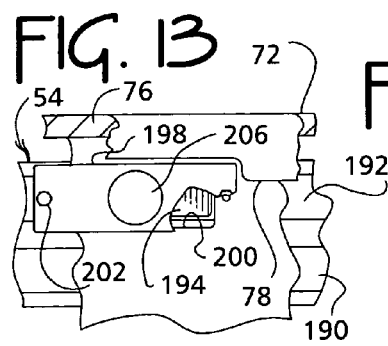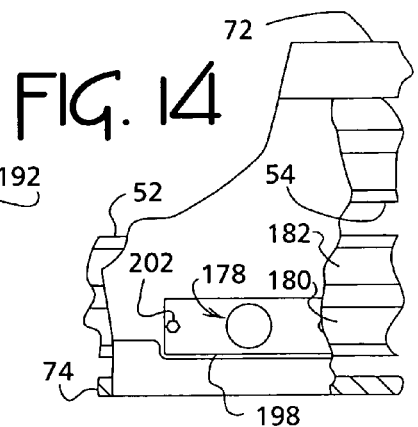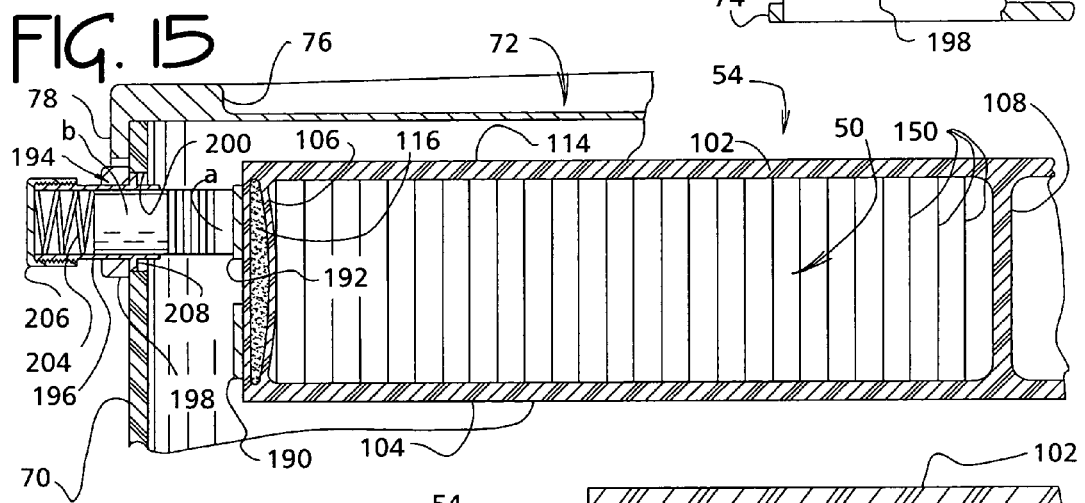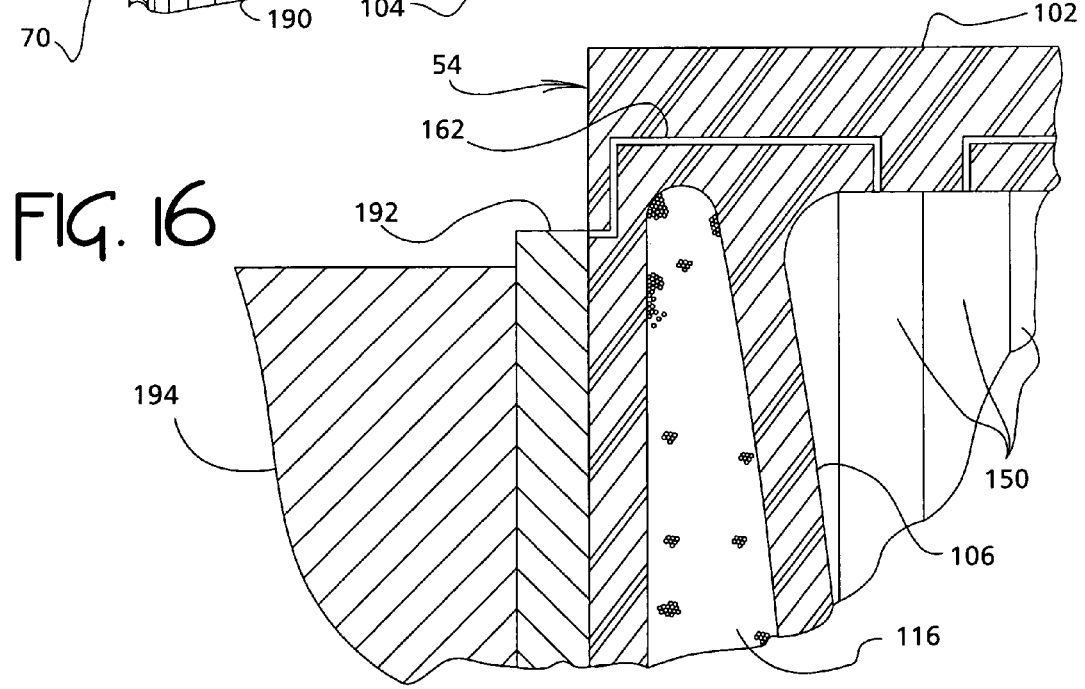

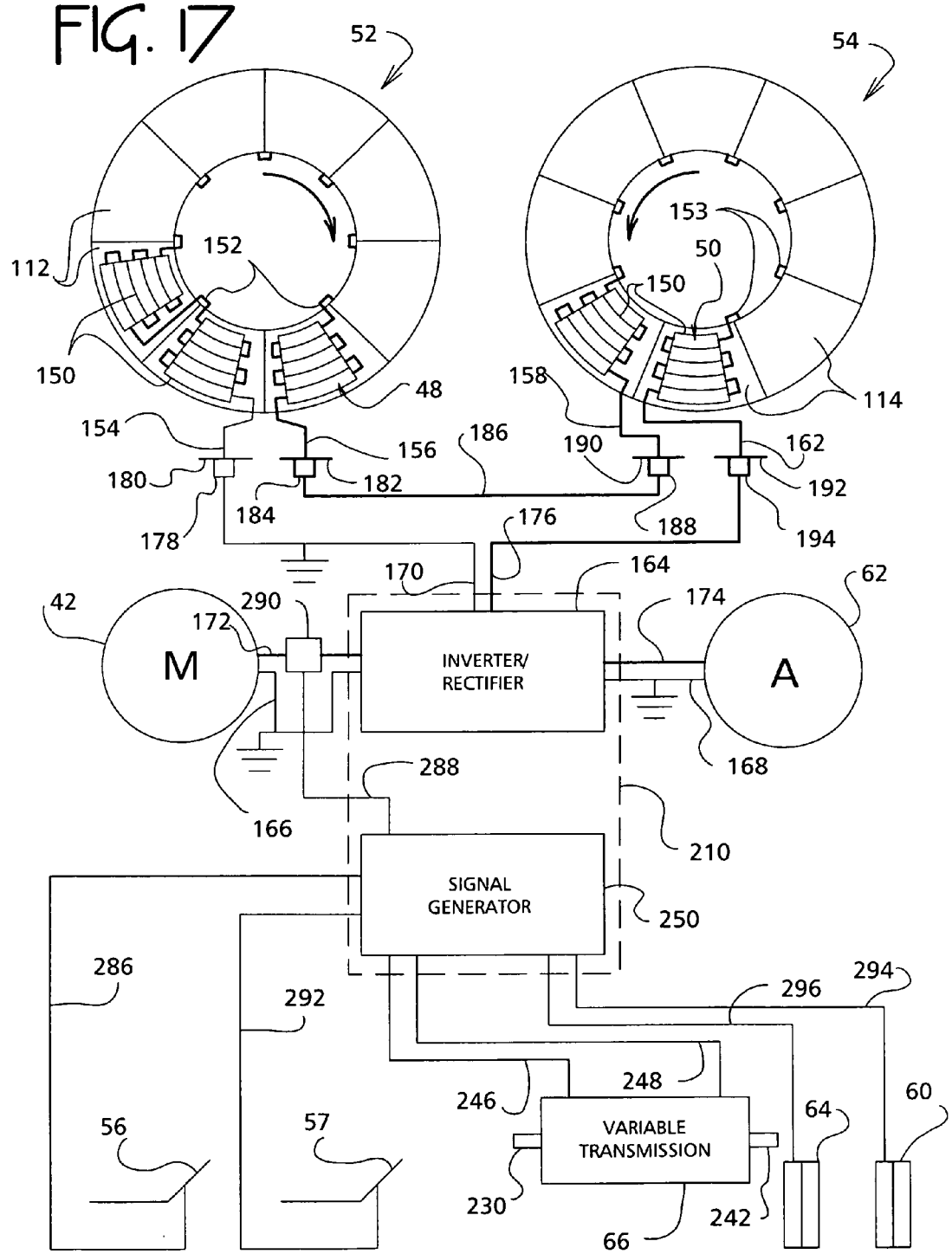

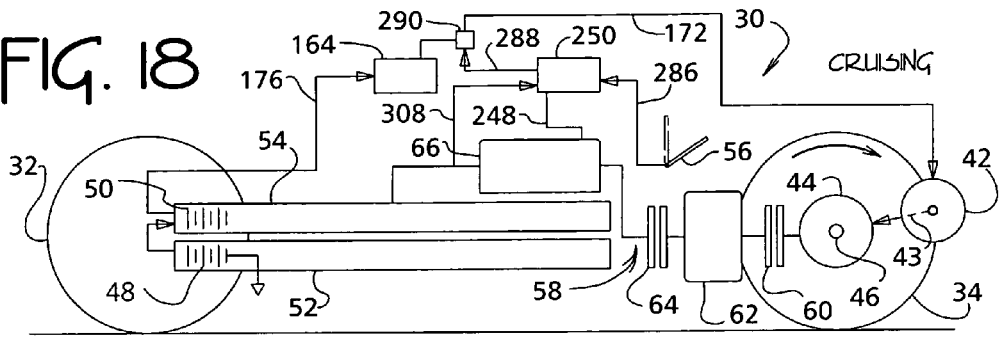
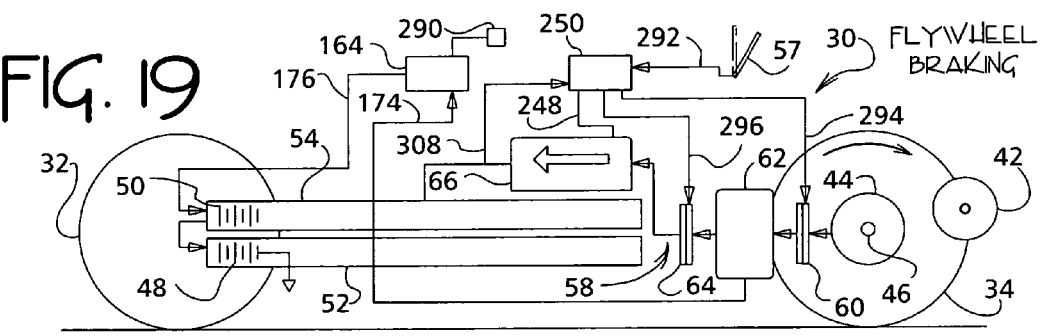
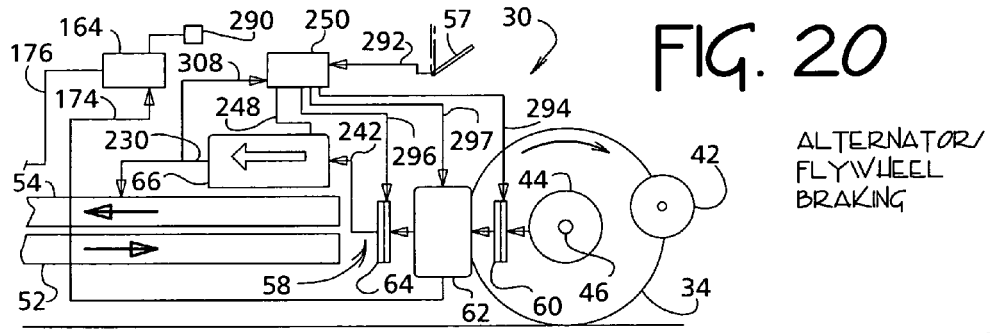
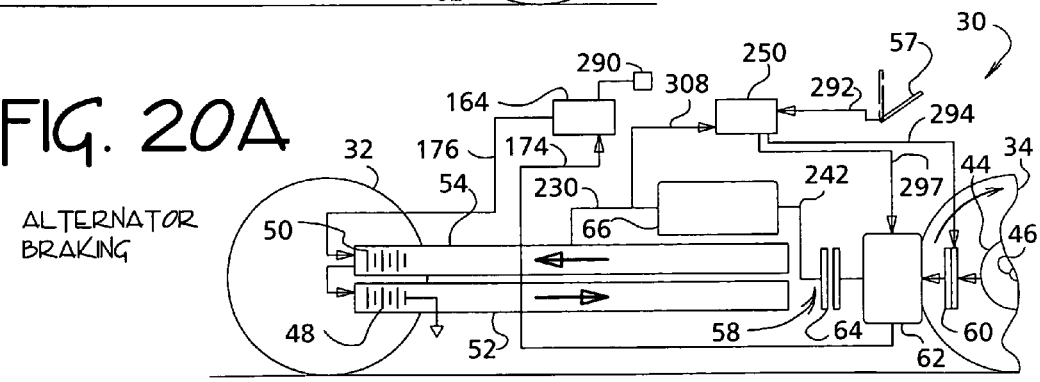

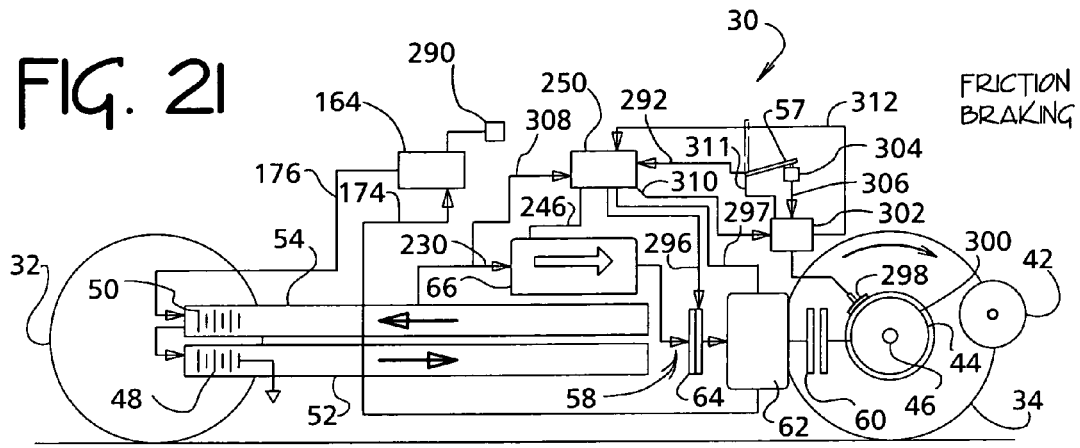
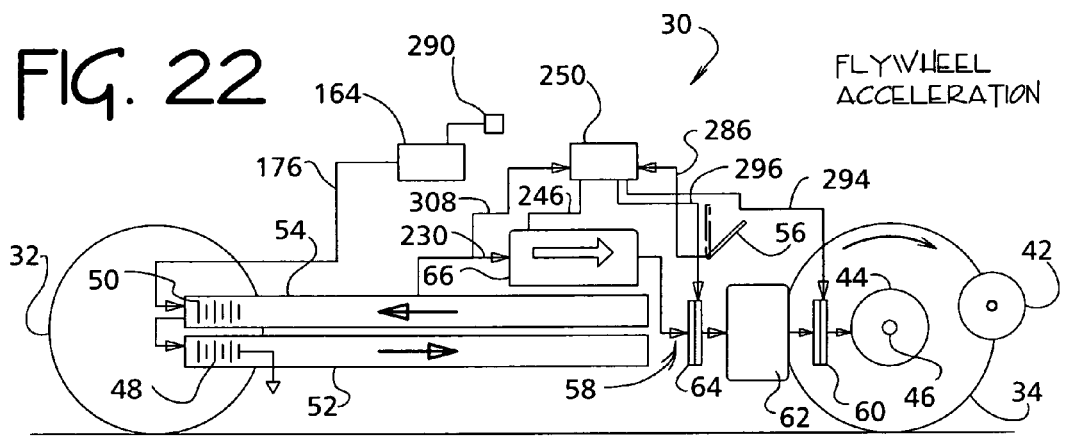
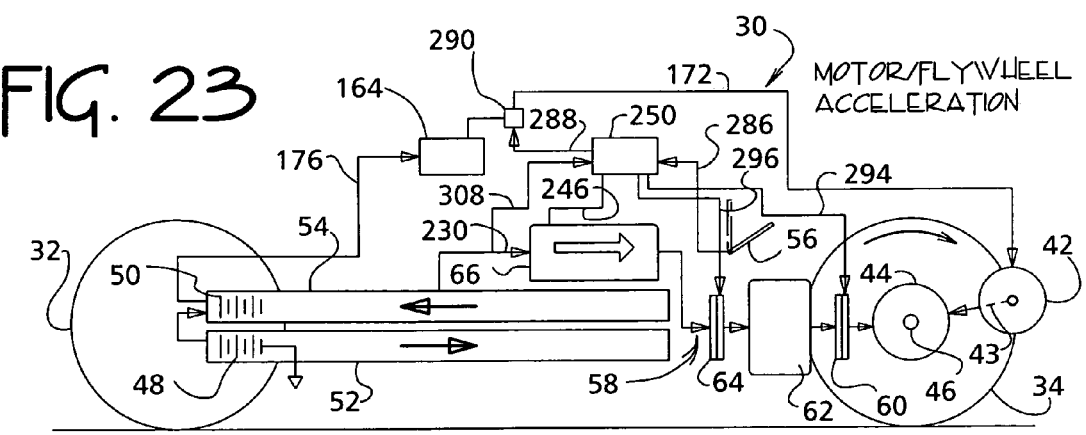

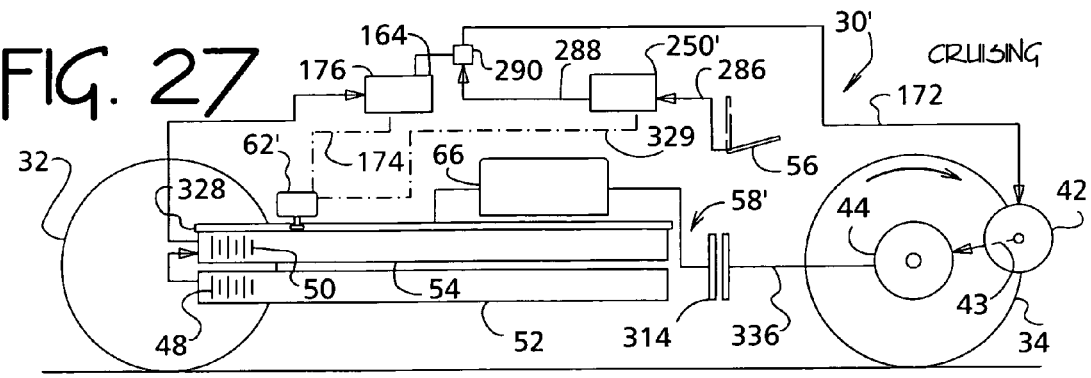
FIG. 27 CRUISING
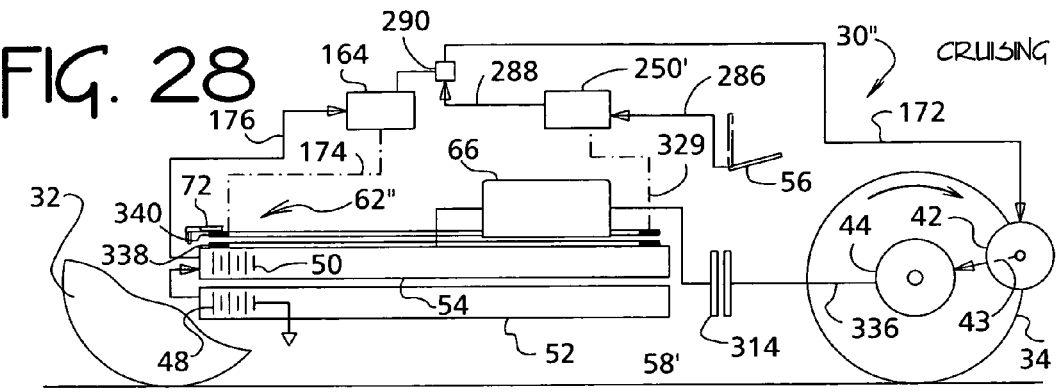
FIG. 28 CRUISING
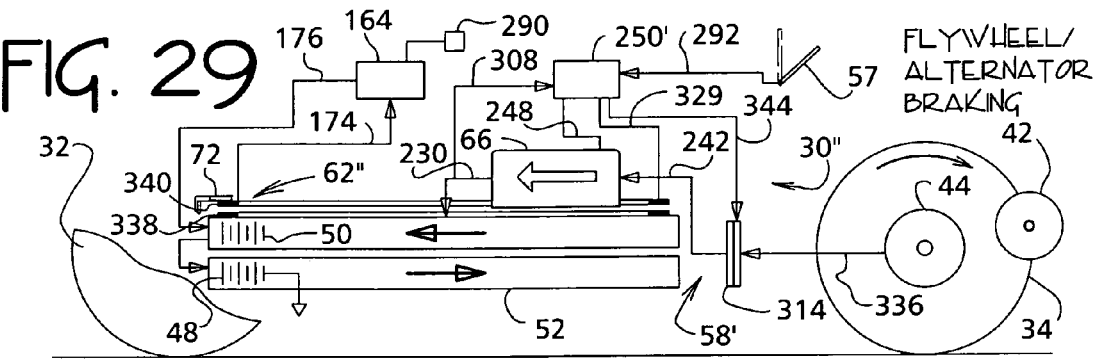
FIG. 29 FLYWHEEL/ALTERNATOR BRAKING
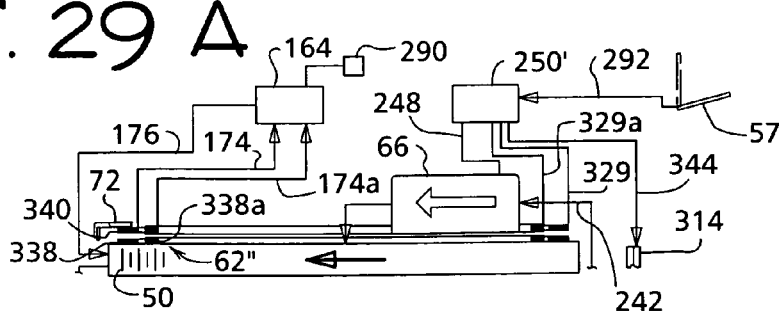
FIG. 29A

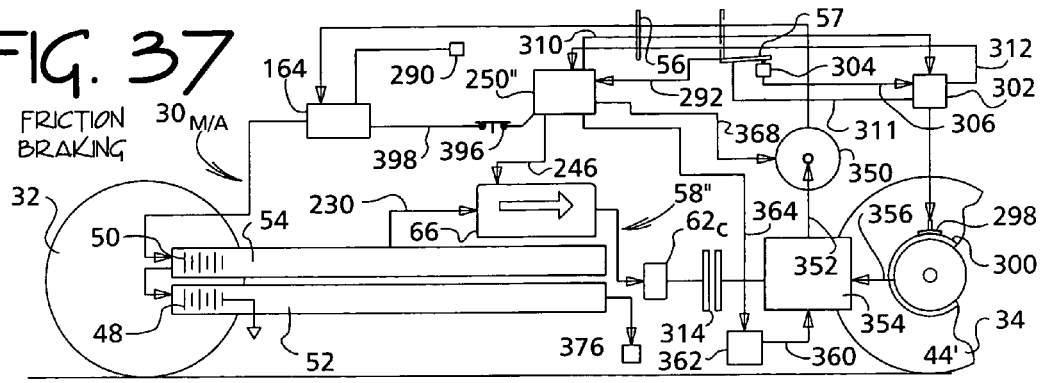
FIG. 37 FRICTION BRAKING
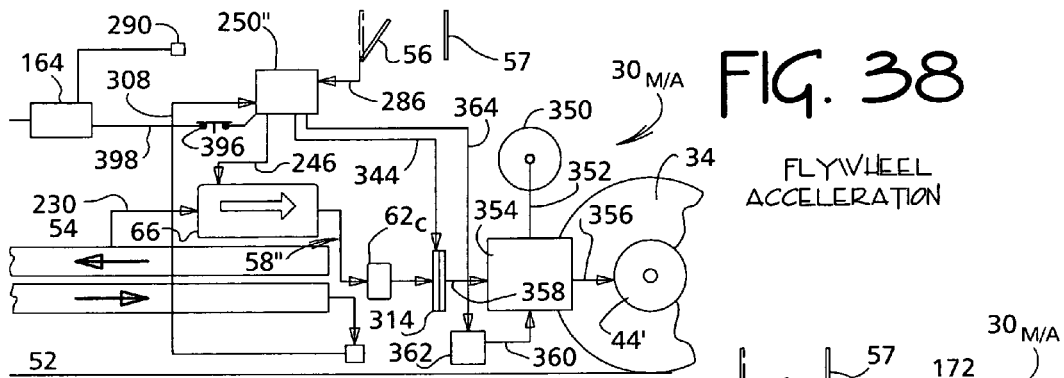
FIG. 38 FLYWHEEL ACCELERATION
FIG. 39 MOTOR/FLYWHEEL ACCELERATION
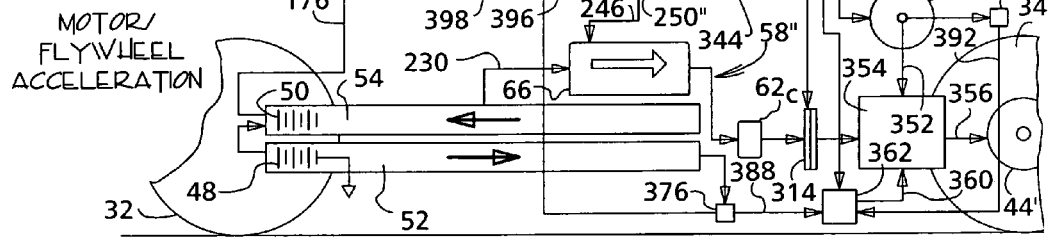
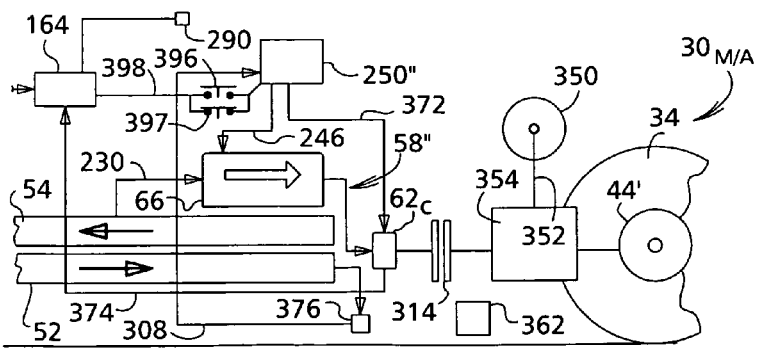
FIG. 40 FLYWHEEL ENERGY RECOVERY

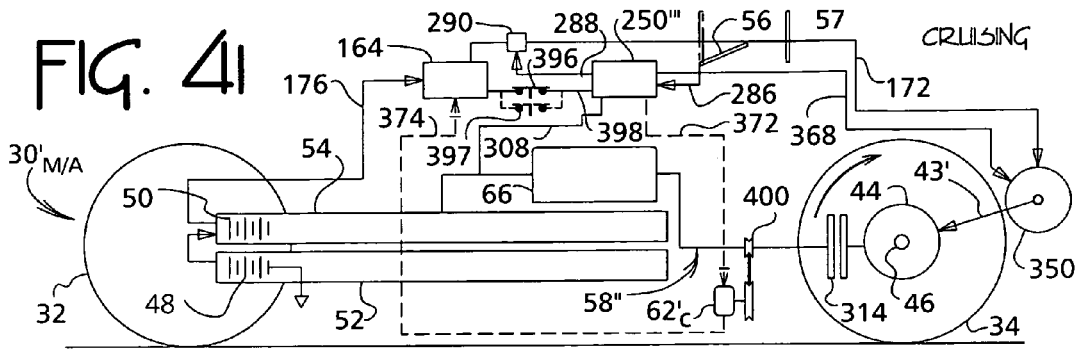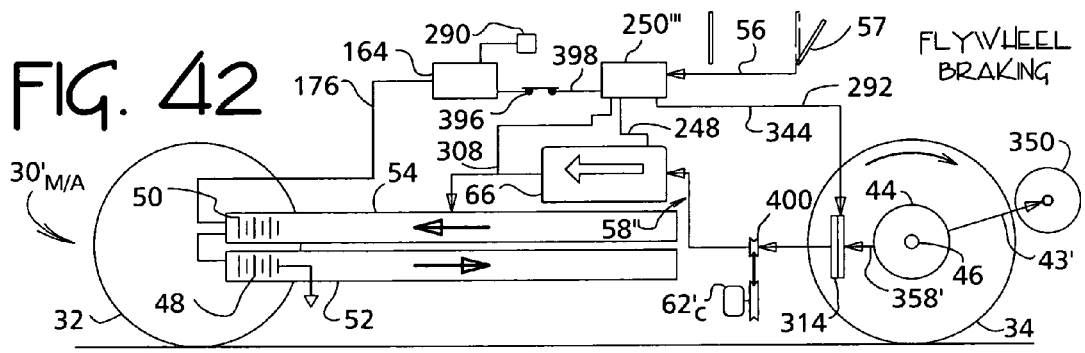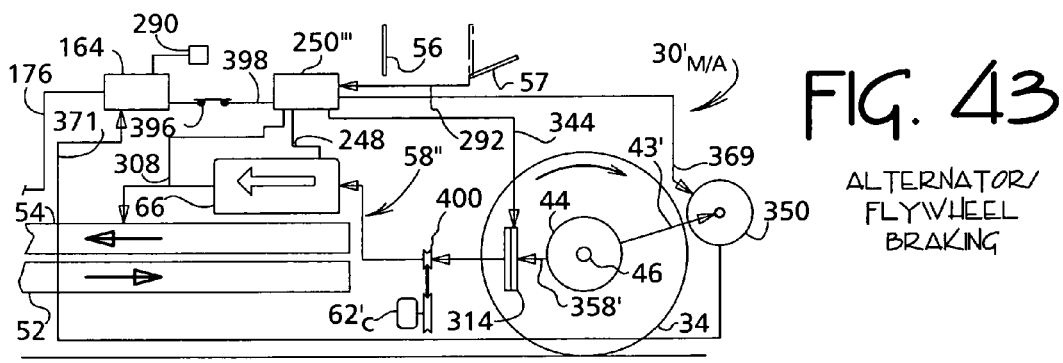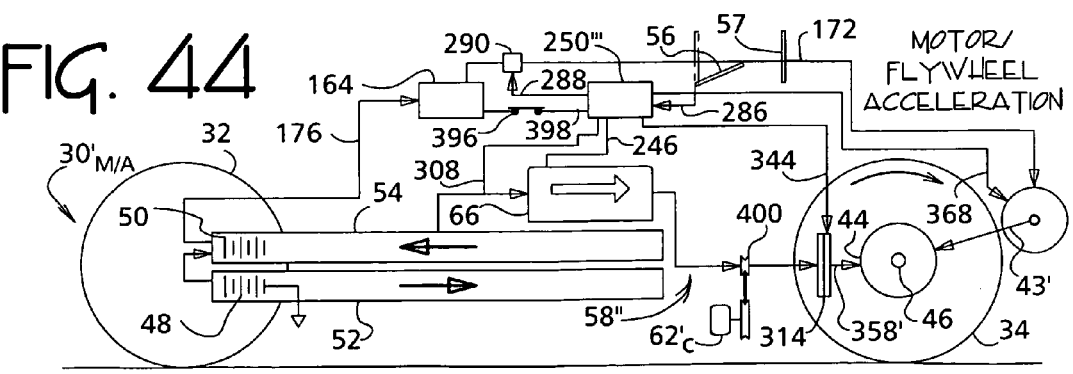

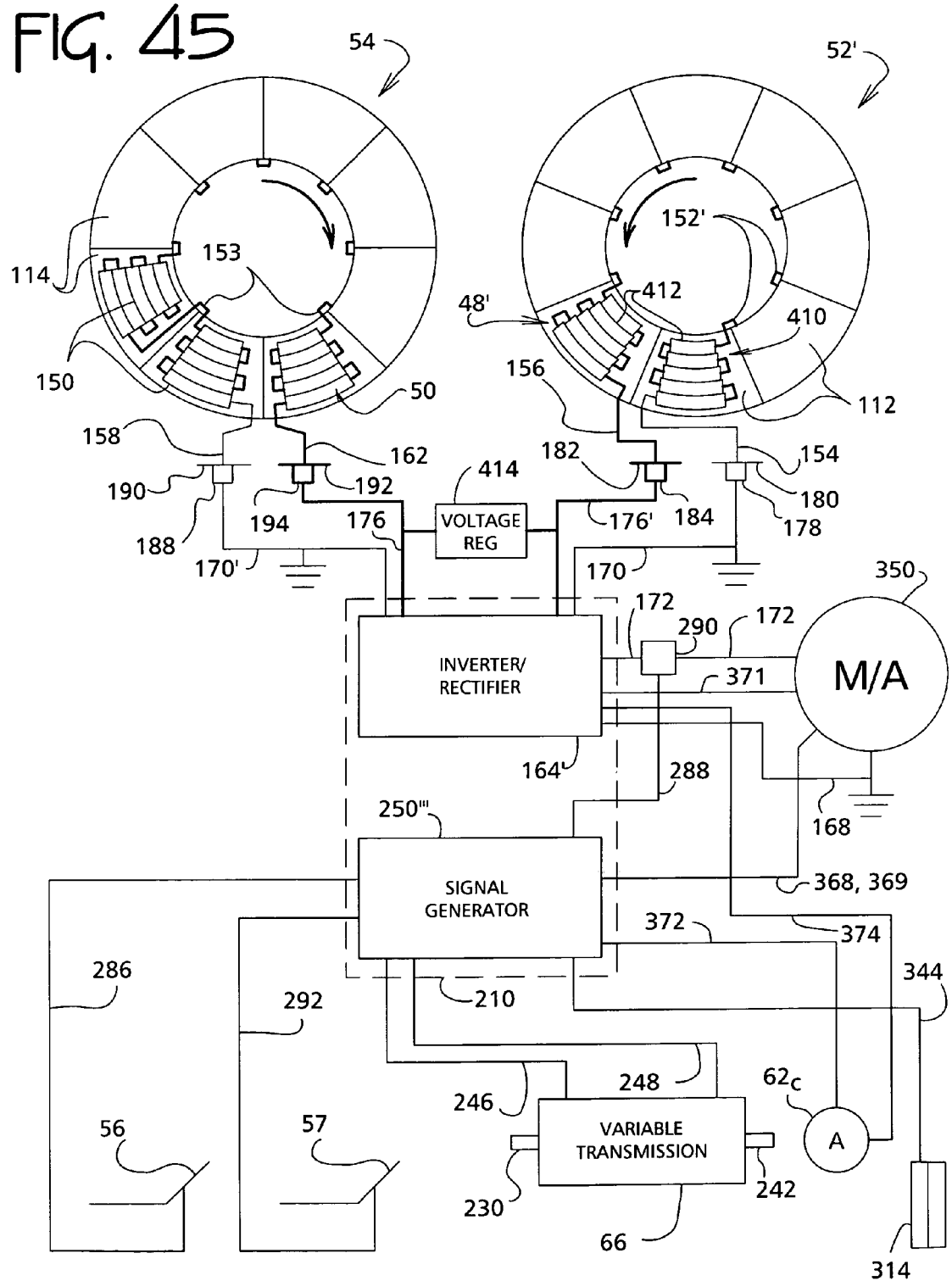

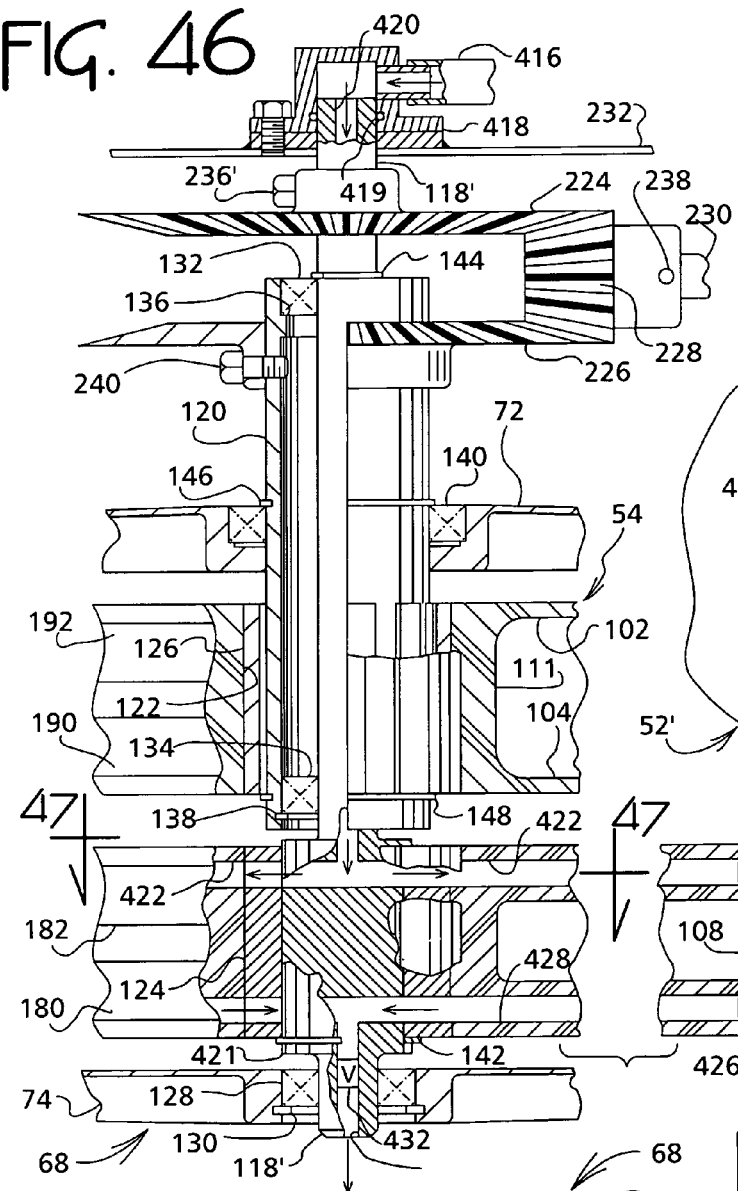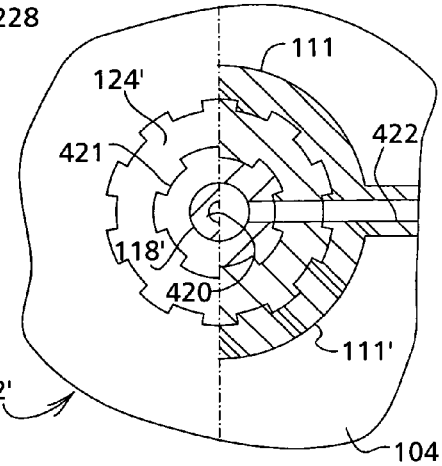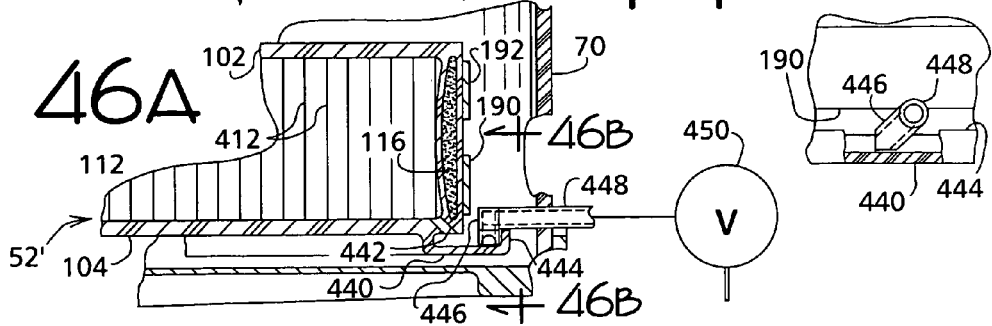

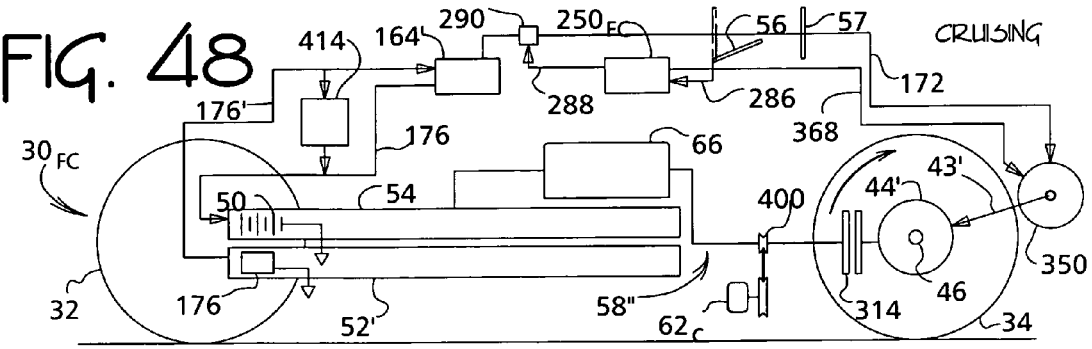
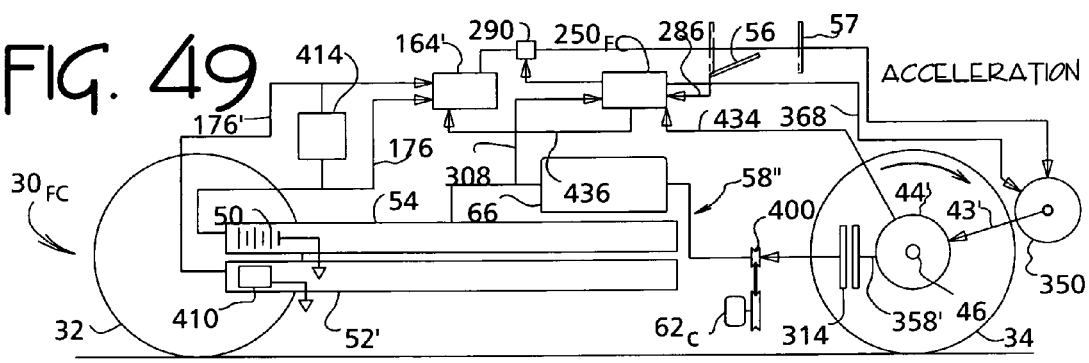
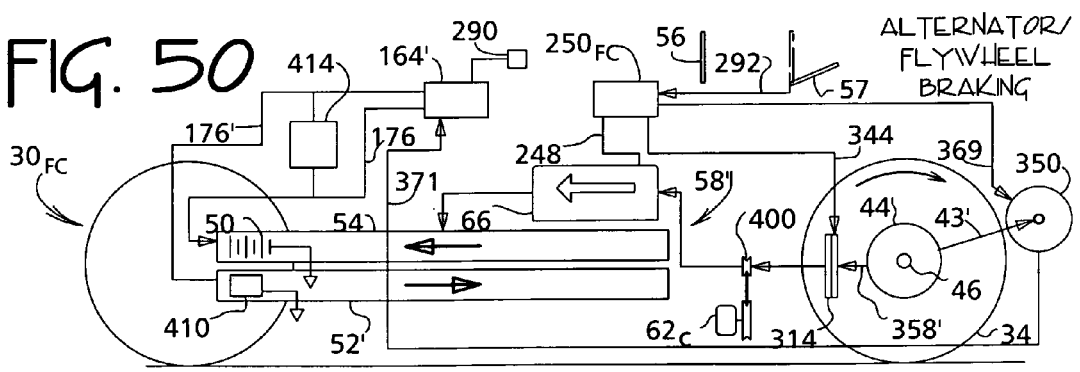
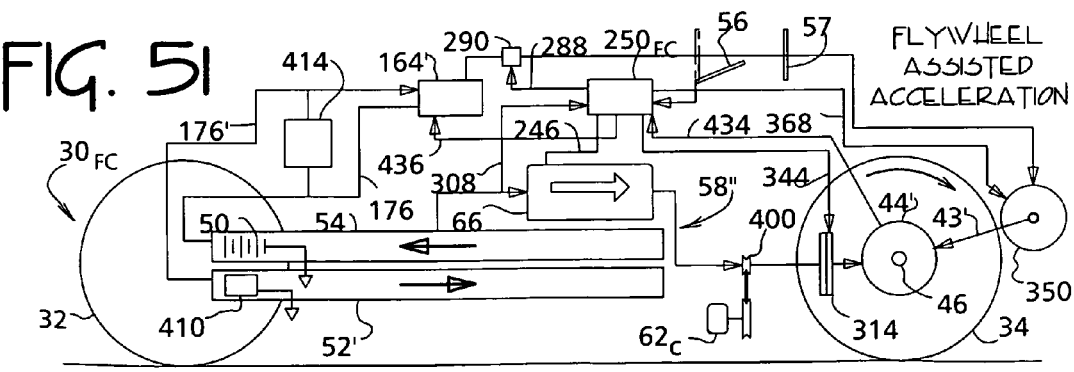

REGENERATIVE SELF PROPELLED VEHICLES

In a general sense the present invention relates to the reduction of atmospheric pollution by self propelled vehicles. More specifically, the invention relates broadly to improvements in regenerative, electric motor powered vehicles, with particular emphasis on improvements in those motor powered vehicles in which there is an on board electric energy source, having particular reference to batteries, as well as fuel cells. The end sought by these improvements is to make practical the elimination of internal combustion engines as a power plant, or, at least the sole power plant, for some significant portion of self propelled vehicles, viz., automobiles, trucks, etc.

It is ironic that battery powered motors were employed in early, self propelled vehicles, long before the internal combustion engine was developed for that purpose. But, when automobiles and trucks became the dominant form of transportation, it was the internal combustion engine that became the power plant which predominated, essentially to the total exclusion of battery power for vehicles operating on highways. Today, the battery powered vehicle is now being looked to as a cure for the pollution created by the proliferation of vehicles powered by internal combustion engines using hydrocarbon based fuels.

For the past several decades there has been an ongoing campaign to encourage, if not coerce, reduction of the emission of hydrocarbons and other harmful combustion products from automobiles and other self propelled vehicles. Both state and federal governments have invoked regulatory standards, aimed at reducing a wide range of alleged contaminates. In the same vein there have also been a wide range of governmental programs, in addition to those of the private sector, seeking a practical answer to the problems of atmospheric pollution that are consequent to vehicles powered by internal combustion engines.

Battery energized propulsion systems are the most technologically advanced alternative to the internal combustion engine and, for the near term, are the most likely non-polluting substitute. This fact is well recognized and intensive efforts have been carried out in an attempt to develop economical, commercially acceptable, battery energized, motor powered vehicles and thereby satisfy this long felt need for pollution reduction. Also, fuel cell technology has recently been developed to a point where it has the potential to provide an acceptable, alternate energy source for electrical motors employed in powering vehicles.

The ultimate end sought in the reduction of pollution is the complete elimination of the products of combustion of fossil based fuels. To date the most effective results of this development effort to reduce atmospheric pollution has been a compromise in which both a battery powered motor and an internal combustion engine are employed. Actually, this hybrid drive concept use of dual power sources had been proposed even before the automobile became ubiquitous in its present form. But, only recently has the hybrid power plant reached a stage where it is commercially practical as a means for effecting a significant reduction in pollution. One presently available, hybrid system has a highly refined capability of selectively engaging the motor and engine power source so as to attain a high degree of efficiency. This technology has enabled payloads, operating ranges and speeds comparable with conventional gasoline fueled automobiles, while achieving gasoline economy in excess of 60 miles to the gallon. These advantages are presently available in vehicles having a purchase price which bears only a nominal premium to conventional automobiles.

While improved gas mileages in this order of magnitude are significant in reducing pollution, there are many congested areas where the only acceptable solution is an automobile (truck, etc.) with zero emissions, as would be provided by an automobile powered solely by battery energy.

The basic problem with a battery powered vehicle is that the batteries have a finite quantum of usable energy. That quantum of energy defines the range/payload capability of the vehicle. Once that quantum has been expended, the vehicle is unusable until the batteries are recharged. This is to say that the range/payload of a vehicle is a direct function of the mass of its batteries.

Batteries are relatively high in cost, therefore the cost of a vehicle is significantly increased, in direct proportion to the mass of its batteries. The working life of batteries can also seriously impact the economics of a battery powered vehicle, since, from an economic standpoint, miles per battery replacement cost now becomes the determining factor. Where batteries are the only energy source for a vehicle, there is an essentially continual drain of energy in powering a vehicle for transportation purposes. In one form of regenerative braking where an alternator is driven by vehicle kinetic energy, the batteries are recharged, but this is only temporary, and the drain of battery energy continues upon reacceleration of the vehicle. Depth of battery discharge is the defining parameter for range/payload capability. Battery life is inversely proportional to percent of discharge, at a progressively increasing rate.

In recent years, and, in part due to the impetus of seeking a reduction in vehicle emissions, there have been significant improvements in battery technology. New battery chemistries, such as alkaline and lithium, have been developed and perfected. Deep cycle battery technology now enables lead-acid batteries to be discharged by as much as 80%, without substantially reducing the working life of the battery. Liquid has been eliminated from lead-acid batteries through the development of a gelled acid medium and also through the use of absorbed glass mats (very fine boron-silicate) as a carrier for the acid to the end that there is no free liquid. The present invention should be capable of use with and benefit by any improvements in batteries. In fact, absorbed glass mat (AGM) batteries enhance certain aspects of the present invention, as will be later described.

Another factor in battery life is the number of discharge/recharge cycles during the working life of a battery. Among the features of the invention is the minimization of discharge/recharge cycles to thereby increase the working life of a battery, as will be later dealt with in greater detail.

It is to be recognized that the use of an electric motor is the key to obtaining the desired reduction in atmospheric pollution. With this in mind, it is to be appreciated that fuel cells can also provide an alternative to batteries as the energy source for an electric motor powered car. Simplistically speaking, a fuel cell is a device that generates direct current energy by means of a chemical reaction. There are several types of fuel cells, but, at the present time, only the proton exchange membrane (PEM) fuel cell is known to have operating characteristics compatible with operation of a self propelled vehicle. An individual PEM fuel cell produces less than one volt, but multiple cells can be connected in series to obtain voltage potential and energy capacities for a given volume, which are comparable to lead-acid batteries. The PEM fuel cell has an operating temperature of 176° F., which is much lower than that of most other fuel cells. This factor, plus a relatively low cost, set the PEM apart as the most likely alternative energy source for electric motor powered vehicles.

The PEM fuel cell is based on a reaction between hydrogen and oxygen, with a platinum catalyst. Atmospheric oxygen is suitable and readily available for use in a PEM fuel cell. Hydrogen for a PEM fuel cell is more of a problem. At the present time, "reformers" have been developed which derive hydrogen from hydrocarbon and alcohol based fuels. While other gasses are also generated by reformers, these pollutants are minuscule in comparison to the pollutants exhausted from internal combustion engines. In fact, the characteristics of reformer emissions are such that they fall within the allowable limits of a "zero emission" vehicle, as defined by at least one leading, governmental regulatory agency. Additionally, it is understood that alternative, "reformer" technology will totally eliminate noxious emissions. It is to be anticipated that a hydrogen supply infrastructure will be developed in the future so that a car can "fill up" with hydrogen in the same fashion as in now done with gasoline.

As will soon become apparent, one aspect of the present invention is to mount batteries on flywheels. Several features of the invention can be advantageously be employed when fuel cells, with or without an associated reformer, are substituted as the flywheel mounted, electric energy source, in whole or in part.

Intertwined with the attempts to improve the efficiency of propulsion systems in general, are attempts to recover vehicle energy which is otherwise lost energy. Although there are other forms of lost energy, almost all efforts in this regard have been directed toward recovering the energy that is required for decelerating a vehicle, as is conventionally done through the use of friction brakes. Such systems are known as regenerative braking systems and are based on transforming the kinetic energy of vehicle movement to electrical energy by recharging batteries, as by drivingly connecting an alternator to the wheels of the vehicle; or by transferring the kinetic energy of the vehicle to a flywheel and then returning such rotational energy as a drive input for the vehicle, or employing this rotational energy to recharge the batteries. Various combinations of these means for restoring deceleration energy to the energy available for propulsion of the vehicle are found in the prior art.

Flywheels are a well known energy storing device employed in regenerative braking systems. The approach conventionally taken has been to add a flywheel device to a drive system which includes batteries, an electrical motor and the necessary mechanical connections between the wheels, the motor, the flywheel device and an alternator to enable deceleration energy to be recovered in a battery powered vehicle.

In only one known instance has there been a departure from this conventional approach, being found in U.S. Pat. No. 3,497,026—Calvert. Calvert teaches the use of a flywheel on which batteries are mounted. The weight decrement incident to providing a flywheel is thus minimized as the batteries serve the additional function of providing needed flywheel mass for the storage of energy.

In Calvert the flywheel also functions as an overgrown motor housing, having field poles mounted on the inner diameter of a central hub, in surrounding relation to the armature of the motor. The basic mode of operation is for the armature to be the relatively fixed component of the motor, with the housing/flywheel being the rotating component of the motor. The motor housing/flywheel also serves as the drive input to the driving axle of the vehicle. The operating characteristics of the motor are such that a constant speed differential is maintained between central armature and the housing/flywheel. As the vehicle accelerates, a mechanical feedback rotates the armature to maintain the constant speed differential. To illustrate, when the vehicle is stopped, the housing/flywheel speed would be 500 rpm. When the vehicle is in motion, the housing/flywheel could be 400 rpm and the counter-rotating armature would be 100 rpm (making up the constant 500 rpm relative speed). During acceleration, energy is supplied from the battery to maintain the constant speed differential. When the vehicle decelerates, the armature decelerates, increasing the speed differential, the armature and field poles then function as a generator. In the generation of electricity, an electromagnetic force is created which tends to decelerate the housing/flywheel.

In view of the demand for and governmental pressures to force acceptance of zero emission vehicles, it is indeed surprising that the potential of Calvert has not been exploited. This is to say that, prior to Calvert, the mass of the batteries in a battery powered vehicle was simply a dead weight that represented a system decrement and limited the range/load capability of a given vehicle. Calvert recognizes that when the batteries are mounted on a flywheel, their mass can serve a regenerative function, in storing kinetic energy that can be recovered as electric energy or kinetic energy. To the best of our knowledge there has been no proposal aside from Calvert, let alone any actual usage of the concept of battery mass flywheels, where the mass of the batteries serves as an energy storage device for kinetic energy that is later recovered and returned for use in powering the vehicle. This is a highly significant feature in that for a given battery system, energy that would otherwise be lost, is recovered and thus provides a greater payload/range capability, a most critical factor in achieving commercial acceptance.

It is a specific object of the present to exploit the teachings of Calvert and thereby more fully realize the potential benefits that are attainable through mounting batteries on flywheels, in a regenerative, vehicle propulsion system.

This specific object falls within and is ancillary to the broader object of the present invention, which is to minimize atmospheric pollution through the provision of a electric energy, powered vehicle having operating capabilities that make it a commercially practical alternative to conventional, gasoline (and other hydrocarbons) fueled vehicles.

Another of the broader objects of the present invention is improve the recovery of energy in regenerative operation of an electric energy powered vehicle.

Another object of the present invention is to provide an electric energy powered vehicle which is of the subcompact type and particularly suited for use in commuting between residence and work or residence and a train station.

More specifically it is an object of the present invention to enhance the overall efficiency of electrically powered vehicles, with a specific emphasis on a subcompact vehicle configuration, particularly suited for use in commuting to and from work locations and in other service duties which tend to overload existing roadway capacity.

Another of the specific objects of the invention is to attain the foregoing ends by more fully realizing the potential of mounting an electric energy source on or within a flywheel and utilizing its mass to provide a regenerative function.

Another of the more specific objects of the present invention is to attain improved regenerative operation of a vehicle having fuel cells as a primary energy source and battery energy as a secondary energy source for improved acceleration characteristics.

A further object of the present invention is attain the foregoing ends and further to facilitate repair and replacement of the batteries employed in a battery powered vehicle.

The present invention, in all of its aspects, takes the form of a electric energy powered vehicle which comprises wheel means for supporting the vehicle for movement along a surface; motor means for powering motive operation of the vehicle; an electric energy source for energizing the motor means and a regenerative system for recapturing energy that would otherwise be lost in the operation of the vehicle. In all cases the regenerative system is provided with flywheel means, including at least one flywheel. The flywheel means functions as a reservoir, for the temporary storage of energy that is returned to the overall energy system of the vehicle.

In accordance with one aspect of the invention, a flywheel is formed, at least in part, by resinous, dielectric material, which defines annular chamber means. An electric energy source comprises a plurality of voltaic cells disposed in the annular chamber means, with resinous material of the flywheel functioning as a casing for the electric energy source, e.g., forming the equivalent of a battery casing. This flywheel is further characterized in that the mass of the voltaic cells constitutes at least the major portion of the mass of the flywheel. Advantageously, the chamber means comprise a plurality of chambers defined by an outer, cylindrical rim, an inner, cylindrical shell, a pair of axially spaced discs that are joined to the rim and inner shell, and a plurality of radial vanes dividing the annular chamber into a plurality of compartments. Additionally, the outer rim of the flywheel may be reinforced by a band of circumferentially wound, high strength filaments, which functions as the primary load bearing component for the centrifugal forces generated when the flywheel is rotating.

Another aspect of the invention is found in a self propelled car powered by electric motor means and having a regenerative system for recapturing energy that would otherwise be lost in the operation of the vehicle. This system includes a flywheel mounted for rotation about a relatively fixed axis. The flywheel has cavity means in which at least a portion of the voltaic cells, which comprise an electric current source for energizing the motor means, are disposed. A pair of axially spaced conductive rails are provided on the outer diameter of the flywheel and means for electrically interconnecting said voltaic cells and said rails, to establish one of said rails at a positive potential relative to the other rail.

The means for energizing the car's motor means include, a pair of relatively fixed, conductive shoes, respectively engaging each of said rails, for transferring the potential across the rotating rails to relatively fixed conductors, which then enable energization of the motor means. By so conducting current to and from the flywheel mounted battery means, the potential for generating extraneous eddy currents is substantially reduced, if not entirely eliminated. The minimization of extraneous current is even more evident in the preferred use of a second flywheel which is also provided with a pair of outer diameter rails connected to voltaic cells carried thereon and forming a second electric current source, to form a voltage potential thereacross. A second pair of relatively fixed shoes enable the voltage of the second electric current source to be established across relatively fixed conductors.

A further feature is found in the provision of alternator means for the regenerative recovery of energy and the use of the rails and shoes in conducting electricity thereto in recharging the battery means. Advantageously, the flywheels are disposed within a containment device on which the stationary conductive shoes are mounted. It is also preferable that dielectric portions of the flywheels define chambers for receiving the voltaic cells of the battery means, to eliminate the provision of a separate battery casing element. A further feature of this aspect of the invention is found in one electric current source being a battery array on one flywheel and a second electric current source being a fuel cell array on a second flywheel, both arrays being formed by a plurality of voltaic cells. Other aspects of the invention deal with the use of flywheel mounted fuel cells and the disposal of water generated by such fuel cells in the process of generating electricity.

In accordance with another aspect the invention may be embodied in a low profile, subcompact car comprising an occupant compartment in which a drivers seat and a passenger seat are disposed in side-by-side relation. The wheel means include a pair of laterally spaced, front wheels and a pair of laterally spaced, rear wheels. The flywheels of a regenerative braking system are mounted for rotation about a vertical axis and are disposed in the lowermost portions of the car to underlie passenger and driver sears. The forward portion of the occupant compartment is at a level beneath the upper level of the flywheel means, to provide leg room and support the feet of occupants, as the overall length of the car is minimized.

The end of providing a low profile subcompact car may also be obtained or enhanced in the side-by-side seating environment, through the provision of flywheels which have a diameter that at least approximates the lateral spacing between the front and rear wheels of the car.

A further and related aspect of the invention is found in overcoming the structural problems arising from the stresses inherent in rotating flywheels carrying the weight of batteries necessary to provide an economically feasible payload/range capacity for a battery powered vehicle. To this end the it is preferred that a containment device be incorporated in the vehicle to provide a chamber in which the flywheels are mounted. The chamber may be sealed so that the flywheel or flywheels operate in a contaminant free environment, which may be at a negative pressure so as to minimize windage energy losses. The containment device serves the primary function of preventing, or at least minimizing the spread of potentially hazardous battery materials, in the event of a structural failure of a flywheel. Integration of the large mass of the flywheel means as a component of the vehicle is then obtained by making the containment device a part of the chassis means of the vehicle, which provide structural support for the functional components of the vehicle.

Advantageously, the flywheel has cavities, formed of dielectric material, in which the voltaic cells of an electric energy source are disposed. Additionally the containment device can be formed of an upper cover, a cylindrical casing and a bottom cover, with the top cover being secured to and forming a load bearing portion of the chassis means. Other related features include mounting the rear wheels of the vehicle on a portion of the chassis means which are secured to a rearwardly facing portion of the top cover of the containment device. Further, the regenerative system may include a drive train which includes a variable ratio drive transmission which is mounted on and supported by the top cover of the containment device. Other features of this aspect of the invention include the provision of a second flywheel and a miter gear set, which provides a drive train connection to an input/output shaft, with the flywheels rotating in opposite directions.

Another aspect of the invention is found in the relative disposition of operating components in a battery powered vehicle, which is provided with a regenerative system for recovering energy that would otherwise be lost in decelerating the vehicle. To such end, the flywheels are mounted for rotation about a vertical axis and a flywheel drive train interconnects the flywheels and the front wheels of the vehicle, with a portion of the drive train overlying the flywheel means and extending between the passenger and operator seats of the vehicle. The flywheel drive train may be selectively engaged with the front wheels to transfer energy to or from the flywheels in decelerating the vehicle and then returning flywheel energy to power the vehicle. This basic configuration can be used in combination with features that have already been discussed, as well with other features that will be further enumerated.

Thus, a preferred feature of the invention is found in the provision of a differential gear set drive, which enables a vehicle to be powered by a drive input from the motor means and also by a drive input from the flywheel drive train in order to recover energy from the flywheel means. The flywheel drive train may also include a variable ratio drive transmission and selectively actuated means for adjusting said transmission to (a) transmit power from the front wheels to the flywheel means to thereby transfer kinetic energy of forward motion into stored kinetic energy in the rotating flywheel means, or (b) to transmit power from the flywheel means to the front wheels to thereby transfer kinetic energy from the flywheel means to provide motive energy of vehicle movement.

Additionally, the flywheel drive train may include a means for driving an alternator, with first and second clutches being selectively engagable to drive the alternator either from the front wheels in decelerating the vehicle or from the flywheels in recovering kinetic energy stored therein. The rotor of the alternator may be included in the drive train, or, it may be separately driven in response to rotation of the flywheel.

In the latter circumstance, the magnetic component of the alternator can, advantageously, be mounted on the flywheel means and the field component of the alternator can be mounted in fixed relation relative thereto, preferably on a containment device which defines a chamber in which the flywheel means are mounted.

Another aspect of the invention is found in facilitating the mounting, servicing and replacement of flywheel means, particularly where the electric energy source means has been maximized to constitute a major portion of the mass of the flywheel means. Thus it is preferred that a regenerative braking system, which recaptures energy that would otherwise be lost in decelerating the vehicle, include a pair of flywheels counter rotatable about a vertical axis, on which the battery means are disposed. The pair of flywheels is disposed in a chamber defined by a containment device. A drive train for connecting the flywheels to the wheel means includes a central flywheel shaft to which the lower flywheel is attached, a tubular flywheel shaft to which the upper flywheel is attached, an input/output shaft for transmitting power to and from the flywheels, and gear means for transmitting rotation between the flywheel shafts and the input/output shaft. Advantageously, a sealed lubrication chamber in which the gear means are disposed, is defined by an upper portion of the containment device and a housing mounted thereon. It is also preferred that the containment device comprises a top cover, a casing, and a bottom cover, with the tubular shaft journaled on and supported by the top cover. Additionally, the central shaft is journaled within and supported by the tubular shaft, the lower cover is removable from the casing to provide access to the flywheels, the lower flywheel is then removable from the central shaft, and the upper flywheel is then removable from the tubular shaft so that the flywheels may be accessed for repair and replacement.

Other aspects of the invention are found in coordinating regenerative braking systems with friction braking means. Thus, in decelerating a vehicle, by accelerating a flywheel, the flywheel can reach an overspeed condition, beyond which there is a possibility that the structural integrity of the flywheel could be compromised. The overspeed condition is sensed and triggers actuation of friction braking means so that there is a smooth transition of deceleration forces, while avoiding the danger of flywheel failure. A further aspect of the braking features is found in the provision of a brake pedal which invokes flywheel braking through an initial range of displacement. When this range of movement is exceeded, the friction braking means are invoked. Another aspect in coordinating the braking system is found in the sequential invoking of flywheel braking, alternator braking means and then friction braking means to provide progressively increasing braking forces.

Yet other aspects of the invention are found in a motor drive train for powering the wheel means of a vehicle from a battery energized motor and then providing a second regenerative drive train connectable to the vehicle wheels, which drive train, when so connected, provides for vehicle kinetic energy to be transferred to the flywheels to decelerate the vehicle. The energy so stored in the flywheels may then be returned to the vehicle wheels means to power the vehicle. A related aspect of the invention is found in the provision of a differential drive for either the front or the rear wheels of a vehicle and then providing both regenerative drive train and motor drive connections thereto.

A battery powered vehicle comprises several subsystems which cooperate to deliver motive power. For example, batteries may be generically characterized as voltaic cells, which develop a voltage potential across positive and negative electrodes. Likewise, the strength to weight ratio of materials can seriously impact the weight of components and the load carrying capacity of a vehicle. Improvements in battery technology or in obtaining improvement characteristics in materials, would further enhance the advantages of the present invention, which is primarily directed to improvements in the interrelationship of components.

A further aspect of the invention is found in the provision of an electrodynamic device having a motor mode for powering movement of the vehicle and an alternator mode for providing a braking function and recharging the vehicle's batteries in so doing. Use of this electrodynamic device is further facilitated by the provision of a mechanical integrator which has a bidirectional connection with the differential gear set to which the wheels of the vehicle are connected. The mechanical integrator also has bidirectional connections with flywheels and the electrodynamic device to the end of enabling flywheel and alternator, alone or in combination with each other, and for powered operation of the vehicle by the motor mode of the electrodynamic device, or by the flywheel or by a combination of both energy sources. Additionally, a secondary alternator, for recharging the batteries, may be provided to recover flywheel energy in maintaining the flywheels at an intermediate speed, or in recapturing substantially all of the energy from the flywheels, when the vehicle is to be out of service.

The above and other related objects and features of the invention will be apparent from a reading of the following description of preferred embodiments of the invention, and the novelty thereof pointed out in the appended claims.

In the drawings:

FIG. 3 is a section, on an enlarged scale, taken generally on line 3-3 in FIG. 2;

FIG. 4 is a section, on an enlarged scale, taken generally on line 4-4 in FIG. 2;

FIG. 5 is a view, on an enlarged scale, taken generally on line 5-5 in FIG. 2;

FIG. 7 is a section, on a further enlarged scale, of mounting means for flywheels, which are illustrated in FIG. 6;

FIG. 8 is a section taken on line 8-8 in FIG. 7;

FIG. 9 is a section taken on line 9-9 in FIG. 7;

FIG. 10 is a section taken on line 10-10 in FIG. 7;

FIG. 11 is a plan view, on an enlarged scale of a containment device seen in FIG. 2, with portions broken away and in section to show portions of flywheels that are disposed therein;

FIG. 12 is a view taken on line 12-12 in FIG. 11;

FIG. 13 is a view taken on line 13-13 in FIG. 11;

FIG. 14 is a section taken on line 14-14 in FIG. 11;

FIG. 15 is a section taken on line 15-15 in FIG. 11;

FIG. 16 is a fragmentary view, on a greatly enlarged scale, of a portion of a flywheel and a current transmitting shoe, seen in FIG. 15;

FIG. 17 is a schematic view of electrical and control components for the electric car of the present invention;

FIGS. 18-23 are schematic views illustrating various operating modes of the electric car of the present invention;

FIG. 27 is a schematic view illustrating the cruise operating mode of the embodiment seen in FIG. 24-26;

FIGS. 28-31 are schematic views illustrating various operating modes of a regenerative system in which a further form of alternator is employed;

FIGS. 33-40 are schematic views illustrating various operating modes of a further embodiment of the invention in which a motor/generator alternately provides motive power and regenerative braking;

FIGS. 41-44 are schematic views illustrating various operating modes of a modified drive system for the motor/alternator embodiment;

FIG. 45 is a schematic view of electrical and control components for a further embodiment of the invention having both battery and fuel cell sources of electrical energy;

FIG. 46 is a view similar to FIG. 7 illustrating the mounting of flywheels respectively carrying a battery array and a fuel cell array;

FIG. 46A is a section of the outer rim portion of a fuel cell flywheel seen in FIG. 46 and an adjacent portion of a containment device;

FIG. 46B is a development, on an enlarged scale, take on line 46B-46B in FIG. 46;

FIG. 47 is a section taken on line 47-47 in FIG. 46; and

FIGS. 48-51 are schematic views illustrating various operating modes of an electric car powered from a fuel cell energy source and also from a battery array, energy source.

Figure 1:
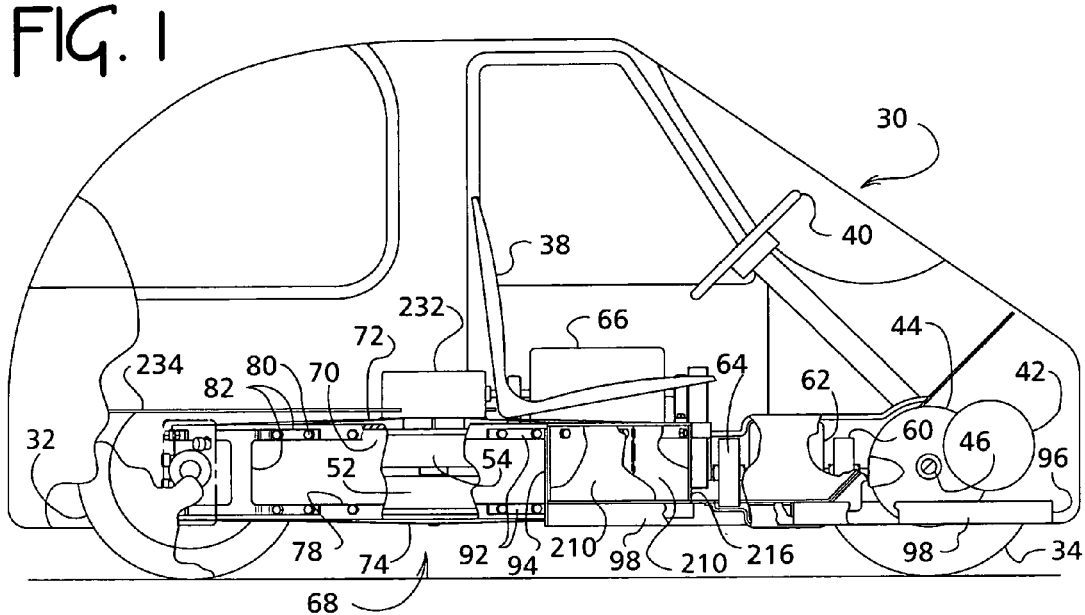
FIG. 1 is a simplified elevation of an electric car embodying the present invention, with portions thereof broken away.
Figure 2:
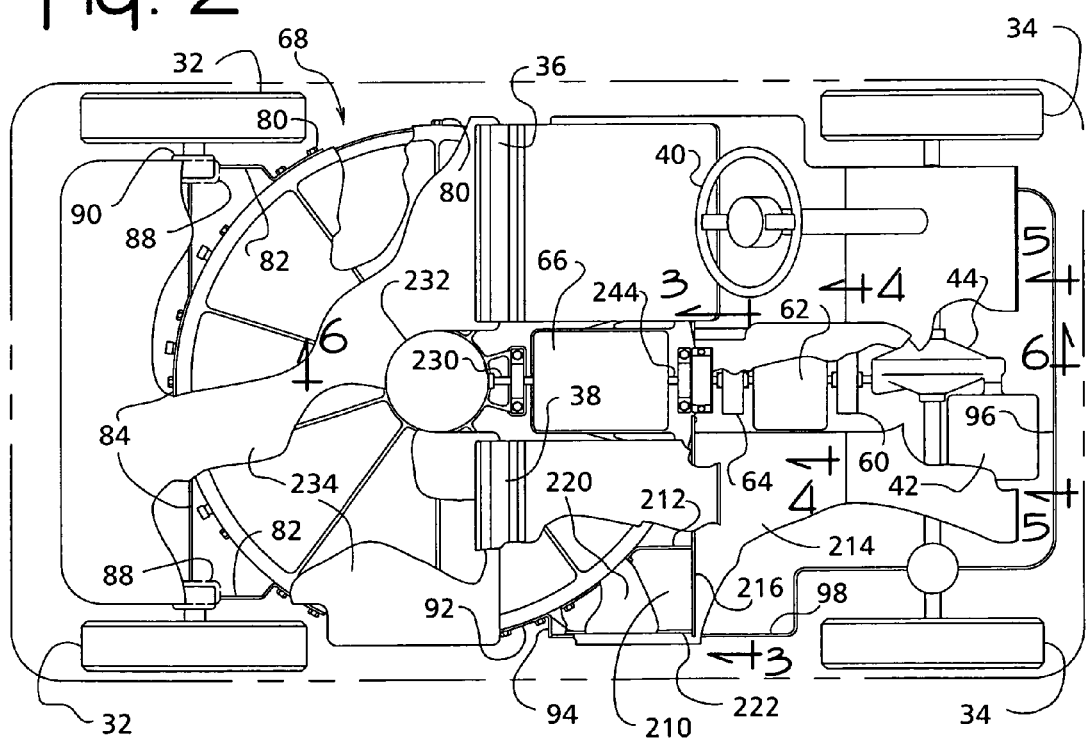
FIG. 2 is a plan view of the electric car seen in FIG. 1, also having portions thereof broken away and primarily illustrating the drive components therefor.

With reference to FIGS. 1 and 2, the present invention is illustrated in a sub-compact car embodiment which would be particularly suited for commuting usage, where a small space envelope minimizes highway and parking space requirements. This car, identified generally by reference character 30, comprises the basic components of an automobile, namely, laterally spaced front and rear wheels, 32, 34, a driver's seat 36 and passenger seat 38. Direction of movement of the car 30 is controlled by a steering wheel 40, which controls the angular positioning of the front wheels 34, through any of the many conventional linkage systems that serve this purpose.

The car 30 is powered by an electric motor 42 and a regenerative braking system, which can best be understood by next referencing FIG. 18. The motor 42 is provided with a drive connection 43 to a differential gear 44, which drive shafts 46 for the front wheels 34. Battery means for energizing the motor 42 comprise battery arrays 48, 50, carried, respectively, on flywheels 52, 54. In operating the car 30, a foot controlled, power demand pedal 56 is depressed to provide an energizing connection from the battery arrays, 48, 50 to the motor 40. The car 30 may be decelerated by depression of a brake pedal 57 (seen in later Figs. illustrating its use).

As discussed above, a regenerative braking system restores to the vehicle's energy system, energy that would otherwise be lost in decelerating the car. The present invention is based on the use of flywheels 52, 54 that serve as a reservoir to which kinetic is transferred in decelerating the car and from which kinetic energy is provided for subsequent, powered operation of the car. Additional regeneration is provided through the use of alternator means both as a deceleration means and as an energy recapture means, through recharging the battery means to return deceleration energy to the car's electrical energy system. To these ends, the regenerative system includes a power train 58 adapted to connect the flywheels 52, 54 with the differential 44. The power train 58 includes a clutch 60, the rotor (not illustrated in FIG. 18) of an alternator 62, a clutch 64 and a variable drive transmission 66. The mode of operation of the regenerative braking system will be later described.

A sub-compact car, as herein referenced, as well as the many other vehicles in which the present regenerative braking system could be embodied, can include a host of sub-systems and related features, which are necessary, or desirable for operation of a vehicle, but are unaffected by and/or wholly unrelated to the regenerative system itself, except as specifically stated herein. In the present disclosure, many such conventional subsystems are omitted, and some are shown in the drawings without specifically being referenced in the description. On the other hand, a chassis, or structural framework, which is a load carrying member found in all vehicles, has relevance to the present invention in a fashion that will be discussed in detail.

The flywheels 52, 54 are preferably formed with a diameter which is maximized in order to maximize the energy capacity of the flywheels, viz., the mass of the battery arrays 48, 50, and minimize the centrifugal forces on the batteries. Consistent with recognized design parameters of a sub-compact car, the lateral spacing between the wheels 32, 34, approximates at least four feet and the flywheel diameter approximates that spacing, herein being 48 inches, for a point of reference.

Even at the rates of rotation contemplated by the present invention, centrifugal forces on the flywheels 52, 54 are significant. Considering further that the electrolytic components of the battery arrays will most likely be hazardous, in one fashion or another, it is highly likely that precautions will need to be taken to minimize spread of contamination in the event of a structure failure of the flywheels. While the details of the battery arrays are later described, it can be noted at this point that lead acid-batteries are the most cost effective form of battery chemistry currently available. The hazards of the original lead-acid battery can be greatly minimized by the use of absorbed glass mat (AGM) technology, which essentially eliminates free liquid acid. By using AGM battery arrays (48, 50), there will be little or no spread of liquid acid in the event that a structural failure of the flywheel should occur. Even so, it is preferred that a containment device 68 be provided in surrounding relation to the flywheels 52, 54, in order to minimize, if not eliminate, uncontrolled dispersion of lead fragments and/or acid bearing glass mats (or other electrolytic cell components).

The containment device 68 comprises an annular casing 70 and upper and lower covers 72, 74 (FIGS. 1, 2, 6 and 11-15). These primary components of the containment device may be high strength-to-weight constructions to minimize the weight penalty in protecting against structural failure of the flywheels. Thus the annular casing 70 can be advantageously formed as a filament reinforced resinous construction. The covers 72, 74 are each formed as basically thin walled constructions, having reinforcing ribs, and thickened portions where required for functional purposes. A light weight metal, such as an aluminum alloy can be used as the material for the covers 72, 74. Thus, it will be seen that the covers 72, 74 are defined by thickened, annular rim portions 76 and annular flanges 78 (see also FIG. 12), which are telescoped over the shell 70 and are held in assembled relation by screws 80.

Advantageously, the containment device 68 actually becomes a load bearing portion of the automobile's chassis. Thus, brackets 82 and a cross bar 84 (FIGS. 1, 2 and 11) are mounted on flanges 78 of the containment device covers 72, 74 by the bolts 80, which are also serving the function of holding the covers in assembled relation on the casing 70. The brackets 82 and cross bar 84 are connected to spring suspension systems 88, which interact with bearing systems 90 for the rear wheels 32.

The load bearing structure (chassis) of the car also includes brackets 92 (FIGS. 1-3 and 6), attached to the top and bottom containment device covers 72, 74, being mounted in assembled relationship by other of the screws 80. The brackets 92, on each side of the containment device, are joined by a vertical portion 94. The chassis also includes a U-shaped bracket comprising (as a simplified showing) a bridge 96, at the forward end of the car, and rearwardly projecting legs 98, attached to the containment device brackets 92. These chassis portions (96, 98) transmit the weight of the vehicle to mountings 100 for the front wheels 34 through conventional suspension systems (not illustrated).

Constructional details of the flywheels 52, 54 will next be described with reference to FIGS. 7-16. The flywheels 52, 54 serve as carriers for the battery arrays 48, 50, previously referenced in describing FIG. 18. From a constructional standpoint, these flywheels may be identical, except for the central, hub portions thereof. Thus, each flywheel may comprise outer disc portions 102, 104 interconnected by an outer, annular rim portion 106 and an intermediate annular band 108. The flywheel structure is further reinforced by radial vanes 110 that also interconnect the disc portions 102, 104. A central hub 111 then joins the central portions of the disc portions 102, 104. The vanes 110, rim 106 and band portion 108 define a plurality of battery compartments 112, 114 in the flywheels 52, 54 in which the battery arrays 48, 50 are respectively carried.

The described portions of the flywheels 52, 54 are advantageously formed of a fiber reinforced resin, such as a glass-fiber reinforced, epoxy resin. This provides a high strength to weight ratio, which minimizes the weight of the structural portions of the flywheels, which are subject to substantial loadings during rotation of the flywheels. As will later be discussed, the greater the mass of the voltaic cells, as a percentage of total of flywheel weight, the greater the increase in payload range capability.

Another feature in maximizing the battery mass of the flywheel is found in the provision of a wound band 116 (FIGS. 15 and 16) of high strength filaments, graphite filaments having a diameter in the order of 0.001 being illustrative of a suitable filament material. When the flywheels are rotating, high centrifugal forces will be generated in the outer rims 106 of the flywheels. Actually, it is a feature of the invention that the centrifugal forces are relatively low, compared to the quantum of kinetic energy that can be stored in the flywheel. This is to point out that centrifugal forces are inversely proportional to the radius of a given mass, while such forces are directly proportional to the square of the rate of rotation. Another relevant factor is that the kinetic energy in a flywheel is directly proportional to the square of the radius of the moment of inertia of a given mass. The preferred maximization of flywheel diameter to approximate the lateral spacing between the wheels, 32, 34, takes advantage of these relationships to provide a high energy storage capacity in the flywheels, while minimizing the stress loading on, and the weight of the structural components of the flywheel.

By using the wound filament reinforcement, these centrifugal loadings will be taken in tension by the filaments. Since such filaments have extremely high tensile strengths and minimal elongation, the rims 106 may be light in weight and highly stable at all operating speeds, while permitting maximization of the volume/energy capacity of the battery arrays. The load carrying capacity of the filament band is enhanced by forming the band with a cylindrical surface and by progressively increasing the thickness of the band toward its central section, as illustrated.

Referencing FIGS. 7-11, the flywheels 52, 54 are mounted for counter-rotation within the containment device 68, with the lower flywheel 52 being mounted on a central shaft 118 and the upper flywheel 54 being mounted on a concentric tubular shaft 120. The resinous portions of the two flywheels, as previously mentioned, may be identical, with each having a central, splined bore 122. The bore 122 of the lower flywheel 52 then receives a correspondingly splined, metal hub 124. The upper flywheel 54 is similarly configured with a correspondingly splined metal hub 126 being received in the bore 122. Preferably the metal hubs 124, 126 are bonded into the resinous hubs 111 of the respective flywheels 52, 54. The inner diameter of the hub 126 is splined and engages a corresponding spline on the tubular shaft 120, while the inner diameter of the hub 124 is splined and engages a corresponding spline on the central shaft 118. The provision of the separate, metal hubs minimizes the weight of the flywheels, while at the same time, through the splined interfaces, provides sufficient strength to withstand the shear loadings between the shafts 118, 120 and the resinous hub portion 111 of the flywheels 52, 54, during transfer of kinetic energy to and from the flywheels, as will be further apparent from a later description of the mode of operation of the present regenerative braking system.

The lower end of the central shaft 118 is journaled relative to the lower containment device cover 74 by a ball bearing 128, which is vertically positioned relative to the bottom cover 74 by a snap ring 130. The central shaft 118 extends through and to the upper end of the tubular shaft 120 and is journaled relative thereto by an upper ball bearing 132 and a lower ball bearing 134. The bearing 132 is supported by a shoulder 136, which projects into the interior of the shaft 120. The bearing 134 is supported relative to the shaft 120 by a snap ring 138 mounted on the interior of the shaft 120. The tubular shaft 120 is then journaled relative to the upper, containment device cover 72 by a ball bearing 140. The weight of the lower flywheel 52 is carried by a snap ring 142, affixed to the central shaft 118, then by way of a snap ring 144 at the upper end of the shaft 118, though the ball bearing 132, to the tubular shaft 120 and then by way of a snap ring 146, through the bearing 140 to the top cover 72. The upper flywheel 54 is supported by a snap ring 148, on the tubular shaft 120, so that the weight of both flywheels, is carried through the tubular shaft to the snap ring 146 and bearing 140 to the top containment device cover 72. As previously described, the containment device is part of the load carrying, chassis sub-system of the electric car 30, so that the weight of the flywheels is thus integrated into and carried by the chassis or load carrying structure of the electric car 30.

The bearings 128, 132, and 140 may serve the function of providing a seal between the shafts 118, 120 and the stationary components of the containment device 68. The flywheels and the electrical components thereon (later described) are thus protected from dirt, dust, road splash, as well as oil from the overlying lubrication chamber. Additionally, this sealed containment device chamber may be evacuated by vacuum pump means (not illustrated) in order to minimize windage losses of the flywheels, which attain relatively high peripheral velocities, due to their large diameters, even though the flywheels have relatively low rates of rotation. The containment device must be of substantial dimensions and weight in order to perform its containment function. The weight penalty incident thereto is partially offset, since the strength of its components then has the capability of withstanding the stresses involved where the interior of the containment device is evacuated to minimize windage losses.

Reference is next made to FIG. 17 for a description of the electrical components of the flywheels 52, 54. The battery arrays, 48, 50 each comprise a plurality of voltaic cells 150, which are mounted in the compartments 112, 114 of the flywheels 52, 54. It has been shown that operating at high voltage levels yields superior performance characteristics, particularly in providing greater power output for a given weight of electric motor. To this end it is preferable that the voltaic cells in each of the compartments, 112, 114 be connected in series, and then the cells of each compartment 112, 114 are connected in series by conductors 152, 153. The electric circuit for the flywheel 52 comprises a conductor 154, 156 across which the potential of the battery array 48 is generated. The electric circuit for the flywheel 54 then comprises conductors 158, 160 across which the potential of the battery array 50 is generated. The battery arrays 48, 50 are then connected in series (by means later described) to the end of providing a voltage potential across conductors 154 and 162, which is the sum of the several voltaic cells on the flywheels 52, 54.

The voltaic cells can take many different forms. Essentially any voltaic cell chemistry can be employed. Conventional lead-acid cells are suitable. In today's state of technology development, the absorbed glass mat form of lead-acid battery offers the advantage of eliminating acid in its free liquid form, as above discussed. The absorbed glass mat battery has the further advantage of there being preexisting facilities for the controlled disposal of spent, lead based batteries in a manner that guards against pollution. Present state of the art batteries, representatively nickel-metal hydride give superior performance, providing superior performance, i.e., more storage capacity and kilowatt output per pound of battery weight than the lead acid type, but are not yet seen as being economically competitive. Although presently quite expensive, lithium polymer batteries give promise of even better performance, and also eliminate the disadvantage of a liquid electrolyte, which complicates the challenge of containment in a high G environment. The point is that any improvement in voltaic cell technology should be capable of use in the counter-rotating flywheels of the present invention.

It has been demonstrated that alternating current motors and alternating current generators (alternators) provide better efficiencies than their direct current counterparts. This fact dictated the selection of the alternator 62 as a current generator and the selection an alternating current motor 42.

An inverter/rectifier 164 provides a current conducting interface between these alternate current components and the direct current battery arrays 48, 50. This component, when functioning as a means to provide an alternating current source, is referenced as inverter 164. The same component, when functioning to provide direct current in recharging the battery arrays 48, 50, is referred to as rectifier 164. The motor 42 is connected to the inverter/rectifier 164 so that the direct current potential of the battery arrays 48, 50 may be converted to an alternating current input that powers the motor 42. Similarly, the alternating current output of the alternator 62 is converted into a direct current input for recharging the battery arrays 48, 50.

The components for conducting current between the motor/alternator/inverter and the flywheel battery arrays, include an interconnected, negatively biased, grounding circuit comprising a motor grounding conductor 166, an alternator grounding connector 168 and an inverter/rectifier grounding conductor 170. Similarly, the motor 42 has a positive input connector 172 which is connected to the alternating current output of the inverter 164. The alternator 62 has a positive conductor 174 providing a positive input to the rectifier 164. the invertor/rectifier 164 has a positive output/input conductor 176. The battery packs 48, 50 are then connected across the negative terminal conductor 170 and its positive terminal conductor 176 in the fashion now to be described.

Current flow to and from the flywheel mounted, battery arrays is provided by circumferential "rails" on the flywheels 52, 54, which are engaged by "shoes" that are mounted on the containment device casing 70 (structurally shown in FIGS. 11-16). In a broader sense, the "shoes" are relatively fixed conductors that conduct current to and from the rotating, conductive "rails". These components comprise a portion of common conductor means employed in energizing the motor 42 as well as in recharging the battery arrays 48, 50. Thus the electrical circuit between the inverter/rectifier 164 and the battery arrays 48, 50, comprises the ground conductor 170, which electrically connects to the lower flywheel 52 by way of a conductive shoe 178, riding on a rail 180. The electrical circuit continues, by way of conductor 154, to the battery array 48. Conductor 156, having a potential which is the sum of the several voltaic cells in battery array 48, then connects to a rail 182 which is also mounted on the lower flywheel 52.

The battery array 48 is then placed in series with the battery array 50, by way of conductive shoe 184, which rides on the rail 182. The electrical circuit continues to the upper flywheel 54 by way of a conductor 186 to a shoe 188 which engages a rail 190 that is disposed circumferentially of the upper flywheel 54; then to conductor 158, through the battery array 50 to conductor 162, rail 192 and shoe 194 to complete the circuit to the positive side of the input/output conductor 176.

The structure of the shoe and rail connections to the flywheels 52, 54 will be further described with reference to FIGS. 11-16. Each of the shoes is mounted, respectively, in radial alignment (relative to the flywheel) with the conductive rail which it engages. Each shoe has a circumferentially elongated, rail engaging portion a (FIGS. 11, 15) and a stem portion b which is slidably mounted in a dielectric tube 196, which, in turn, is mounted on a plate 198. Openings 200 are provided in the containment device casing 70 for each of the shoes. The openings 200 are angularly and vertically offset to minimize the diminution of strength caused by the openings. The conductive shoes are positioned to engage the respective rails, by the plates 198 which are secured to the casing 70 by screws 202. The shoes are yieldingly maintained in engagement with the respective rails by springs 204 acting between the outer end of the stems b and a cap 206 threaded on the outer end of each of the tubes 196. The tubes 196 are provided with flanges 208, which capture the spring loaded shoes in the space between the plates 198 and the flywheels. Additional means, not shown, can be provided to prevent rotation of the shoes and thus maintain the elongated portions a in alignment with the rails.

The described use of relatively fixed shoes engaging rotating rails enables current to be efficiently conducted to and from the flywheel mounted battery packs 48, 50, with a minimum of losses due to generation of extraneous eddy currents. This advantage is primarily attributed to the minimization of rotating, flywheel carried conductors which could interact with stationary conductive components to generate eddy currents which would represent system energy losses. More important, the minimization of flywheel conductors minimizes the generation of eddy current losses by reason of their counter rotational, relative movement.

Excepting FIG. 16, showing the connection between conductor 162 and rail 192 and the illustrations of the shoes and rails in several Figs., the electrical connections to and from the battery means carried by the flywheels are shown only diagrammatically in the drawings. The inverter/rectifier 164, in theory, could be located in many different locations on the chassis of the car 30, since it requires only electrical conductor connections to the conductive shoes on the containment casing 70 and to the motor 42 and the alternator 62 as well as control signal means that will later be described.

However, the invertor/rectifier can most advantageously be mounted beneath one of the seats of the car, preferably the right, passenger seat 38 (FIGS. 1-3). To this end a compartment 210 is defined in part by a bracket 212 secured to the containment device 68 by bolts 80 that also secure the flange 78 of the upper cover 72. The compartment 210 is also defined by a lower plate 214 that is supported on the upper surface of the flange 78 of the lower cover 74, as well as by the upper surface of the chassis bar 98. The plate 214 may extend forwardly to form the floor board of the occupant compartment. A plate 216, also supported by the chassis bar 98, as well as by the plate 214, and secured to the containment device 68 by screws 218, defines the forward portion of the compartment 210, as well as the rear of the occupant compartment, beneath the right hand seat S2. The upper extent of the compartment 210 is defined by a plate 220 supported by the plate 216 and the bracket 212. The compartment is closed by a side plate 222 that is secured by screws or other readily removable means to provide access to the inverter/rectifier 164 for maintenance and repair or to set proper timing for signal generating parameters that are later discussed.

Even though the battery means employed in powering the electric car 30 are constantly being recharged (either during regenerative braking, or at external recharging stations), they have a finite operating life. The operating life can be extended by establishing vehicle operating cycles that minimize the extent to which the battery is discharged (preferably maintaining the charge above 50% of the total battery capacity). Even so, the battery arrays 48, 50 will ultimately require replacement.

To facilitate such replacement, the flywheels are mounted in a fashion which enables them to be readily removed and replaced.

The first step would be for the car 30 to be elevated on a lift, or otherwise positioned to provide ready access to the lower portions of the containment device 68. As a preliminary to removing the flywheels 52, 54, the four conductive shoe (178, 184, 188, 192) assemblies are freed by first removing the screws 202 so that the plates 198 can be freed from the casing 70 and the shoes withdrawn through the respective openings 200.

The next step would be to remove all of the several bolts 80 that secure the bottom cover 74 to the casing 70, as well as the lower two bolts 218 (FIG. 6), which secure the lower end of the vertical plate 216. It is to be noted that the removed bolts 80, also secure brackets 82, 84, and 92 to the containment device 68. These brackets are connected by vertical portions that interconnect them to corresponding bracket portions that are also connected to the containment device 68 by other bolts 80 that connect the casing 70 to the upper cover 72. Since there are no dynamic stresses on the auto during the changing of the flywheels, this partial disconnection of chassis components does not adversely impact the structural integrity of the car 30. (When these components are later reconnected, the car is restored to full functional strength.) The lower containment device cover 74 can now be removed (it is simply slid off the bottom of shaft 118, as the cover is lowered from the casing 70) to provide access to the interior of the containment device and to the flywheel support components.

Power assists, or leverage devices will normally be required to assist in removal and reinstallation of the flywheels 52, 54 inasmuch as each, advantageously weighs in the order of 300 pounds, or more. This is to point out that it is an object of the invention to carry all of the car's battery mass on the flywheels, in order to obtain as much advantage as possible from the energy storage capability of the flywheels. In order to maximize the battery mass and the load carrying capacity/operating range of the car it is desirable to maximize the weight of the batteries. This end also involves employing a flywheel diameter that approximates the lateral spacing between the car's wheels, which has the further advantage of minimizing the "G" forces on the battery cells.

To digress for a moment, the preferred automobile configuration for a two seated, commuter service cycle has a flywheel diameter which approximates a four foot diameter, such being the approximate lateral spacing between the rear wheels of this type of car. It is also desirable, in a sub-compact configuration, for the length and height dimensions be minimized, in order to minimize gross vehicle weight, as well to minimize the foot print (floor space) of the car, thereby permitting a greater number of cars to be parked in a given area and permitting a greater number of cars to travel on a given stretch of highway. The compact configuration also enables the drag coefficient to be reduced and thereby contribute to the overall efficiency of the car.

These ends are facilitated by a containment device height which enables the seats 36, 38 overlie, in part, the forward portion of the containment device (or the forward portion of the flywheels, should it develop that a containment device was not required). It has been found that a flywheel height in the order of 5.5 inches can be employed in accomplishing these ends, which, in turn, provides sufficient battery mass to provide a range/load capacity capability which is at least comparable today's battery driven vehicles.

At this point, it will also be noted that the disposition of the drive train 58, connecting the flywheels and the front wheels 34, overlying the containment device and extending between the seats 36, 38 also contributes to the compactness of the car 30, particularly in connection with its length, making possible a wheel base length in the order of 76 inches.

Back to the task of replacing flywheels, their weight is such that power assists will be required. Removal of the bottom cover 74 provides the room necessary for use of power assists in removal and replacement. Thus lifting means can be deployed to raise the flywheel 52 (FIG. 7) so that the snap ring 142 can be removed. The flywheel 52 is then removed by lowering it beneath the containment device casing 70 so that it can be carried away on a dolly or through the use of other appropriate means. Next, the power assist means can be used to raise the flywheel 54 sufficient for the ready removal of snap ring 148. The flywheel 54 can then be lowered in a controlled fashion (by power assist means) downwardly from the splined shaft 120, beneath the level of the casing 70 and then laterally, on a dolly or the like. A new flywheel 54 can then be mounted on the shaft 120, again being support by the snap ring 142. Similarly, a new flywheel 52 can be mounted on the lower, splined end of the central shaft 118 and the snap ring 142 put back in place to support the flywheel 52 in its operative position. The removed bolts 80 and 218 can then be reused to return the containment device/chassis components to their initial, assembled relation.

Figure 6:
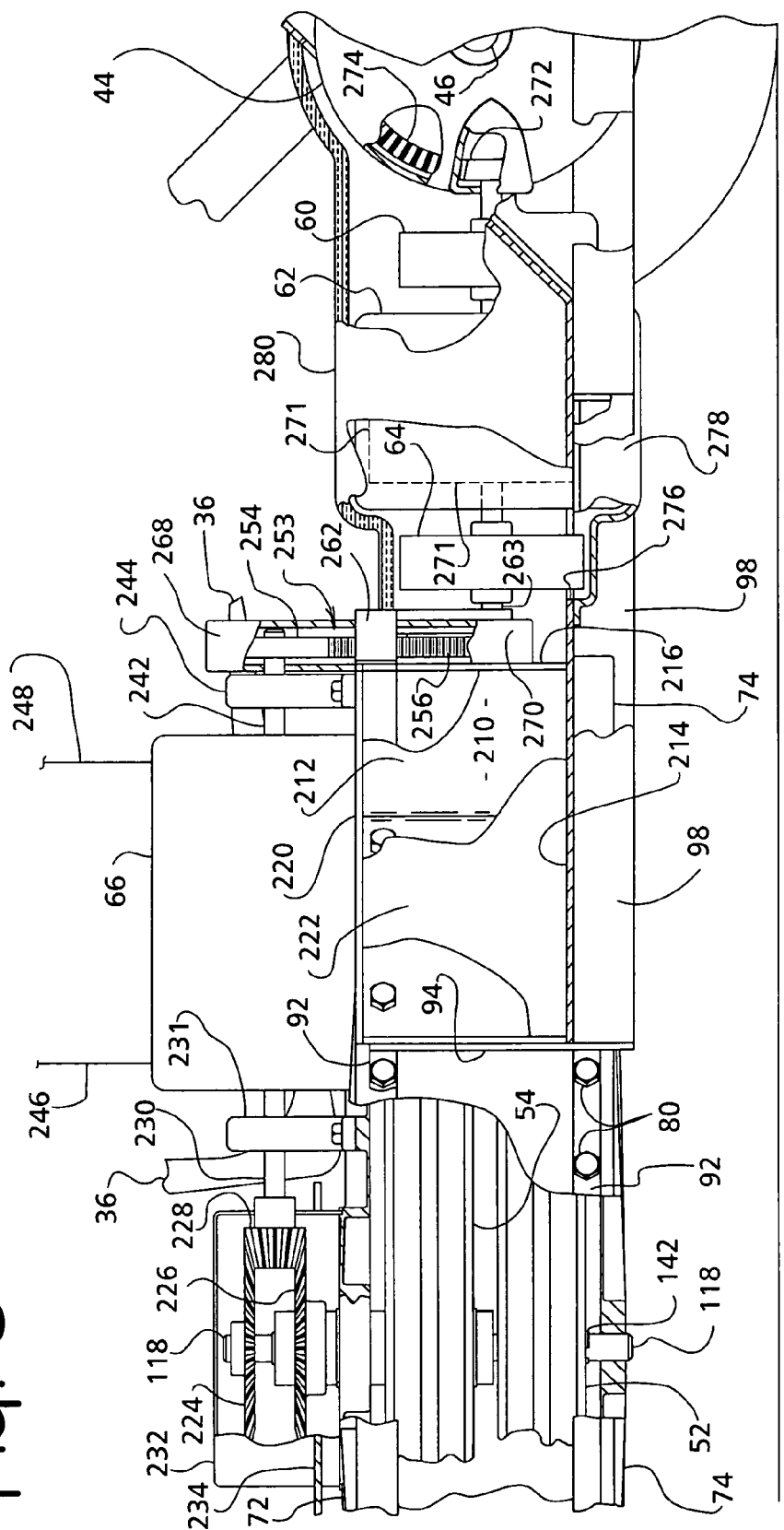
FIG. 6 is a section, on an enlarged scale, taken generally on line 6-6 in FIG. 2.

Next to be described in additional detail is the power train 58, that is adapted to connect the battery mass flywheels 52, 54, with the differential 44 and the drive wheels 34, having further reference to FIGS. 6 and 7. Bevel gears 224, 226 are secured, respectively, to the upper ends of the flywheel shafts 118, 120 and mesh with a gear 228, that is mounted on a flywheel input/output shaft 230. The shaft 230 is journaled on a pillow block 231. This miter gear set is disposed in a sealed lubrication chamber defined by a cylindrical housing 232, which is sealingly mounted in a groove formed on an upper surface of the containment device's upper cover 72. Clamping means (not shown) are provided to maintain the housing 232 in place so that the integrity of this lubrication chamber will be maintained during operation of the car 30. The described flywheel shafts 118, 120 and miter gear set (224, 226, 228) and the journals therefor, provide means for rotating the flywheels 52, 54 in opposite directions about a common vertical axis. In addition to the ease of removal and reinstallation of the flywheels 52, 54, the described construction has the further advantage of facilitating operation of the miter gear set in a closed, lubricating atmosphere, as lubrication provide within this chamber is maintained therein to provide continuous lubrication for the miter gear set at all times. In this connection, note that the bearing 140, for the shaft 120, is of the grease sealing variety and that the outer race of the bearing 140 is in sealing engagement with the upper cover 72, so that there won't be any escape of lubrication through or around the bearing 140.

The described shaft and gearing arrangement has the further advantage of enabling ready replacement of these components. The lubricating chamber housing 232 may removed to provide access to the miter gear set. Note that this gear set and the housing 232 are conveniently disposed in the cargo space immediately behind the seats of the car. It will also be seen that a floor board 234, for supporting items in the cargo space, need not be removed in order to gain access to the miter gear set. Once access is had to the miter gear set, a taper pin 236 may be removed to permit the upper bevel gear 224 to be lifted off the shaft 118. A taper pin 238 can then be removed, permitting gear 228 to be slid on its shaft 230, outwardly of the vertical outline of the bevel gear 226. A set screw 240 is then loosened, permitting the gear 226 to be removed from the shaft 120. Thus it is possible to access the miter gear set and repair or replace the miter gears, 224, 226 or 228 as the need may arise.

Also, if the flywheels 52, 54 have been removed in the fashion above described, the shafts 118, 120 and bearings 132, 134 can then be lifted as a unit from the top containment device cover 72. It will also be seen that, once the tapered pin 236 and set screw 240 are removed, snap ring 146 can be removed, to permit the assembly comprising shafts 118, 120 to be dropped through the bottom of the containment device.

As an alternate to the previously described method of removing the flywheels 52, 54, the lower containment cover 74 can be removed as above as indicated. then the shafts 118, 120 can be freed from the gears 224, 226 by removal of the tapered pin 236 and set screw 240. Once this is done, removal of the snap ring 146 frees the entire flywheel assembly, so it can be dropped from the bottom of the containment device as a unit.

As discussed above, the bearing and its associated mounting means function as a seal to prevent escape of lubricant from the lubrication chamber for the miter gear set. This seal may be enhanced by further sealing means to provide a hermetic seal at the top of the containment device. Similarly the bearing 128 and its associated mounting means alone or in combination with ancilliary provides a hermetic seal at the lower end of the containment device. The containment device is thus a sealed chamber that is maintained free of foreign matter and which may be effectively evacuated to minimize windage losses.

Continuing with a description of the power train 58, the variable transmission 66, mounted on the upper surface of the top containment device cover 72, includes, at one end, a drive connection with the input/output shaft 230 and, at its opposite end, a drive connection with a second input/output shaft 242 that is journaled on a pillow block 244. The shafts 230, 242 always rotate in the same direction (either clockwise, or counterclockwise). The shaft 242 will be the driving, or input shaft to the transmission 66, when energy is transferred from the wheels 34, through differential 44 to the flywheels 52, 54, in order to decelerate the car. The shaft 230 becomes the driving shaft providing a power input to the transmission 66, when energy from the flywheels 52, 54 is being used to provide motive power for the car and/or to drive the alternator 62.

The transmission 66 can take different forms, employing various combinations of planetary gear/fluid transmissions, variable pitch cone pulley drives and other variable speed forms of power transmission. The transmission 66 is characterized by means for varying the internal gearing and coupling means so that the input shaft (230 or 242) speed will always be such that torque will be transmitted to the output (230 or 242), as energy is transferred to or from the flywheels. The transmission 66 needs also to be characterized by means for selectively establishing either the shaft 230, or the shaft 242, as the input shaft. In furtherance of this last end, conductors 246, 248, connect control means in the transmission 66 with a signal generator 250. The control means in the transmission 66 is responsive to an energy recovery signal on conductor 246 (also energy recovery signal 246) to shift the speed ratios between the transmission shafts 230, 242 so as to establish the shaft 230 as the drive shaft to the transmission when energy from the flywheels is recaptured either by accelerating the car, or by recharging the battery arrays 48, 50. The transmission 66 is then responsive to a demand signal on conductor 248 to shift the speed ratios between the transmission shafts 230, 242 so as to establish the shaft 242 as the driving shaft of the transmission, when energy is transferred to the flywheels in decelerating the car. It is also preferable that the control means for the transmission 66, establish a speed differential, between the input and output shaft of the transmission, which is proportional to the strength of the energy recovery signal 246, or the strength of the demand signal 248, as the case may be. The last mentioned capability enables the rates of acceleration and deceleration to be under an operator's control, as will be later discussed.

Continuing with a description of the power train 58, it progresses from the transmission 66 to a gear train 253 comprising gears 254, 256 and 258 (see also FIG. 3). The primary function of this gear train is to permit the alternator 62 to be disposed at a lower level and thereby minimize the intrusion of the regenerative system components into the passenger compartment of the car 30. The gear 254 is mounted on the transmission shaft 242, idler gear 256 is journaled by a shaft 260 on a bracket 262, that is secured to the containment device 68. The lower gear 258 is mounted on a shaft 263 on the rear side of the clutch 64, which shaft is also journaled on the bracket 262. The gear train 253 is enclosed in a lubrication chamber defined in part by covers 268, 270. The forward side of the clutch 64 is connected to the rotor 271 of the alternator 62. The rotor 271, or the shaft therefor, is a load carrying member of the power train between the differential 44 and the flywheels 52, 54. The forward end of the alternator rotor shaft 271 is connected to the rear side of the clutch 60. The forward side of the clutch 60 is then connected to a pinion 272 that meshes with a bevel ring gear 274 of the differential 44.

The lower portions of the clutches 64, 60 and the alternator 62 may be partially extended through an opening 276 formed in the floorboard 214, again for the purpose of minimizing the intrusion of these components into the occupant compartment. The alternators 60, 64 and clutch 62 would also be appropriately supported from the chassis of the car 30 by means not illustrated. A dust pan 278 underlies the floorboard 214 to seal the opening 276. A sound absorbing shield 280 overlies the clutches and alternator to minimize the noise level in the passenger compartment.

A controlling factor with respect to the dimensions of the alternator is that it is desirable to maximize its diameter in order that significant electrical generation can be had at relatively low speeds. The end of maximizing electricity generation is also facilitated by stepping the speed of rotation up from the ring gear 274 to the pinion 272. The gear train 258, 256, 254 can have the further function of stepping the input speed to the transmission 66 to a lower level in order to minimize the velocity ratios across the transmission 66 in maintaining the operating speed of the battery mass flywheels 52, 54 at a safe, relatively low level.

The drive input (43) from the motor 42 to the differential 44 is made by way of a pinion 282 (FIG. 5), on the motor's output shaft, which meshes with a circumferential helical gear 284 on the periphery of the ring gear 274 of the differential. With this arrangement, a drive input from the flywheels and a drive input from the motor 42 may be integrated in providing a power output to the front wheels 34. Power from the motor and/or the from the flywheels can thus be delivered to the wheels 34 in essentially the same fashion as conventional front wheel drives presently known in the automobile art, with a substantial increase in peak acceleration.

The invention will now be further explained by a description of the various operating modes of the electric car 30, looking first to FIG. 17 in order to complete a description of the means for generating signals that control energizing of the motor 42 and flow of energy to and from the flywheels 52, 54 in the regenerative braking of the car 30.

The power demand pedal 56, when depressed, transmits a demand signal, either mechanical or electrical) through line a 286 (also reference as a power demand signal 286) to the signal generator 250. This demand input provides the previously referenced energy recovery signal that is transmitted through line 246 (also signal 246) to the transmission 66 and establishes shaft 230 as the driving shaft for transmission of kinetic energy from the flywheels 52, 54 through the alternator 62 and then to the differential 44, in providing motive power input to the front wheels 34, when the is rotational energy in the flywheels 52, 54. The demand signal 286 to the signal generator 250 also results in the generation of an energizing signal that is carried on line 288 to a motor controller 290, which, in turn, energizes the motor 42 from the alternating current provided through inverter 146 and provides a power input to the differential 44. There are thus two potential sources of motive power for operation of the car, namely battery power from the arrays 48, 50 and, when available, motive power from the flywheels 52, 54.

The brake pedal 57, when depressed, provides a braking demand signal, that is transmitted through line 292 (also signal 292), to the signal generator 250. The signal generator then generates a flywheel braking signal that is transmitted through line 248 (also signal 248) to the transmission 66. In response to this braking signal, the shaft 242 becomes the driving shaft for the transmission 66 so that the energy can be transmitted to the flywheels 52, 54 from the differential 44 and the front wheels 34, to thereby decelerate the car 30.

The clutches 60, 64, which are normally disengaged, may be engaged in response to a signals that are transmitted from the signal generator 250, by way of lines 294, 296, respectively. These clutching signals are generated in response to operating conditions that will be referenced in the following description of the several operating modes of the car 30.

Initial, or cruise, operation of the car 30 is illustrated in FIG. 18, at a time when the flywheels are at rest. Motive operation of the car is initiated and maintained by depression/pivoting of the power demand pedal 56 from its rest position (indicated by broken lines). Such displacement results in a power demand signal being transmitted to the signal generator 250 by way of line 286 (for sake of convenience, signals may simply be referenced by the reference character which, more precisely designates the line or conductor transmitting the signal). This, in turn, generates an output signal 288 the strength of which is proportional to the degree to which the pedal 56 is displaced. The signal on line 288 actuates the controller 290 to the end of energizing the motor 42 (from the inverter 164) at a power level which is proportionate to the extent to which the pedal 56 is displaced.

If operator pressure on the pedal 56 is released, it returns to its rest position, thereby terminating the power demand signal to the signal generator 250. Whereupon the energizing circuit for the motor 42 will be terminated. The car is then essentially in a freewheeling state and will begin to decelerate, assuming that it is not on a down grade.

The initial state of controlled deceleration may be initiated by a first incremental depression of the brake pedal 57 from its rest position (illustrated in broken lines), reference FIG. 19. At this point it will be noted that there is a flywheel speed signal input 308 to the signal generator 250. Whenever flywheel speed is below a predetermined value (indicating that there is little or no energy in the flywheel) signal 308 causes a flywheel braking signal 248 to set the transmission 66 for the transfer of energy to the flywheels 52, 54. Thus in sequencing from the cruising state of FIG. 18 to the flywheel braking state of FIG. 19, flywheel braking is invoked, when energizing signals 294, 296 (generated in response to brake signal 292) cause clutches 60, 64 to be engaged. The power train 58 from the differential 44 to the flywheels 52, 54 is thus established so that there is a transfer of kinetic energy to the flywheels 52, 54 to thereby effect the initial deceleration of the auto 30.

Further depression of the brake pedal 57, beyond an initial increment of movement, indicates a demand for more rapid deceleration, and causes generation of a field excitation signal 297 (FIG. 20) for the alternator 62, to the end that kinetic energy of the car's movement is also transformed into electrical energy, as the current generated by the alternator is fed by way of conductor 174 to rectifier 164 then employed to recharge the battery arrays 48, 50.

The flywheels 52, 54 are, in fact, an energy reservoir. They have a finite, energy storage capacity, which is defined by their mass and physical dimensions, and more important, by their maximum, safe rotational speed. Once that speed has been reached, further deceleration energy cannot be transferred to the flywheels, without incurring an increased risk and ultimately, a certainty of the structural failure of the flywheels. Once the maximum safe speed has been reached, further deceleration of the car 30 must be had by means of alternator braking or friction braking.

The flywheel speed signal 308 (FIG. 20A), as indicated above, is provided as an input to the signal generator 250. Responsive to the signal 308 indicating that the flywheels 52, 54 have reached their maximum safe operating speed, the energizing signal 296 for clutch 64 is terminated. The clutch 64 is disengaged so that there can be no further transfer of kinetic energy to the flywheels. When the flywheels reach their maximum safe operating speed brake pedal 57 is, of course, depressed and clutch 60 remains in its engaged state so that the alternator 62 continues to be drivingly connected to the differential 44. At the same time (if it has not already occurred by depression of the pedal 57 beyond its initial increment of movement) a field excitation signal 297 will be provided by the signal generator to energize the alternator 62 so that regenerative braking is then provided, as kinetic energy is transformed to electrical energy by recharging the battery arrays 48, 50. There can thus be a seamless changeover from flywheel braking to alternator braking. If, at the time the maximum safe operating speed for the flywheels is reached, flywheel/alternator braking (FIG. 20) has been invoked, the alternator braking will be continued, but, with the loss of flywheel braking, it is likely that the desired rate of deceleration will not be achieved. Increasing pressure on and displacement of the brake pedal, will then invoke friction braking in the fashion next to be described.

Reference is made to FIG. 21 for a description of the friction braking means of the present invention. The friction braking elements, which may be of conventional design and construction, are diagrammatically illustrated by a brake shoe 298 which is engageable with a brake drum 300 (there being braking elements for each wheel in the usual vehicle). A hydraulic control system 302 is adapted to be responsive to displacement of the brake pedal 57 to bring the brake shoe 298 into frictional engagement with the drum 300.

When the rate of deceleration provided by flywheel/alternator deceleration is insufficient, particularly illustrated by the necessity for a panic stop, continued displacement of the brake pedal 57 brings it to an extreme position in which a switch 304 is engaged. This engagement provides a signal input, on line 306 which actuates the hydraulic control system 302. Thus there can also be a seamless transition from flywheel, alternator braking to friction braking. At any time, either of these regenerative forms of braking fails to provide a desired rate of deceleration, there will be an intuitive continued pressure on the pedal 57 which will result in closure of the switch 304 and actuation of the friction braking system.

In response to actuation of the friction braking system. the signal on line 294 is terminated, thereby disengaging the clutch 64. The friction braking system and the alternator braking system thus combine to decelerate the car. Once the hydraulic system is actuated, the pressure of the braking pad 298 on the drum 300 is directly proportional to the degree of displacement of the pedal 57, in response to a signal input by way of line 311, to the hydraulic system 302. In the event of the need for a panic stop, a person's reflexes will maintain the pedal in its position of maximum displacement and the car will literally come to a screeching halt. Otherwise, pressure on the brake pedal will be reduced, reducing the extent to which the pedal is displaced, resulting in a reduced pressure on the pad 298 to obtain deceleration a desired, controlled rate rather than initiating a panic stop. The transition from flywheel braking to friction braking can thus be essential seamless.

It is to be noted that once friction braking has been invoked, it is preferable that this mode of braking be maintained in effect until the brake pedal is released to its rest position, indicating at least a temporary end of the need for reducing the velocity of the car. To this end, a feedback signal is provided through line 312, to the signal generator 250, indicating that the friction braking mode is in operation. The signal generator includes means, for generating a hydraulic lock-in signal 310 for continuing actuation of the hydraulic control system 302. Release of the brake pedal 57 transmits a signal by way of line 292 to the signal generator 250, to indicate termination of a demand for deceleration of the car.

If, when friction braking is terminated (by release of pedal 57), flywheel speed is too high to permit transfer of a significant quantum of energy thereto, friction braking is maintained as the primary braking mode. The maximum flywheel speed at which flywheel braking can be invoked is arbitrarily set at say 90% of maximum safe operating speed. Thus, if at the time of a brake signal 292 is terminated, there is a flywheel speed signal 308 indicating a flywheel speed in excess of 90% of maximum safe operating speed, the signal generator 250 will maintain the hydraulic lock-in signal 310. The hydraulic system 302 will then be responsive to any subsequent displacement of the brake pedal 57 to invoke friction braking.

After release of the brake pedal 57, the hydraulic lock-in signal 310 will be terminated whenever the flywheel speed signal indicates to the signal generator 250 that flywheel speed has dropped below 90% of maximum safe operating speed or whatever speed is selected as being sufficient to permit significant flywheel braking capability.

The flywheel braking structure and alternator braking structure provide a large degree of flexibility in the returning braking energy to the overall energy system of a car. As described, when friction braking is invoked, alternator braking is maintained in effect and a portion of braking energy continues to be recaptured through recharging of the battery arrays 48, 50. Alternatively, the signal generator 250 can be programmed to be responsive to a flywheel overspeed signal 308 to prevent further transfer of energy to the flywheels by terminating the signal 294 to disengage the clutch 60. Thus, during friction braking, flywheel energy can be recaptured as chemical energy by maintaining the engaging signal 296 for the clutch 64 and the excitation signal 297 thereby to recharge the battery arrays 48, 50.

It is preferred that braking energy, transferred to the flywheels 52, 54, be returned to the energy system of the car 30 in response to the next subsequent power demand signal 286, as is illustrated in FIGS. 22 and 23. The availability of flywheel energy is indicated by the speed signal 308 to the signal generator 250, which then provides an energy recovery signal 246 to the transmission 66. When the power demand pedal 56 is depressed, the signal generator 250, in response to demand signal 286, sets the strength of the signal 246 proportionate to the extent to which the pedal 56 is displaced, thereby setting the speed ratio of the transmission in proportionate fashion. Energization signals 294, 296 also cause the clutches 60, 64 to be engaged. Note, that shaft 230 may already have been set as the drive shaft and clutch 64 engaged, by reason of a prior invoking of friction braking, as discussed above. Simultaneously the signal generator 250 provides an energizing signal on line 294, causing the clutch 60 to be engaged. There is thus provided a motive power input from the flywheels to the differential 44 and the drive wheels 34, thereby returning the stored braking energy as motive power for the car.

FIG. 23 illustrates the more likely mode of flywheel energy recovery wherein both flywheel energy and battery energy are employed in reaccelerating the car 30. In this fashion more rapid rates of acceleration can be attained, thereby making this alternative energy source more commercially attractive. Additionally, the flywheel power assist minimizes the rate of current drain from the batteries and thereby decreases the rate of battery discharge and contributes to longer battery life.

The mode of flywheel reacceleration illustrated in FIG. 22 is initiated by a first incremental displacement of the power demand pedal 56. In FIG. 23, the pedal 56 has been displaced beyond that first increment of movement. In response thereto, the signal generator 250 provides an output signal (288) actuating the motor control 290 and energizing the motor 80 to provide a power input to the differential 44. The flywheels are also drivingly connected to the differential 44 as before described. The differential 44 then acts as a mechanical integrator to combine the power inputs from the flywheels and the motor in reaccelerating the car 30.

When all, or substantially all of the kinetic energy has been recaptured in powering the car, as reflected by the flywheel speed signal (308), the signal generator 250 has means, responsive thereto, for canceling the clutch energizing signals (294, 296) whereupon the clutches 60, 64 disengage and operation of the car reverts to the cruising mode illustrated and discussed in connection with FIG. 18.

The described regenerative system is optimized to first convert car kinetic energy to flywheel rotational energy and then to recapture flywheel energy as motive energy. Secondarily car kinetic energy is converted to electrical energy. In recapturing braking energy it is likewise preferred to recapture flywheel energy by using it to power motive operation of the car. When the car goes out of service, i.e., the "ignition" is turned off, any energy remaining in the flywheels is employed to recharge the batteries, as will be later be described in connection with a further embodiment of the invention.

These priorities minimize the number and extent of battery charging-discharging cycles, and thus significantly prolong battery life of lead-acid batteries, all to the end of making battery powered cars more economically attractive. Another factor that leads to the preference of transferring kinetic energy to the flywheels and then recovering this braking energy in powering the car, is that the rate of recovery of energy by recharging lead-acid is relatively limited, particularly in that the amount of energy that can be recovered in a given length of time is limited by the nature of the chemical process that is involved.

It is to be recognized that the same basic, series related components, i.e., flywheels, a bi-directional, variable transmission, a first clutch, an alternator, a second clutch, and a car transmission connection (differential 44) could be otherwise programmed to minimize the transmission of power to and from the flywheels. Such an approach would be attractive when using batteries that could be more efficiently recharged. Super capacitors hold promise for the more effective recharging of lead-acid batteries. Also other battery chemistries have the potential for more efficient recharging that could lead to a greater reliance on recapturing braking energy in the batteries.

To accomplish this alternate end first using the batteries as the primary reservoir for braking energy, the clutch 60 would be first engaged to drive the alternator. Alternator braking would thus be the first form of regenerative braking. The clutch 64 would be secondarily engaged to provide additional regenerative braking by transferring energy to the flywheels. Further, the alternator 62 would be maintained in an energized state whenever possible, to convert the maximum possible amount of flywheel energy to electrical energy, rather than attempting to return it to the system as motive power.

Another option would be to program the signal generator 250 so that only a portion of flywheel energy would be employed in the reaccleration of the car. This has the disadvantage of reducing the energy reservoir of the flywheels that would be available for a subsequent braking action. But by reserving energy in the flywheels, it is possible to assure that there will be a substantial power assist for the motor 42 should there be a need for a subsequent reacceleration before additional braking energy has been transferred to the flywheels. The need for, and desirability of, a flywheel power assist goes to the fact that there is a limitation on the rate at which current can be drawn from the battery arrays 48, 50 to power the motor. Additionally, battery life is adversely impacted as the rate of battery discharge is increased to power acceleration of a car a rate sufficient for safety purposes, as well as sufficient to satisfy demands of the market place. Thus having the ability to supplement acceleration of the car by means of flywheel energy is desirable as frequently as possible.

It will be apparent that the foregoing described flywheels and alternator and the manner in which they cooperate in decelerating the vehicle, function as a regenerative system for recovering energy that would otherwise be lost if reliance were had solely on friction braking for deceleration. It will also be apparent to those skilled in the art that such a regenerative system can recover other energy that is normally lost in the operation of a vehicle. This point is exemplified by regenerative systems that recover energy that is normally lost in shock absorbers by converting such energy into electrical energy. Illustrative of such regenerative systems are U.S. Pat. Nos. 3,861,487 and 4,387,781. Another use of such a regenerative system would be in a fork lift vehicle where the energy of resisting lowering of a load could be converted to flywheel wheel energy and electrical energy.

Reference is next made to FIGS. 24-32 for a description of alternate embodiments of the invention in which the alternator, for recharging the battery arrays and transforming flywheel energy into electrical energy, is directly coupled to the flywheels to the end that only a single clutch is employed, as opposed to the two clutches of the previous embodiment. These alternate embodiments have the further advantage of simplifying the drive train (58') between the differential 44 and the flywheels 52, 54, thereby enabling the use of a shorter wheel base and/or a larger flywheel diameter. Additionally the intrusion of regenerative system components into the passenger chamber is minimized.

FIG. 27 provides a diagrammatic representation of the first of these alternate embodiments, in which an alternator 62' is adapted to be driven from the upper flywheel 54 of a car 30'. A modified power train 58' differs from the power train 58 in the omission of an alternator and the provision of only a single clutch 314 between the transmission 66 and the differential 44.

Figure 24:
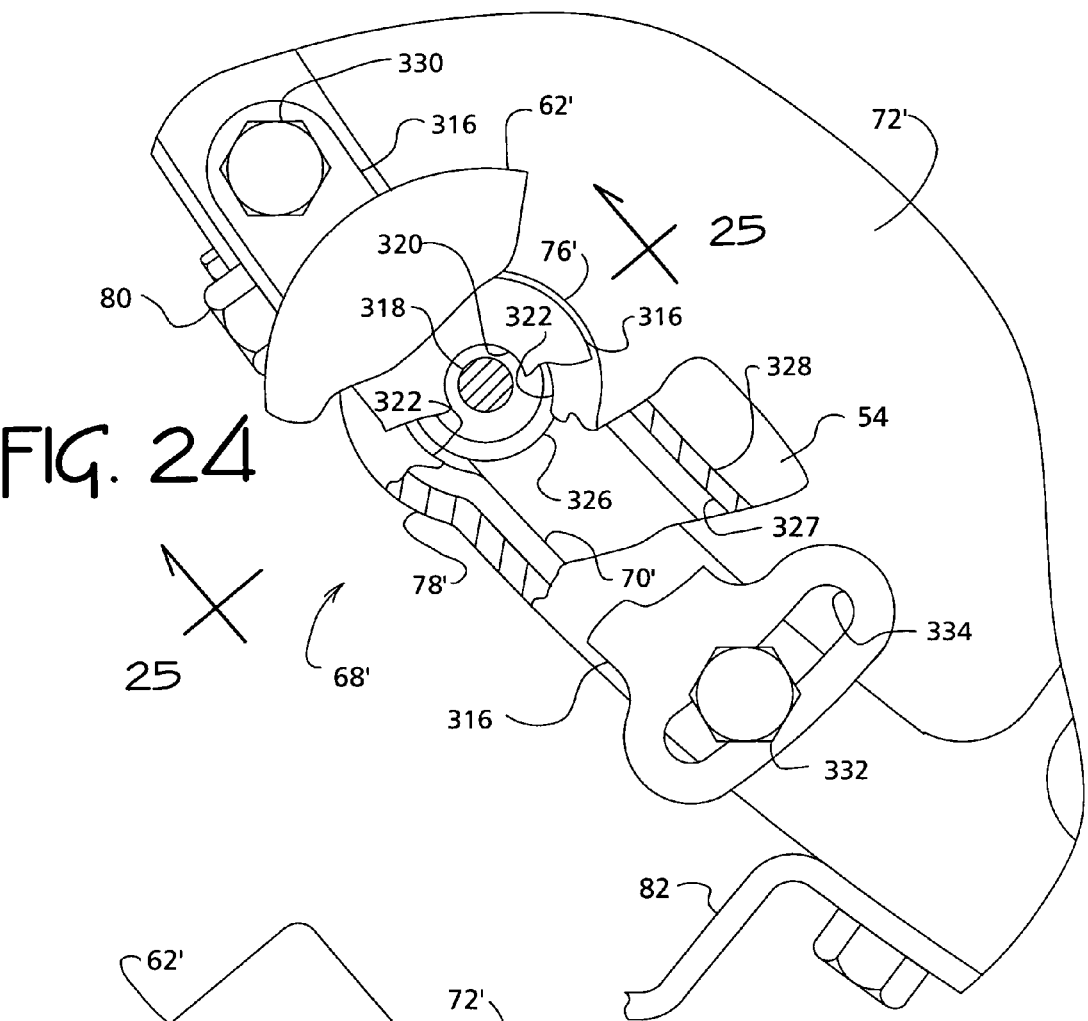
FIG. 24 is a plan view, on an enlarged scale, of a portion of a modified containment device illustrating an alternate mounting of an alternator employed herein.
Figure 25:
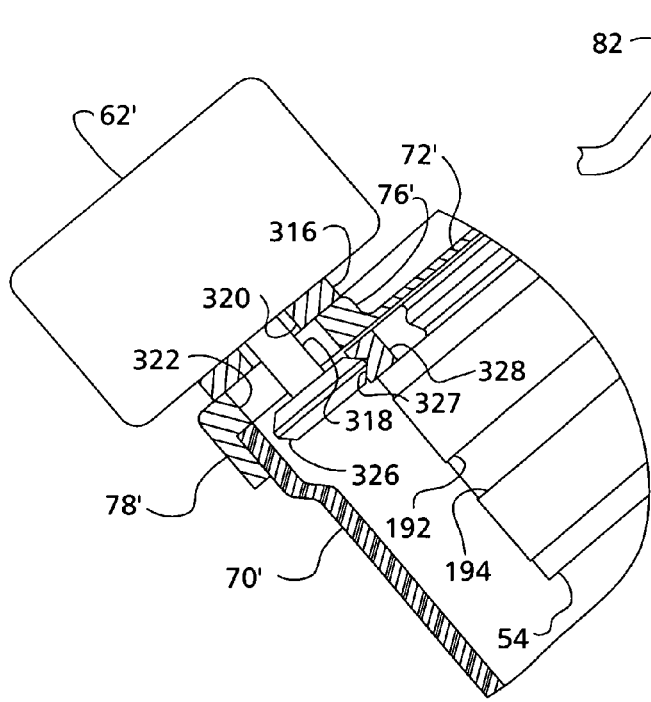
FIG. 25 is a view taken on line 25-25 in FIG. 24.

FIGS. 24 and 25 illustrate structure that may be employed in providing a flywheel driven alternator. The alternator 62' may be conveniently located in the right rear quadrant of the containment device 68', being mounted on a bar 316, which, in turn, is mounted on a modified rim 76' of the upper cover 72' of the containment device. The rotor shaft 318 of this alternator extends through a hole 320 in the bar 316 and then through a larger hole 322 in the peripheral rim 76', which has also been modified, along with the adjacent portion of the containment device casing 70' to provide clearance for a roller 326. The roller 326 is secured to the lower end of alternator shaft 318 and is drivingly engaged with a groove 327 in a circumferential rim 328 mounted on the upper surface of the flywheel 54 for rotation therewith. The alternator 62' is thus driven directly from the flywheel 54 at all times.

The alternator 62' is responsive to a field excitation signal 329 from the signal generator 250 to generate electricity, which is fed to the rectifier 164 by way of conductor 174 and employed to recharge the battery arrays 48, 50 in the same fashion as the alternator 62' (FIG. 27).

The alternator mounting bar 316 (FIGS. 23 and 24) rests on the rim 76' and is pivotally secured thereto, at one end, by a shoulder screw 330. The opposite end of the bar 316 is secured to the rim 76' by a screw 332, which extends through a slot 334 in the bar 316 and is threaded into the cover rim 76'. With this arrangement the bar 316 can be angularly positioned relative to the top cover 72' to bring the roller 326 into and out of driven engagement with the flywheel rim 328. Additionally, the roller 326 can be swung clear of the rim 328 to allow the flywheels to be removed downwardly for maintenance and repair, as described above in connection with the first embodiment. Also the alternator 62' can be removed for maintenance and repair simply by removal of the screws 330, 332. The opening 322 is large enough for the roller 326 to pass through it so that the alternator 62' can may be independently removed for replacement or repair. It is noted that the top cover 72' and the casing 70' are the only components of the containment device housing 68' that require modification in order for the generator to be driven from the flywheel system.

Figure 26:
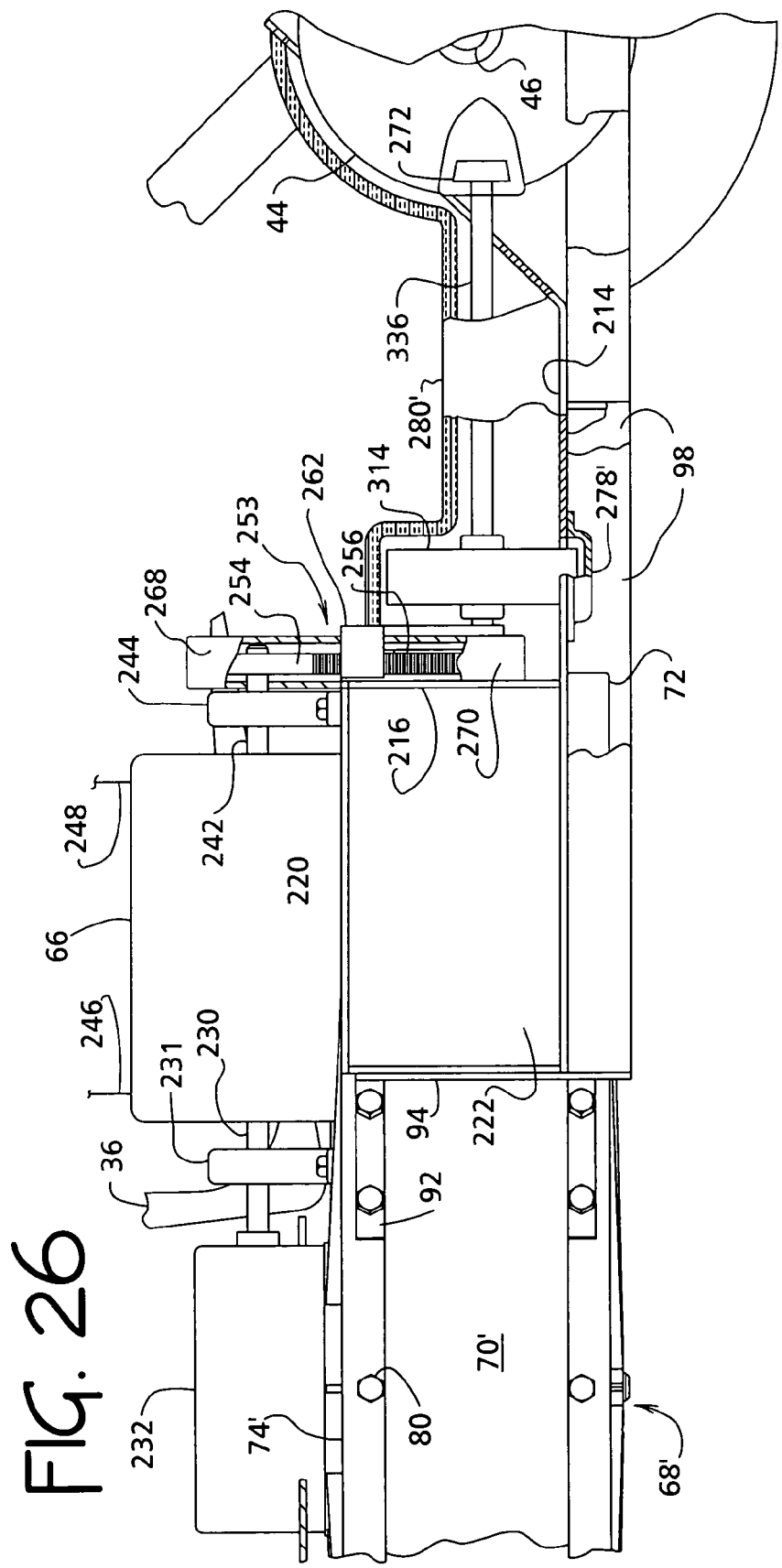
FIG. 26 is an elevation, similar to FIG. 6, of a drive train for this alternate alternator mounting.

Reference is made to FIG. 26 for a further description of the power train 58'. Where there had formerly been two clutches and an alternator between the flywheel containment device 58 and the differential 44, there is now but the single clutch 314. When the clutch 314 is engaged, braking energy can be transferred to the flywheels 52, 54 or returned as motive energy to the differential 44 through pinion 272, dependent on the control signals (246, 248) to the variable ratio transmission 66, as previously described.

The modified power train 58' reduces intrusion of the regenerative system into the occupant compartment of the car. This is to point out that, with only the need to protect the single clutch 314, the profile of the shield 280' may be lowered.

Other than the described changes incident relocating the alternator so that it is directly driven from the flywheel 54, car 60' may include the several features described in connection with car 30 of the first embodiment.

FIGS. 28-31 illustrate a variation in which the alternator means are integrated with the flywheel means of a car 30". In this embodiment, alternator 62" comprise a magnetic component 338 mounted on the upper flywheel 54 and a field component 340 mounted on the top cover 72' of the containment device 68. Whenever there is rotation of the flywheels, there will be relative rotation between the components 338, 340. A field excitation signal 329 may be selectively provided from the signal generator 250 to the field component 340 to generate electricity, which may then be fed to the rectifier 164, for the purpose of recharging the battery arrays 48, 50 in the same fashion as the alternators 62 and 62'.

Figure 32:
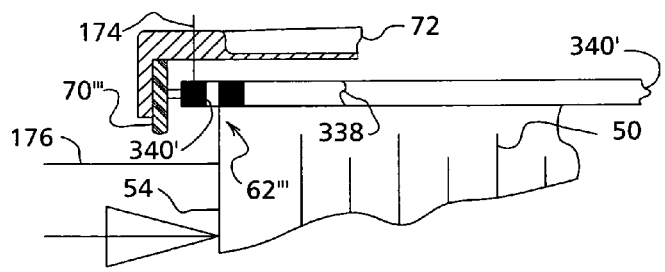
FIG. 32 is a simplified view illustrating an alternate construction of the alternator seen in FIGS. 28-31.

FIG. 32 illustrates a variation of the last described embodiment. In this embodiment, alternator 62''' likewise comprises a magnet component 338 mounted on the upper flywheel 54, but differs in that field coil component 340' is in circumferential, outwardly spaced relation to the magnet 338. As with alternators 62" and 62''', a field excitation signal 329 is selectively generated when it is desired to actuate the alternator and generate current which is then fed by conductor 174 to the rectifier 174 for purposes of recharging the battery arrays 48, 50. As presently contemplated, the circumferential spacing of FIG. 32 is preferred in that the spacing is less subject to variation because of the jolting to which the flywheels will be subjected when the car hits a pot hole or the like. Therefore the alternator 62''' can operate with a relatively high efficiency.

From a structural standpoint, the regenerative braking system of car 30" may be the same as for car 30' differing only in the changes incident to eliminating the alternator as a separate component and then incorporating the alternator functions into the upper flywheel 54 and the containment device 68'.

The flywheel driven (FIG. 27) and flywheel integrated (FIGS. 28, 32) alternators have the advantage of being driven, or operating from a relatively large radius so that a relatively high efficiency can be obtained with a minimum of alternator component weight. Even at relatively low flywheel speeds, the alternator speed will be sufficiently high for efficient generation of electricity. While the multiplication factor of flywheel rim diameter to roller diameter is absent from the flywheel integrated alternators (62" 62''') nonetheless the working diameter of the generating elements approximates 48 inches and greatly enhances the efficiency of electrical generation.

The high peripheral speeds of the flywheel mounted magnet component 338, as well as the high rotor speeds of the flywheel driven alternator lead to the advantageous provision of multiple field winding components for the alternator. FIG. 29A illustrates this feature. The alternator 62" is provided with a second field winding component 340a, which cooperates with a second, flywheel mounted magnetic component 338a (a single flywheel mounted magnetic component could suffice). At relatively low flywheel speeds, a second field excitation signal 329a can be provided to the field winding component 340a to more efficiently generate electricity, which is fed by conductor 149a to the rectifier 164 and recharge the battery arrays 48, 50. The field winding component 338a, when actuated, also increases the rate at which kinetic energy is transformed into electrical energy and may be actuated for that purpose to provide an increased deceleration affect, and/or to more rapidly restore the flywheels' capacity to provide a braking action.

Third and fourth field winding components could be employed in the same way to further enhance the efficiency of electrical generation over the wide range of peripheral speeds of the flywheels. The flywheel driven alternator 62' (FIG. 27) could similarly provided with multiple, independently actuated field windings, or the equivalent effect could be obtained by the provision of one, or more, additional, flywheel driven alternators, which could be independently actuated.

The flywheel driven alternator 62' and the flywheel integrated alternator (62" or 62''') function in the same fashion, in that electricity is generated only when there is rotation of the flywheels and a field excitation signal is provided thereto. Therefore, the power train 58' from the flywheels to the differential can be the same for all of these embodiments. The alternators 62', 62" and 62''' are functionally identical, each being responsive to a field excitation 329 to generate electricity that then recharges the battery arrays, as previously described. With this in mind the following description of FIGS. 27-32 will suffice for a full understanding of the method of operation of each of the three embodiments.

This functional equivalency is demonstrated by FIGS. 27 and 28, which, respectively, illustrate the cruising mode of operation for cars 30' and 30", in which electrical energy is recaptured by alternators 62' and 62". In the cruising mode, the demand pedal 56 is depressed to generate a demand signal input 286 to signal generator 250' and a resultant signal 288 to the controller 290 for the motor 42 whereby motor 42 is energized from the battery arrays 48, 50. The clutch 314 is disengaged and the flywheels (52, 54) are at rest when these cars are first set into operation, this cruising mode is the simplest form of operation. The alternator (62', 62" or 62'") is at rest and there is no electrical input on line 174 to the rectifier 164. Cruise operation is simply the powering of the car by the battery means (48, 50) physically located on the flywheels, in the same fashion as in FIG. 18.

FIG. 29 illustrates flywheel/alternator braking modes in which kinetic energy is transferred from the auto 30" to the battery arrays 48, 50 in the form of electrical energy and/or to the flywheels in the form of rotative kinetic energy. Consistent with the objective of minimizing battery discharge/recharge cycles, the first invoked mode of regenerative braking would be flywheel braking. This braking mode may be initiated by a depression of brake pedal 57, to provide a braking signal 292 to the signal generator 250 and a braking signal output 344, which causes engagement of the clutch 314. Simultaneously, there is a flywheel braking signal by way of line 248, which establishes shaft 242 as the driving shaft for the transmission 66. The speed ratio (and rate of power transmission) across the transmission 66 may be proportionate to the extent of displacement of the brake pedal 57.

As in the first embodiment, a flywheel speed signal input 308 is provided to the signal generator 250". As in the first embodiment, it is desirable to increase the regenerative recapture of energy by invoking alternator braking after flywheel braking has transferred some substantial quantum of braking energy to the flywheels. Thus at an intermediate flywheel speed, say 50% of maximum safe flywheel speed, the speed signal 308 causes the signal generator to provide a field excitation signal 329 to the alternator 62', 62" or 62'". It will also be appreciated that, if the flywheel speed signal 308, indicates such an intermediate (50%) speed at the time the brake pedal is displaced, then signals 329 and 314 will both be provided by the signal generator 250' to simultaneously invoke flywheel braking and alternator braking, as depicted in FIG. 29.

The speed signal 308, when flywheel speed further approaches maximum safe operating speed, say 75% of maximum safe operating speed, can also be used to generate a further field excitation signal 329a (FIG. 29A) to increase alternator braking to thereby further increase alternator braking energy so that a greater extent of regenerative braking can be had before the maximum safe operating speed is reached.

It is to be appreciated that alternator braking is provided in the car 30' in a fully equivalent fashion by the alternator 62'. The signal generators of the cars 30' and 30" may be essentially, if not fully identical. Thus, in FIG. 27 the signal generator would be responsive to flywheel speed signal inputs (308) to generate a field excitation signal (329) so as to generate electricity that flows through line 174 and rectifier 164 to recharge battery arrays 48, 50. Similarly, signal generator 250' would function in FIG. 27 to engage and disengage clutch 314 in the same fashion described in connection with FIG. 29. This further demonstrates the functional equivalency of alternators 62' and 62", Operation in the described fashion results in initial regenerative braking being strictly the mechanical transfer of the kinetic energy of car movement to flywheel rotation. Then, when flywheel speed has reached a point where there has been a transfer of some significant quantum of energy alternator braking is additionally invoked to maximize the total regenerative recovery of braking energy. Advantageously alternator braking would be invoked when flywheel speed has reached a point where there is sufficient flywheel energy to provided a meaningful energy assist for a subsequent reacceleration of the car 30', 30" (see above discussion of maintaining an energy reserve for purpose of assisting reacceleration).

Figure 30:
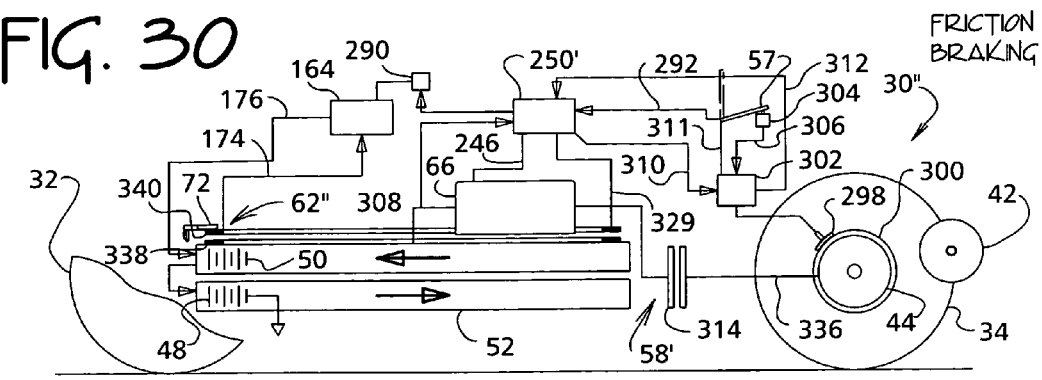

If and when a higher rate of deceleration is desired, through normal reflex reaction, the driver will depress the brake further to a position where switch 304 will be closed to actuate the friction braking mode illustrated in FIG. 30. The friction braking mode of this embodiment may be essentially the same as, if not identical with, the friction braking system described in connection with the first embodiment. Accordingly the description of FIG. 30 will be abbreviated.

Closure of switch 304, provides signal 306 that actuates the hydraulic system 302. The position of the brake pedal 57, through line 311, controls the rate of deceleration, through the amount of pressure of brake pad 298 on brake drum 300.

Also, at the time the friction braking mode is actuated, clutch signal 344 is terminated to the end that clutch 314 is disengaged so that deceleration is solely through the friction braking means. Also, as in the first embodiment, line 312 provides a signal to hold-in circuit in the signal generator 250' that results in a hydraulic actuation signal 310, which is maintained until the brake pedal 57 returns to its rest position. Means are also provided for preventing a subsequent clutch engagement signal (344) until the brake pedal is released.

It will be appreciated that, when friction braking is invoked, the field excitation signal 329 (and 329a) may be maintained so that the alternator (62', 62", or 62'") remain energized and will continue to recapture flywheel energy by recharging the battery arrays 48, 50. The signal generator may be responsive to the speed signal 308 indicating that flywheel speed is below an intermediate speed (reflecting a meaningful energy reservoir, say 25% of maximum safe operating speed) to terminate the field excitation signal 329 (and 329a). Thus, once there has been some measure of friction braking, there will normally be a reservoir of flywheel energy available to assist in reacceleration of the car. This is a further option of flexibility provided by the structure of the present invention, which is also available in other embodiments herein.

Also. as in the first embodiment, the friction braking mode will be actuated when the flywheels reach a speed where transfer of further deceleration energy thereto would cause them to exceed a safe operating speed. Thus the signal generator is also responsive to signal 308, indicating that the flywheel speed has reached a maximum safe operating speed, to generate a hydraulic system actuation signal 310, whereby friction braking becomes effective, in the fashion described above. At the same time the clutch energizing signal 334 is terminated. Recovery of flywheel energy by maintaining the field excitation signal 329 (and 329a) in effect, is also provided for in the fashion above described. Again, there is a hold-in signal 312 which maintains the friction braking mode in effect until the brake pedal 57 is released to its rest position.

Figure 31:
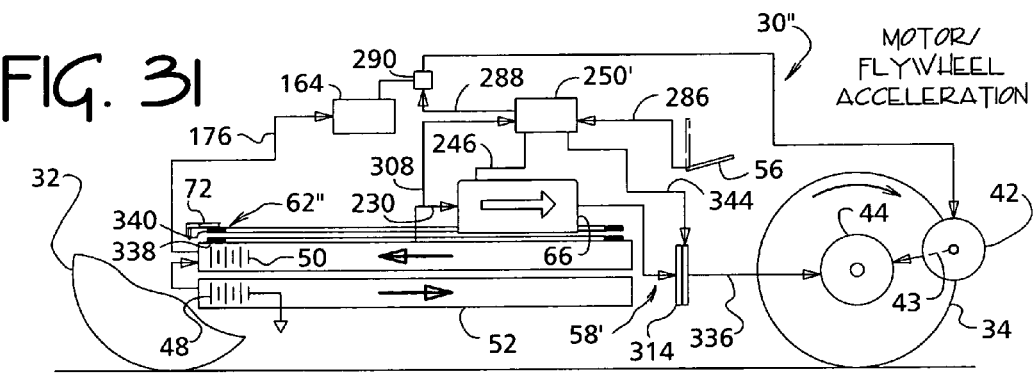

These alternate embodiments of the alternator means (30', 30", and 30'") also have an operating mode for recapturing flywheel kinetic energy by using it to power the car (FIG. 31). This mode is also essentially the same as described in connection with the first embodiment. Thus, if the demand pedal 56 is depressed when the flywheels are rotating, this flywheel energy will be employed to provide a power assist for reacceleration of the car. The existence of available flywheel energy is indicated to the signal generator 250 by the speed signal 308. In response thereto, a signal will be provided to line 246 of the transmission, establishing shaft 230 as the drive input shaft for the transmission 66. Also a clutch energization signal 344 will be generated to cause the clutch 314 to be engaged, thereby providing a motive power input from the fly wheels to the differential 44.

When the flywheel supplied power is insufficient, or exhausted, signal generator 250' will generate signal 288 to initiate energization of the motor 42, and the eventual return to a straight cruising mode of operation, as the clutch 314 is disengaged in response to the flywheel speed signal 308 being reduced to a zero value, or a minimum operating speed value.

Reference is next made to FIGS. 33-40 for a description of a car $30_{M/A}$, which is further embodiment of the invention that also enhances the reliance on kinetic energy interchange in a regenerative braking system. Car $30_{M/A}$ has many components which may be the same as in previous embodiments and are identified by like reference characters, without repeated, detailed description.

Mobile support for the structural components of the car is again provided by rear wheels 32 and front wheels 34. Battery arrays 48, 50 are mounted on flywheels 52, 54 and are then connected to inverter/rectifier 164 by a conductor 176.

A motor/alternator 350 has a bi-directional drive connection 352 to a mechanical integrator 354, which in turn has a drive connection 356 to the differential 44' and then to the axles 46 and the front wheels 34. (When the electrodynamic component 350 is its motor mode, it will be referred to as motor 350 and, when in its alternator mode, as alternator 350.) A flywheel drive connection 358 extends from the integrator 354 to one side of clutch 314. When the clutch 314 is engaged, connection with the flywheels is then made through power train 58', which comprises the rotor of a secondary alternator $62_c$, input/output shaft 242, variable transmission 66 and input/output shaft 230 and then the geared connection to the flywheels 52, 54. There is thus provided a bidirectional drive connection between the flywheels 52, 54 and the mechanical integrator 354.

The mechanical integrator 354 may take the form of interconnected sun gear drives and infinitely variable drive means which are selectively controlled so as to direct mechanical power bidirectionally of each of the drive connections 352, 356 and 358. The operative state of the mechanical integrator 354 is controlled by a control signal input 360 from a mode signal generator 362. The signal generator 362 receives an power delivery signal (364) or a braking mode signal (365, 365' or 365") from a signal generator 250", which is responsive to signal inputs from the power demand pedal 56 and the brake pedal 57 to control operation of the mechanical integrator in the fashion now to be described.

Figure 33:
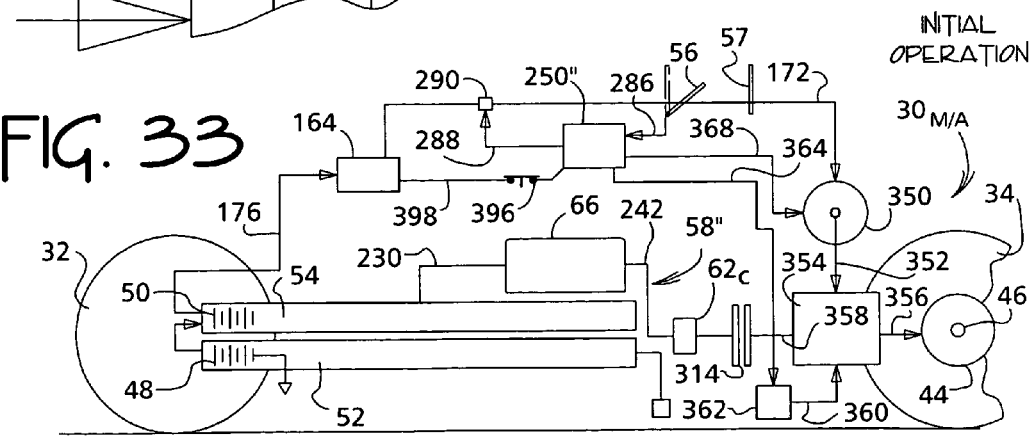

Initial operation of car $30_{M/A}$ is illustrated in FIG. 33. Displacement of the demand pedal 56 from its rest position, provides a power demand signal 286 to the signal generator 250", which then provides three signal outputs: (a) a motor mode signal 368 to the motor/alternator 350 placing it in its motor mode of operation; (b) an energizing signal 288 to controller switch 290, thereby powering the motor 350 from the output of invertor 164; and (c) a power delivery signal 364 to the integrator mode signal generator 362. The resultant control signal 360 then places the mechanical integrator in a mode of operation wherein power from the motor 350 is directed through connections 352, mechanical integrator 354 and drive connection 356 to the differential 44 to provide motive power to the wheels for operation of the car $30_{M/A}$. The signal 288 may be proportional to the degree to which the demand pedal 56 is displaced thus controlling the power output of the motor 350 to achieve a desired speed. The car $30_{M/A}$ in this initial state of operation is powered solely by electrical energy from the flywheel mounted battery arrays 48, 50.

As in the previous embodiments, flywheel braking may be the first form of braking to be invoked. When the energy storage capacity of the flywheels, or the rate of energy transfer thereto is insufficient to meet the desired rate of deceleration, the alternator 350 then functions as a second regenerative braking mechanism. When flywheel braking and alternator braking fail to provide a desired rate of deceleration, then friction braking is invoked.

Figure 34:
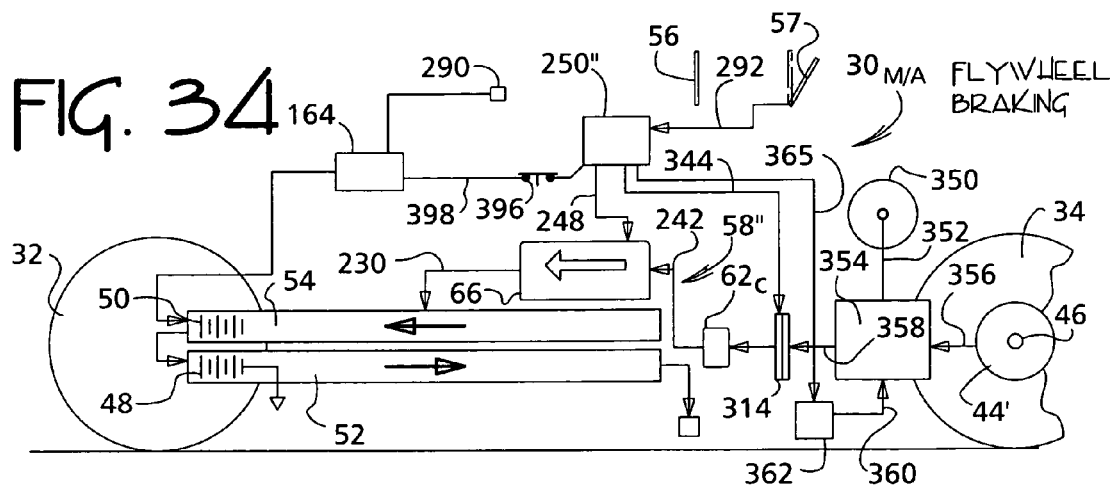

FIG. 34 next illustrates flywheel braking. This deceleration mode may be initiated by depression of the brake pedal 57 through a first range of movement to provide a brake signal input 292 to the signal generator 250". This signal input terminates the motor mode signal 368 to the motor 350 and the energizing signal 288 to the controller switch 290. The signal generator 250" is also responsive to a brake signal input 292 to generate: (a) a regenerative braking signal 365 which results in the flywheel drive connection 358 of mechanical integrator 354 being driven by differential drive connection 356; (b) an energizing signal 344 for engaging the clutch 314; and (c) a flywheel braking signal 248 which sets the shaft 242 as the input drive shaft and shifts the speed ratios of the transmission 66 to transmit power to the flywheels at a rate proportionate to the degree to which the brake pedal 57 is displaced. Thereupon, kinetic energy of forward motion of the car 54 is transferred to the flywheels, and stored as rotational energy, as the car $30_{M/A}$ is decelerated.

The flywheels 52, 54 are reservoirs for the storage of energy, and, as previously discussed, have a finite capacity, which is defined by the maximum safe operating speed of the flywheels. When this maximum safe operating speed is reached, deceleration energy can no longer by safely transferred to the flywheels and further regenerative braking is then obtained by alternator braking.

These ends are obtained through the provision of a flywheel speed signal generator 376 (FIG. 35) which may be mechanically driven from the flywheel 52 to provide a flywheel speed signal input 308 to the signal generator 250". The signal generator 250" may be responsive to the signal 308 reflecting a maximum safe operating speed, to terminate the clutch energizing signal 344. The clutch 314 returns to its disengaged condition as the flywheel system is isolated from the drive system for the car. The energy of deceleration is thus stored in the rotating flywheels 52, 54.

Figure 35:
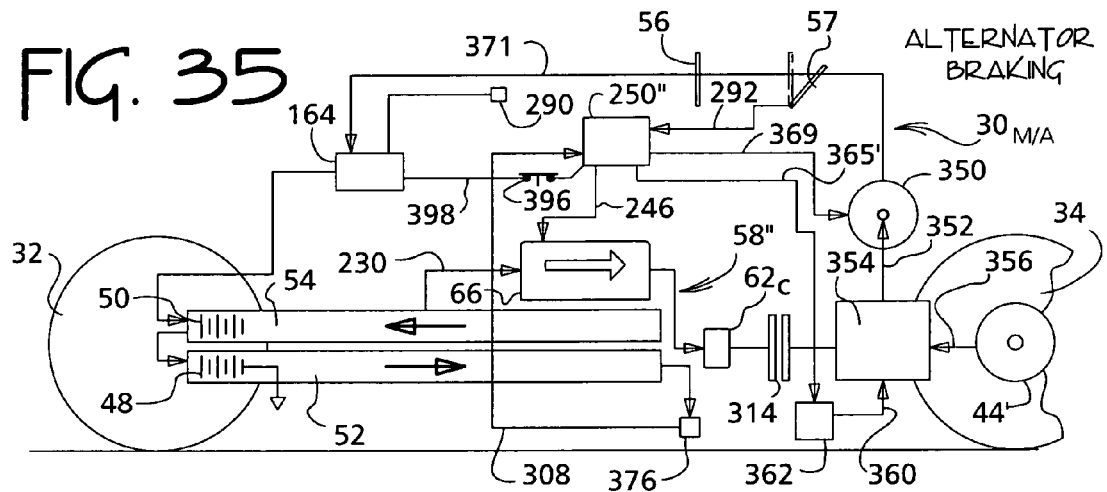
Figure 36:
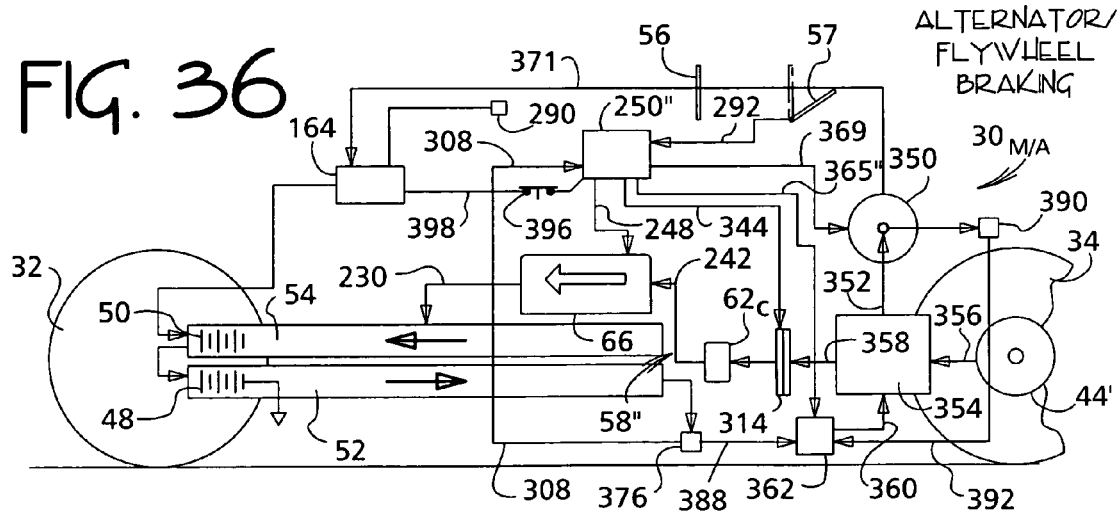

Assuming that the brake pedal 57 remains depressed (indicating the need for further braking action) when the flywheels reach a maximum safe speed, there will be a seamless transition to alternator braking. To this end, the signal generator 250" is also responsive to a maximum safe operating speed signal 308 to generate an alternator mode signal 369, which actuates the alternator mode of the motor/alternator 350. At the same time, a modified, regenerative braking signal 365' shifts the integrator 354 to an operative state wherein alternator drive connection 352 is driven by the differential connection 356 (FIG. 35). The alternator 350 thus serves to provide a braking function as kinetic energy of car movement is transformed into electrical energy by powering the alternator 350. The alternating current generated by the alternator 350 is carried by conductor 371 to the rectifier 164, and converted to direct current and then returned to the energy system of the car by being employed to recharge the battery arrays 48, 50.

Also in response to speed signal 308 indicating a maximum allowable flywheel speed, the signal generator 250" may terminate the flywheel braking signal (248) input to the transmission 66 and provide an energy recovery signal 246, which shifts the transmission to an energy recovery mode in which power flow is reversed. The flywheel system is thus placed in readiness for recovery of deceleration energy stored in the flywheels.

When the need for deceleration terminates, the brake pedal is released and returns to its rest position. The car is then in a free wheeling state that can continue until one or the other of the pedals 56, 57 is depressed.

Provision may also be made for a stronger, regenerative braking action where flywheel braking and alternator braking are combined to provide a maximized rate of regenerative deceleration. This combined braking action (FIG. 36) may be initiated by depression of the brake pedal 57 beyond the initial range of motion (which initiated flywheel braking). Such displacement is sensed by the signal generator 250" through the signal 292 and results in transmission of alternator mode signal 369, which switches the motor/alternator 350 to its alternator mode of operation. At the same time the signal generator 250 generates a modified braking signal 365" to provide a control signal 360 which causes the integrator 354 to split the power from the differential drive connection 356 between the alternator drive connection 352 and the flywheel drive connection 358. The mode signal generator 362 may have a flywheel speed signal input 388 (from signal generator 376). Similarly an alternator speed signal input 392 (from an alternator speed signal generator 290) may also be provided to the mode signal generator 362. These speed signals modify the control signal 360 to the end of assuring that there will be an effective and efficient division of power input to the alternator 350 and to the flywheels 52, 54.

Thus, in addition to kinetic energy of car movement being transferred to the flywheels, it is also transformed into electrical energy as the alternator 350 is driven to generate electricity, which is then fed back to rectifier means 164 by way of conductor 371 thereby recharging the battery arrays 48, 50.

In order to maximize regenerative recapture of braking energy, alternator braking can be additionally invoked after there has been a substantial transfer of energy to the flywheels 52, 54. This is to say that combined alternator/flywheel braking can be automatically initiated after there has been a predetermined transfer of braking energy to the flywheels. Thus, when the flywheel speed signal 308 reaches a predetermined level, say 75% of maximum safe operating speed (or that speed exists at the time the brake pedal is depressed), the signal generator 250" will transmit the modified mode signal 365", and initiate the alternator mode signal 369, as the operative components of the system are brought to the state illustrated in FIG. 36. In this fashion, the flywheels 52, 54 will first accumulate a relatively high quantum of energy which can substantially assist in a subsequent reacceleration of the car 30$_{M/A}$, as is later explained in connection with FIG. 38. As the maximum safe operating speed is approached, speed inputs 388 and 392, to the mode signal generator 362 will enable a greater proportion of braking energy to be transferred to the alternator connection 352 so as to maximize the quantum of braking energy that is recaptured.

If at any time during flywheel/alternator braking (FIG. 36), the flywheels reach their safe maximum operating speed, the signal input 308 to the signal generator 250" will result in the flywheel system being isolated from the drive system, as the signal 344 is terminated and the clutch 314 is disengaged. Thereupon the signal generator is response to provide the modified braking signal 350' as alternator braking is invoked. In most cases, it is to be expected that friction braking will also be required. This mode of braking is next described with reference to FIG. 37.

When it is no longer possible to obtain a desired rate of deceleration by way of alternator/flywheel braking, or in a panic braking situation, continued pressure on the brake pedal 57 will invoke friction braking in essentially the same fashion and using the same components described in connection with the previous embodiments of the invention.

Brake pedal 57 will engage and cause closure of switch 304, providing a signal input, on line 306 which actuates the hydraulic control system 302. Once the hydraulic system is actuated, the pressure of the braking pad 298 on the drum 300 is directly proportional to the degree of displacement of the pedal 57, in response to a signal input by way of line 311, to the hydraulic system 302.

In response to actuation of the friction braking system. the signal on line 344 is terminated (if it has not already been terminated), thereby disengaging the clutch 314, so that flywheel braking, if otherwise available, is not relied upon in a panic braking situation. However, in this embodiment, alternator braking can be maintained during frictional deceleration, as the signal input 365" maintains the mechanical integrator 354 in a mode wherein the drive connection 356, from the differential 44', is directed to the connection 352, to provide a drive input for the alternator 350. Thus, recapture of deceleration energy can be maintained right up to the point where the car is brought to a complete halt.

As before described, a feedback signal may be provided through line 312, to the signal generator 250", indicating that the friction braking mode is in operation. The signal generator includes means, for generating a signal 310 for continuing actuation of the hydraulic control system 302. Release of the brake pedal 57 transmits a signal by way of line 292 to the signal generator 250", to indicate termination of a demand for deceleration of the car.

When the brake pedal 57 is released to its rest position the brake signal 292 is terminated, the brake hold in signal 312 is terminated and the system is reset for further powered operation. However, if, when friction braking is terminated, the flywheel speed is too high (say in excess of 90% of the maximum safe operating speed) to permit transfer of a significant quantum of braking energy thereto, subsequent depression of the brake pedal invokes alternator braking as described in connection with FIG. 35, with reliance being had on friction braking (FIG. 37) if more rapid deceleration is required.

To the extent possible, it is preferred that the deceleration energy stored in the flywheels 52, 54 be returned to the energy system of the car as motive power. This recapture of energy is illustrated in FIG. 38, which illustrates operation of the car 30$_{M/A}$ in its flywheel acceleration/powered mode. This mode of operation is invoked by displacement of the pedal 56 to generate a power demand signal 286 input to the signal generator 250". The availability of flywheel energy is sensed by the signal generator 250" through the speed signal (308) input from the flywheel speed signal generator 376. With a speed signal 308 input, the signal generator generates (or maintains) signal 246 placing the transmission 66 in its energy recovery mode. The strength of the signal 246 may be proportionate to the strength of the power demand signal 292 (reflecting the degree of displacement of the pedal 56), in establishing the power ratio across the transmission 66, to the end of matching the power input to the differential to the rate of acceleration desired.

Also there is a flywheel speed signal input 388 to the mode signal generator 362. With both a flywheel signal input (308) and a power demand signal (286) the signal generator provides a modified power delivery signal 364' to the mode signal generator 362. The resultant output signal 360 causes the integrator 354 to direct power from the flywheel drive connection 358 to the differential drive connection 356.

When the energy in the flywheels is insufficient to power the car $30_{M/A}$ at a desired rate (as reflected by the degree of displacement of the pedal 56) additional motive power may be provided by the motor 350, reference FIG. 39. To this end motor mode signal 368 will be generated when the speed of the car is less than the demand for speed that is reflected by the degree to which the pedal 56 is displaced.

A motor speed signal generator 390 generates a motor speed signal 392 input to the mode signal generator 362. The flywheel speed signal generator 376 continues to provide a signal input 388 to the mode signal generator. These speed signal inputs modify the control signal 360 to the end of dynamically adjusting the integrator to combine the flywheel drive connection 358 and the motor drive connection 352 in proper proportions to drive the differential connection 356 up to the point where the energy remaining in the flywheels can no longer be efficiently used to power the car $30_{M/A}$. When that point is reached, as may be indicated by the flywheel speed signal 308, the clutch actuation signal 344 is terminated and the clutch 314 is disengaged. Operation of the car $30_{M/A}$ then continues in the fashion illustrated in FIG. 33.

From the foregoing it will appreciated that, in normal operation, there is a continuing interchange of kinetic energy to and from the flywheels 52, 54. As the car is decelerated by flywheel braking action, flywheel speed increases up to the point of maximum safe operating speed. Additional deceleration is obtained through alternator braking action and, if need be, through friction braking. The energy of alternator braking is recaptured in recharging the battery arrays 48, 50. The flywheel braking energy remains stored in the rotating flywheels and is usually recaptured as motive power for the car $30_{M/A}$. Only the energy of friction brake is a total loss.

In the normal course of operation, an automobile will be accelerated, then braked, and then reaccelerated to accommodate traffic and road conditions. There will be occasions where there can be repeated braking functions, but these occasions will be followed, eventually by reacceleration of the automobile. The point being made is that under essentially all duty cycles for most, if not all types of vehicles, there will be no reason for recovery of flywheel energy other than by employing this energy for motive power purposes. The large mass and the large diameter of the flywheels contributes to their ability to provide a very large, energy storage capacity. These factors lead to the preference of recapture of flywheel energy through recharging of the battery arrays 48, 50 only when the car 30, has completed a duty cycle and is to be shut down.

Recovery of flywheel energy when the car is shut down will now be described with reference to FIG. 40 and an "ignition" switch 396, in a conductor 398. When the car $30_{M/A}$ is initially put in service, switch 396 is closed to energize signal generator 250" from the battery arrays 48, 50 (FIGS. 33-39). When the switch 396 is opened to "turn off the ignition", an appropriate hold-in circuit 397 (FIG. 40) will be energized by the signal generator so long as there is a signal 308, indicating that there is rotational energy in the flywheels 52, 54. In response to opening of switch 396, signal generator will provide a field excitation signal 372 to the secondary alternator $62_c$. Additionally a power recovery signal will set or maintain the shaft 230 as the drive shaft for the transmission 66. The clutch 314 is disengaged, so that the rotational energy in the flywheels drives the alternator $62_c$, generating current that is fed by conductor 374 to rectifier 164 and then through conductor 174 to recharge the battery arrays 48, 50. When the flywheels come to a stop, or when they reduce in speed below that at which current can be effectively generated, as reflected by the speed signal 308, the hold in circuit 397 is opened and the signal generator 250" deenergized. The alternator 62, may be sized so as to provide a "trickle" rate recharging to the battery arrays 48, 50. Thereby maximizing the recovery of flywheel energy as electrical energy, and at the same time recharging at an optimal rate for batteries, such as lead-acid batteries, which are adversely affected by being recharged at a rapid rate.

The use of the mechanical integrator 354 also permits recovery of flywheel energy by recharging the battery means. This is to point out that when the "ignition" is turned off, as above described, the signal generator would generate a signal 344 to engage the clutch 314; a power recovery signal 246, to transmission 66, would be generated; an alternator mode signal 369 would go to the motor alternator 350; and a further modified signal to mode signal generator 362 would also be generated so as to set the mechanical integrator in a battery recharging mode. The hold in circuit 397 would maintain this battery recharging mode until most, if not all, of the energy of the flywheels had been recovered in recharging the battery arrays 48, 50. When the battery arrays 48, 50 are recharged in this fashion, it is no longer necessary to provided the secondary alternator 62c.

From the foregoing, it will again be apparent that the described system minimizes battery charge discharge cycles in that all deceleration energy that is transferred to the flywheels, is returned the car's energy system as motive power for operation of the car. The sole exception being that energy that remains in the flywheels, when operation of the car is to be terminated for some indefinite period of time, as just described. There are, of course, battery charge-discharge cycles inherent in the use of the alternator 350 to provide a braking function. Nonetheless, the increases in range/payload that are obtained by so recapturing braking energy more than offset the shortening of battery life that is incident to additional battery charging at other than a "trickle rate".

The mode of operation in which flywheel energy is preferentially employed as motive power is particularly suited to the operating characteristics of lead-acid batteries. It is to be appreciated that the described use of a separate mechanical integrator 354 to direct power between the motor/alternator 350, the flywheels 52, 54 and the transmission 44, provides a capability that would accommodate other modes of operation of the types earlier discussed. 1

Reference is next made to FIGS. 41-44 for a description of a simplified motor/alternator car $30_{M/A}$' which is an amalgamation of features found in previously described embodiments, that have been optimized for the mode of operation describe in connection with FIGS. 36-40, wherein the return of flywheel energy may be maximized in the form of motive power input. Components in common with earlier described embodiments are identified by like reference characters without further description unless required.

The car $30_{M/A}$' comprises a motor/alternator 350 having a bidirectional connection 43' with differential gear set 44. A flywheels power train 58" also includes a bidirectional drive connection 358' with the differential gear set 44, along with clutch 314, power train 58" and transmission 66. In a sense, the motor alternator 350 has been substituted for the motor 42 in the embodiment of FIGS. 1-23 while the differential gear set 44 again functions as a mechanical integrator. Again there is provided a bidirectional drive between the flywheels 52, 54 and the front wheels 34 and a bidirectional drive connection between the front wheels 34 and the motor/alternator 350.

A secondary alternator 62'$_c$, which serves the same functions as the secondary alternator of the previous embodiment, is a separate, relatively small alternator which is mechanically driven by a pulley-belt drive 400 from drive train 58''', and selectively energized by a field excitation signal 372. The car 30$_{M/A}$' otherwise comprises components previously described in connection with FIGS. 18-23 or FIGS. 33-39, which will be referenced in connection with operational modes of this embodiment, as they are now to be described.

FIG. 41 illustrates the cruising mode of operation of the car 30$_{M/A}$', corresponding to the operational state illustrated in FIG. 33. Power demand pedal 56 is depressed, providing a demand signal 286 to the signal generator 250'''. This then produces a motor mode signal 368 and an energizing signal 288 to the actuation switch 290, whereby the motor 350 provides a power input to the differential 44 which is proportional to the degree to which the pedal 56 is displaced.

As in the last described embodiment, when decelerating, it is preferred to first employ flywheel braking, as illustrated in FIG. 42. Initial depression of the brake pedal 57 provides a signal input 292 to signal generator 250''' which results in a energizing signal 344 to thereby engage the clutch 314. Also flywheel braking signal 248 is generated to set the transmission 66 for transfer of energy from the wheels 34 and transmission 44 to the flywheels 52, 54 at a rate proportional to displacement of the brake pedal 57.

When flywheel braking is insufficient to provide a desired rate of deceleration, continued displacement of the brake pedal 57 will invoke a combination of flywheel braking and alternator braking, as the change in braking signal 292 results in an alternator mode signal 369 (FIG. 42). The alternator 350 is thus energized and further decelerates the car 30$_{M/A}$' as the alternator 350 converts motive energy to electricity, which is then fed by way of conductor 371 to the rectifier 164 and employed to recharge the battery packs 48, 50. A flywheel speed signal input 308 may also be provided to the signal generator 250''' for purposes of terminating flywheel braking when a maximum safe operating speed is reached, and/or for purposes of invoking alternator braking when flywheel speed approaches a maximum safe operating speed, in the same fashion as described in connection with FIG. 36.

Friction braking would also be provided for purposes of decelerating the car 30$_{M/A}$'' when flywheel and/or alternator braking are insufficient or unavailable for such purpose. Those skilled in the art will appreciate from FIG. 37 and its description, the manner in which friction braking would be incorporated in the car 30$_{M/A}$'.

FIG. 44 illustrates the manner in which flywheel energy is recaptured as motive power in essentially the same fashion shown and described in connection with FIG. 39. This mode of operation may be invoked, when there is some useful quantum of energy in the rotating flywheels 52, 54, such state being indicated by a speed signal input 308 to the signal generator 250''', when the power demand pedal is depressed. As described in greater detail in connection with FIGS. 38 and 39, transmission signal 246 sets the transmission 66 for the transmission of energy from the flywheels 52, 54 to the differential 44. At the same time, motor mode signal 368 actuates the motor 350 to provide a power input, through connection 43', to the differential 44, which integrates this input with the flywheel power input from connection 358' to power the car 30$_{M/A}$' through the axles 46.

The car 30$_{M/A}$' may also be provided with means for recovering flywheel energy when it is to be parked and out of service for some extended period of time. FIG. 41 also illustrates this recovery mode, which is essentially the same as described in connection with the car 30$_{M/A}$, with particular reference to FIG. 40. Thus an "ignition" switch 396 is provided in the conductor 398, which energizes the signal generator 250'''. As previously described, when the ignition switch 397 is shut off (opened), and there is a flywheel speed signal input to the signal generator 250''', a hold-in switch 397 is closed to temporarily maintain energization of the signal generator 250'''. Also a field energization signal 372 is provided to the alternator 62'$_c$. Transmission signal 246 is actuated to transmit flywheel energy to the alternator 62'$_c$. The electricity thus generated is fed through conductor 374 to rectifier 164 and then employed to recharge the battery arrays 48, 50. When the speed signal 308 indicated that there is little or no energy remaining in the flywheels, switch 397 opens the control system for the car is at rest.

Reference is next made to FIGS. 45-51 for a description of an embodiment of the invention in which fuel cells provide the energy for steady state operation of a car designated 30$_{FC}$. Rechargeable batteries provide a supplemental energy source which enables the car 30$_{FC}$ to accelerate at a more rapid rate.

Looking first to the schematic shown in FIG. 45, it will be seen that the upper flywheel 54 may be essentially the same as in the other embodiments, having mounted thereon battery array 50. The lower flywheel 52' differs from the lower flywheel in previous embodiments in that it has a fuel cell array 410, which is comprised of a plurality of individual fuel cells 412, which function as the primary source of energy for operation of the car 30$_{FC}$.

The individual fuel cells 412, like the voltaic cells 150, may be disposed in the several compartments 112 of the lower flywheel 52' and connected in series to generate an output potential across conductors 154, 156. The voltaic cells of the battery array 50, as before, may be disposed in the compartments 114 of the upper flywheel 54 and are connected in series to generate an output potential across conductors 158, 162.

Excepting for certain modifications seen and described in connection with FIGS. 46 and 47, the structure of the flywheels; the mechanical connections thereto; and the electrical conductors employed therewith, as well as the containment device 68, may be essential identical to what has previously been described, particularly in connection with FIGS. 7-16. Such structure will be identified by like reference characters in this embodiment with the understanding that such previous descriptions are likewise applicable.

The output potentials of the battery array 50 and the fuel cell array 410 are connected as separate inputs to an inverter/rectifier 164', which corresponds in function to the inverter/rectifier 169, previously described. The fuel cell array circuit comprises an inverter grounding conductor 170, which is connected to stationary shoe 178, with that shoe being in sliding contact with the flywheel mounted rail 180, to which the conductor 154 is connected. The positive conductor 156 is connected to the upper rail 182 of the flywheel 52' and the electric circuit to the inverter 164' completed through shoe 184 and conductor 176'. The battery array 50 is connected across the inverter by a circuit from grounding conductor 170', stationary shoe 188, flywheel rail 190 to conductor 158. The positive side of the battery array 50 goes from conductor 162, flywheel rail 192, shoe 194 and conductor 176. A voltage regulator 414 is then connected across the positive output conductors 176, 176'.

FIG. 45 additionally illustrates the control signals connections for a motor/generator 350 and a secondary alternator 62'$_c$ as are also found in FIGS. 41-44 and need no further description at this point.

Reference is next made to FIGS. 46, 47 for a description of the modifications made in providing the fuel cell array. While the present invention is not necessarily limited to the use of any one type of fuel cell technology, the present state of the art makes desirable the use of proton exchange membrane (PEM) fuel cells, discussed in greater detail above. This type of fuel cell requires gaseous hydrogen and oxygen and produces water as a waste product. Hydrogen may be directed to flywheel 52 by way of a hose 416 which extends to an on-board hydrogen source. This hydrogen source may be a pressurized storage tank, or a hydrogen generating reformer. Atmospheric oxygen suffices as the source of that component of the fuel cell reaction.

The hose 416 is connected to a stationary housing 418, which is mounted on top of the gear set housing 232. The central flywheel shaft 118' extends upwardly through the housing 232, into the housing 418, with a fluid seal 419 being provided to provide a sealed chamber at the upper end of the shaft 118'. The lower flywheel 52' is basically the same as the flywheel 52 previously described in that it comprises a plurality of compartments 112 which are defined by outer disc portions 102, 104 interconnected by an outer, annular rim portion 106 (not seen in FIGS. 46, 47) and an intermediate annular band 108. The flywheel structure is further reinforced by radial vanes 110, which define the compartments 112. A central resinous hub 111' then joins the central portions of the disc portions 102, 104. A splined, metal hub 124' is bonded to a corresponding spline on the interior of the resinous hub 111', as before. The flywheel 52' is then joined to the shaft 118' by a spline formed on an enlarged diameter 421 of that shaft. The spline on the enlarged diameter 421 then engages a corresponding spline on the metal hub 124'. Again the flywheel 52' is axially positioned on the shaft 118' by resting on a snap ring 142', which is fastened to the enlarged diameter 421.

Assembly and disassembly of the modified flywheels is essentially the same as before. Note that gear box cover can be readily removed by lifting it vertically off of the shaft 118'. The means (screw 236') for fastening the gear 224 to shaft 118' and the means (screw 240) for securing the gear 226 to the tubular shaft 120 can be readily removed. Then the several snap rings can be removed, as previously described to free the flywheels for removal from the containment device 68.

Hydrogen may be provided to the fuel cell array 410 by way of the tube 416, into housing 418, and then downwardly of the shaft 118', through an axial hole 420, and then outwardly through radial passageways 422 The passageways extend through the enlarged diameter 421 of shaft 118', the metal hub 124' the resinous hub 111' and then to and through the annular band 108', to enter compartments 112, in which the fuel cells 412 are disposed. Two, diametrically opposed, radial passageways 422 may be employed, with circumferential passageways 424 being provided to distribute hydrogen to all of the compartments 112 by way of appropriate opening through the annular band 108.

Water, which is the waste product of the fuel cells' voltaic reactions, is drained from each of the compartments 112, through appropriate openings in the annular band 108', circumferential passageways 426 and a pair of radial passageways 428, which extend through the resinous hub 111', the metal hub 124' and the enlarged, diameter of shaft 118'. The waste water may then be discharged from the car $30_{FC}$ through an axial passageway 430 in the lower end of the shaft 118'. A check valve 432 is provided in the drain passage 432 to prevent entry of foreign matter into the fuel cell energy generating system.

At this point it will be noted that, as in other embodiments of invention, most, if not all, of the braking energy stored in the flywheels, can be returned to the car's energy system as motive energy in reaccelerating the car $30_{FC}$. This means that there will be extended periods of time where the flywheels 52', 54 will be either stationary or rotating at very slow speeds. Thus there will be an absence or very substantial minimization of centrifugal forces that tend to prevent flow of water toward the central drain passage 430.

A secondary water drainage system is also provided disposal of water at times when the flywheel 52' is rotating at speeds which would prevent drainage through the axial passageway 430. To this end a gutter 440 (FIG. 46A) may be formed peripherally of the lower surface of the flywheel 52'. Passageways 442 extend from the lower, outer (radially) portion of each compartment 112 to the gutter 440, which is provided with an outer circumferential rim 444. A water retriever 446 is mounted on a tube 448, which in turn in mounted on the wall 70 of the containment device casing 70. The tube extends to the suction side of a vacuum pump 450. A passageway extends centrally of the water retriever 446 opens into the gutter 440 and communicates, through the tube 448 with the vacuum pump 450. See also FIG. 46B.

Thus, water generated by the fuel cells 412, during high speed rotation of the flywheel 52', is discharged into the gutter 440, being retained therein by the rim 444, until suctioned off through the water retriever 446 and then discharged from the pump 450. In most circumstances it will be acceptable to simply discharge water from the pump directly into the environment. It will also appreciated that the pump 450 serves a dual function in that it also creates a negative pressure in the interior of the containment device and thereby minimizes windage losses incident to the high peripheral speeds of the flywheels 52', 54.

When the car $30_{FC}$ is out of service, the pump 450 will be shut down. The passageway in and leading from the fuel cell compartments 112 are sloped so that any further water, generated while the pump 450 is shut down, will flow to and be discharged from the containment device by way of the axial passage 432.

Reference is next made to FIGS. 48-51 for a description of the operating modes of the fuel cell powered car $30_{FC}$. These schematics employ the same method of illustrating operating modes as used in describing previous embodiments, and differ from FIGS. 41-44, describing car $30_{M/A}'$, primarily in the substitution of fuel cell array 410 for the battery array 48 in the lower flywheel 52'. As in FIGS. 41-44, a motor/alternator 350 is employed to provide the function of a prime mover, and also to provide regenerative braking.

FIG. 48 illustrates the cruising mode of operation in which the power demand pedal 56 is displaced and provides a power demand signal 286 to the signal generator $250_{FC}$. This results in a motor mode signal 368 which places the motor/alternator 350 in its motor mode of operation. Also an energizing signal 288 actuates the motor controller 290, connecting the output of inverter 164', by way of conductor 172, with motor 350 to thereby power car $30_{FC}$. FIG. 48 illustrates operation of the car $30_{FC}$ in normal, steady state operation, requiring less than the maximum power capacity of the fuel cell array 410. Under these conditions, the fuel cell array, which has a nominally higher potential than the battery array 50, recharges the battery array as current flows through the voltage regulator 414. The voltage regulator functions in customary fashion to shut off recharging current flow when the battery array is fully charged. The battery array may thus be maintained in a with a desired state of charge at all times, in readiness to provide a maximized supplemental power assist during acceleration of the car $30_{FC}$.

FIG. 49 illustrates the battery assisted acceleration mode of operation of the car $30_{FC}$, where the battery array 50 provides auxiliary energy in powering operation of the motor 350 to thereby increase the rate of acceleration. To attain this end a car velocity signal 434 may be generated from the differential gear set 44 and provided as an input to the signal generator $250_{FC}$. The signal generator may then compare the speed signal to the strength of the power demand signal 286 and to generate an acceleration demand signal 436 to the signal to invertor 164'. In response to this acceleration demand signal, the invertor 146' then places the output of the battery array 50 in parallel with the fuel cell array 410, thereby increasing the energy available for accelerating the car $30_{FC}$. Once the desired vehicle speed is reached, the acceleration demand signal is nulled out, or reduced below a preset difference value. In either event, the inverter 164' may comprise means responsive to the acceleration demand signal 436 falling below a predetermined value for terminating flow of battery energy to the motor 350, whereupon the vehicle is powered solely by fuel cell energy.

The fuel cell powered car $30_{FC}$ may be provided with regenerative braking in essentially the same fashion as in the previously described car $30_{M/A}$' as will be seen from FIG. 50. FIG. 50 illustrates the simultaneous application of both flywheel braking and alternator braking, in response to depression of the brake pedal 57 to a point where the signal 292 has a strength sufficient to generate both a flywheel braking signal 248 and a clutch energizing signal 344 as well as an alternator mode signal 369. In this state of operation, clutch 314 is engaged to provide a mechanical connection from the vehicle wheels 34, through the differential 44, the clutch 314, transmission 66 (signal 248 having provided for transmission of power to the flywheels), to the flywheels 52', 54 and thus transferring vehicle kinetic energy into kinetic energy in the rotating flywheels 52', 54. Various refinements in the control of power flow through the transmission, as previously discussed in connection with prior embodiments are also applicable to this embodiment.

As before, in this dual regenerative braking mode, alternator 350 generates current, which is conducted to rectifier 164' by conductor 317, converted to direct current and then recaptured as chemical energy by recharging the battery array 50.

In the previous embodiments, batteries provided the sole energy source for powering the car. While regenerative braking did enable the batteries to be recharged, there was, nonetheless, a continual discharge of energy from the batteries. In other words, the braking energy that was returned to the batteries, in one fashion or another, was energy that had originated from the batteries by way of accelerating the car. Thus the limiting factor, where batteries are the sole energy source, is the depth of battery discharge that is to be permitted before an outside energy source will be employed to fully recharge them. Available energy and battery life are both seriously degraded in direct proportion to the depth to which a battery is discharged. A battery powered car's useful pay/load range is also defined by the usable energy that is available when its batteries are charged, because, once they have been discharged to their design depth of discharge, the car will be out of service for a considerable amount of time to be recharged—a matter or hours for lead-acid batteries.

Many of the shortcomings of batteries are overcome when used in combination with a fuel cell electric energy source. Thus, there is no depth of discharge factor that would impact the length of service life of fuel cells. Fuel cells do not require an extended "recharging" time. Instead, available energy can be readily renewed ("recharged") by simply refilling the onboard hydrogen container, or the fuel tank that supplies the reformer for producing hydrogen. The ready renewal of the fuel cell energy source permits the use of a portion of the electricity generated by the fuel cells to be used in maintaining the batteries (48, 50) in a maximized state of charge so that there will be a highly effective level of battery energy assist in the acceleration of the car $30_{FC}$. In this way depth of discharge of the batteries can be minimized to the end that their service life is substantially enhanced.

However, it is not necessarily desirable to utilize fuel cell energy to fully recharge the batteries (FIG. 49). Instead, the batteries should be recharged to a point approaching, but below a fully charge state in order that the electricity generated by alternator braking will be able to be recaptured as chemical/electrical energy. Ultracapacitors could be employed as an energy storage device in recapturing alternator generated electricity, to thereby permit further maximization of the percent to which fuel cell energy is employed to recharge the batteries (48, 50). Thus braking energy stored on ultracapacitors could later be returned as motive energy to the motor 350. The final determination of the extent to which the batteries are recharged (FIG. 49) will in most cases be determined by the anticipated duty cycle for a given car design.

The fuel cell powered car $30_{FC}$ may be provided with friction braking capability in the same fashion as described in connection with car $30_{M/A}$ having particular reference to FIG. 37. Likewise considerations for invoking friction braking in lieu of alternator braking and/or flywheel braking, are equally applicable to the present embodiment and need not be repeated in detail.

Recovery of flywheel braking energy is also the same as in other embodiments, in that it is used in as an auxiliary power source in a subsequent reacceleratioin of the car $30_{FC}$. Thus in addition to invoking fuel cell energization of the motor 350 as described in connection with FIG. 48 and supplemental battery energization of the motor 350 as described in connection with FIG. 49, flywheel energy is also employed in the reacceleration of the car $30_{FC}$. To this last end, flywheel speed signal 308 (FIG. 51) is fed to the signal generator $250_{FC}$ to provide an input indicating the availability and strength of flywheel energy. Under this circumstance, when there is a power demand signal input 286 (as a result of depression of pedal 56), transmission signal 246 sets the transmission for delivery of power from the flywheels 52', 54. Additionally, signal 344 is generated to engage the clutch 314 and thereby provide for the delivery of flywheel energy to the differential gear set 44 to further power motive operation of the car $30_{FC}$.

Thus, there can be three energy sources for powering the car $30_{FC}$, namely flywheel energy, battery energy and fuel cell energy. Through the provision of appropriate signal generating means in the signal generator $250_{FC}$, these energy sources may be employed singly or in combination to power motive operation of the car $30_{FC}$. In the usual case it would be preferable to employ flywheel energy as the first employed energy source, when there is a power demand signal 286 input to the signal generator $250_{FC}$, in which case the transmission signal 246 would set the transmission 66 for delivery of power from the flywheels 52', 54 and signal 344 would be generated to engage clutch 314 for delivery of flywheel energy to drive the front wheels 34. At the same time, the strength of the demand signal 286 and the vehicle speed signal 434 would be compared to generate a differential control signal 436 to the inverter 164'. The strength of this differential signal (which indicates that a faster rate of acceleration is desired by reason of the extent to which the demand pedal is displaced) can then initiate signal 288 for motor controller 290 and thus initiate flow of current to motor 350, (motor mode signal 358 is actuated contemporaneously). If the strength of the differential signal 436 is sufficiently large, means within the inverter 164' are responsive to place the battery array 50 in parallel with the fuel cell array 176 to provide a third energy source for more rapid acceleration of the car $30_{FC}$.

As flywheel energy and rate of rotation are reduced in providing propulsion energy, the previously described control means will adjust the differential gear transmission 66, in order that most, if not all of the flywheel energy is returned to the vehicle energy system, as motive power. Further as the energy input from the flywheels is reduced, means within the inverter 164' may be responsive to any resultant increase in the differential signal 436, to increase the flow of battery current, in order to maximize the rate of vehicle acceleration. When it is no longer practical, or efficient, to recapture flywheel energy, as can be indicated by the strength of the flywheel speed signal 308, clutch energizing signal 344 will be terminated and clutch 314 will be automatically disengaged.

It will be noted that secondary alternator $62_C$ is provided in this embodiment and is adapted to be actuated for the recovery of flywheel energy in the same fashion as described in connection with FIG. 41. Thus, flywheel energy is transformed into chemical energy through recharging the battery array 50, when the car $30_{FC}$ is taken out of service.

In summary, the present invention provides significant improvements in the state of the art of vehicles powered by electric motors all to the end of reducing atmospheric pollution. Certain features of the invention have unique applicability to compact cars employed for commuting purposes, but the majority of features will find utility in all sizes and types of vehicles including large scale polluters as trucks and busses.

While the embodiments herein described are based on the use of batteries as the electric energy source, it is to be recognized that many of the advantages of the invention can be realized using alternate, electric energy sources, having particularly in mind proton exchange membrane fuel cells with, or without, an ancillary reformer and fuel tank, all of which could be mounted on one or both of the flywheels 52, 54. Continuing in the same vein, it will be pointed out that proton exchange membrane (PEM) fuel cells differ from batteries in that regenerative energy cannot be returned to the energy source. In other words, these fuel cells cannot be recharged in the sense that batteries can be recharged. Thus, it is preferable to provide a flywheel mounted battery regenerative braking system in combination with a fuel cell powered car.

Where appropriate in the claims, the term "electric energy source" or "direct current source" will be employed to denote aspects of the invention which are not necessarily limited to use of batteries as the energy source.

It will also be repeated that a primary focus of the invention is to exploit the advantages that flow from mounting batteries on flywheels, so that the battery mass forms a significant, if not the major portion of the flywheel mass, as it performs its regenerative function of storing energy so that it can be recovered. While certain aspects of the invention go to the use of battery means comprising a plurality of voltaic cells and the specific manner in which they are mounted on the flywheels, many aspects of the invention are not so limited. Thus in these broader aspects other sources of electric energy or direct current, could well be employed, and the terms "mounted on" or "carried by" or similar terms are to be understood as denoting that the electric energy source rotates with and as a part or component of the rotating flywheel.

In several aspects of the invention, the novel concepts involve a combination of known means for effecting a desired sequence of results, particularly with respects to the generation of signals and the end results consequent to the generation of such signals. Those skilled in the art will recognize that the recitation of such signals and end results implicitly specifies the provision of such known means.

Likewise, many deviations from the described embodiments will occur to those skilled in the art, within the spirit and scope of the present invention and will fall within the purview of the following claims.

Having thus described the invention, what is claimed as novel and desired to be secured by Letters Patent of the United States is:

1. A self propelled vehicle comprising
   wheel means for supporting the vehicle for movement along a surface;
   electric motor means for powering motive operation of the vehicle;
   an electric current source for energizing the motor means;
   a regenerative system for recapturing energy that would otherwise be lost in the operation of the vehicle; said regenerative system including,
      a flywheel,
         mounted for rotation about a flywheel axis spaced from the motor means and having a fixed relation to said vehicle, and
         having means for mounting the electric current source thereon;
      conductive means for providing an electrical connection between the electric current source and the motor means, said conductive means comprising
         a pair of axially spaced, circumferential, conductive rails, mounted for rotation with the flywheel,
         means for electrically interconnecting said electric current source and said rails, to establish one of said rails at a positive potential relative to the other rail,
         shoe support structure having a fixed relation relative to said rails,
         a pair of conductive shoes mounted on the shoe support structure, and respectively engaging each of said rails, and
         means for transferring the potential across the rotating rails from the shoes to the motor means.

2. A self propelled vehicle as in claim 1, wherein
   the electric motor means, includes a drive connection with said wheel means, for powering motive operation of the vehicle; and
the vehicle further comprises
   a second electric current source, and
wherein
   the regenerative system further comprises
      a second flywheel
         mounted for counter rotation about said flywheel axis, and having
         means for mounting the second electric current source thereon; and further comprising
      a second electrical conductive means, for providing an electrical connection between the second current source and the motor means, said second electrical conductive means comprising a second pair of axially spaced, circumferential, conductive rails, mounted for rotation with said second flywheel, and means for electrically interconnecting said second electric current source and said second pair of rails, to establish one of said second rails at a positive potential relative to the other second rail; and a second pair of conductive shoes, mounted on the shoe support structure, and respectively engaging the second pair of rails, and means for transferring the potential across the second pair of rails from the second pair of shoes to the motor means; and further wherein said flywheels are rotatable independently of the drive connection from the motor means to the wheel means.

3. A self propelled vehicle as in claim 2, further comprising a containment device defining a chamber in which the flywheels are mounted, said containment device including a wall portion spaced radially outwardly from said flywheels, and wherein the shoe support structure is mounted on the outwardly spaced wall portion of said containment device.

4. A self propelled vehicle as in claim 2, wherein said flywheels each have cavities in which the electric current sources thereof are disposed, and the first and second electric current sources each comprise a plurality of voltaic cells, and further comprising means for recharging the voltaic cells to regeneratively recapture energy, which means include alternator means for generating alternating current, said alternator means being mounted in fixed relation to the flywheel axis, and recharging conductor means for making a connection between the alternator means and the voltaic cells, wherein the recharging conductor means also include said shoes and said circumferential rails.

5. A self propelled vehicle as in claim 4, wherein each flywheel is formed, at least in part by resinous, dielectric material, which defines annular chamber means, and the chamber means for each flywheel comprise a plurality of chambers defined by an outer, cylindrical rim, an inner, cylindrical shell, a pair of axially spaced discs that are joined by the rim and inner shell, thereby providing a dielectric casing for the voltaic cells of each flywheel, and the mass of the voltaic cells for each flywheel, constitutes the major portion of the mass of that flywheel.

6. A self propelled vehicle as in claim 2, further characterized in that the first electric current source is a battery array comprised of a plurality of voltaic cells, and said second electric current source is a fuel cell array comprised of a plurality of voltaic cells.

7. A low profile, self propelled, subcompact vehicle comprising an occupant compartment which includes a driver's seat and a passenger seat in side by side relation;

wheel means for supporting the vehicle for movement along a surface and comprising a pair of laterally spaced, front wheels, and a pair of laterally spaced, rear wheels, aligned with and spaced rearwardly from the front wheels;

electric motor means for powering motive operation of the vehicle;

an electric current source for energizing the motor and a regenerative system for recapturing energy that would otherwise be lost in the operation of the vehicle; said regenerative system including, flywheel means for storage of kinetic energy, said flywheel means including a flywheel, disposed in the lowermost portions of the vehicle mounted for rotation about a vertical axis, and having the electric current source mounted thereon;

characterized in that the seats overlie, a forward portion of the flywheel means, and the forward portion of the occupant compartment is at a level beneath the upper level of the flywheel means, to provide leg room and support the feet of occupants.

8. A low profile, self propelled, subcompact vehicle as in claim 7, further characterized in that the flywheel means include a containment device defining a chamber in which the flywheel is disposed.

9. A low profile, self propelled, subcompact vehicle as in claim 8, further characterized in that the electric current source comprises a plurality of voltaic cells; and the flywheel means include a second flywheel forming a pair of flywheels mounted for counter-rotation about said vertical axis, and having cavity means for receiving the voltaic cells.

10. A low profile, self propelled subcompact vehicle as in claim 7, further characterized in that the diameter of the flywheel means approximates the lateral spacing between said front and rear wheels, thereby further facilitating maximization of the electrical capacity of the said energy source and the kinetic energy capacity of the flywheel means.

11. A low profile, self propelled, subcompact vehicle as in claim 7, wherein the regenerative system further comprises a drive train for drivingly interconnecting the wheel means and the flywheel means, whereby kinetic energy may be transferred to and from the flywheel means, and the drive train extends between the vertical outline of the seats.

12. A low profile, self propelled, subcompact vehicle as in claim 7, further comprising a cargo compartment to the rear of the side-by-side seats and overlying said flywheel means.

13. A low profile, self propelled, subcompact vehicle as in claim 12, wherein the electric current source comprises an array of batteries;

the electric motor means is an alternating current motor;

the regenerative system comprises alternator means for generating alternating current; and further including inverter means for converting the alternating current generated by the alternator means into direct current for recharging the batteries and for converting direct current from the batteries into alternating current for energizing the motor means, and signal generating means for controlling operation of the regenerative system, further characterized by a compartment underlying one of said seats, outwardly of the containment device and between the upper and lower levels thereof, in which the inverter means and signal generating means are disposed.

14. A low profile, self propelled, subcompact vehicle comprising a body portion which includes an occupant compartment comprising a driver's seat and a passenger seat in side-by-side relation;

wheel means for supporting the vehicle for movement along a surface and further comprising a pair of laterally spaced, front wheels, and a pair of laterally spaced, rear wheels;

electric motor means for powering motive operation of the vehicle;

the motor means includes a motor drive train;

an electric current source for energizing the motor and a regenerative system for recapturing energy that would otherwise be lost in the operation of the vehicle, said regenerative system including, flywheel means for storage of kinetic energy, and a regenerative drive train for transferring energy to the flywheel means in decelerating the vehicle, wherein the regenerative drive train is disposed horizontally in a lower portion of the body portion, the electric energy source is carried by the flywheel means, and characterized in that the flywheel means is disposed in the body portion beneath the regenerative drive train, has a vertically disposed rotational axis, and the diameter of the flywheel means approximates the lateral spacing between said front and rear wheels, thereby enabling maximization of the capacity of the electric energy source.

15. A low profile, self propelled, subcompact vehicle as in claim 14, further comprising a second electric energy source;

further characterized in that the flywheel means include a pair of flywheels mounted for counter-rotation about a common, vertical axis, and having the electric energy sources respectively mounted thereon.

16. A self propelled vehicle comprising chassis means for providing structural support for functional components of the vehicle;

wheel means for supporting the vehicle for movement along a surface, said wheel means being supported by the chassis means;

electric motor means for powering motive operation of the vehicle;

an electric current source for energizing the motor means; and a regenerative system for recapturing energy that would otherwise be lost in the operation of the vehicle, said regenerative system including flywheel means for storage of kinetic energy, and comprising a flywheel, a containment device defining a chamber, and means for journaling said flywheel for rotation within the containment device wherein the electric current source is carried by the flywheel, and characterized in that the containment device is defined, at least in part, by a portion of the chassis means and at least a portion of the containment device forms part of the load bearing structure of the chassis means, and a portion of the containment device is removable from the chassis means to provide access to the flywheel.

17. A self propelled vehicle as in claim 16, wherein the wheel means comprise a pair of laterally spaced, front wheels, a pair of laterally spaced rear wheels, aligned with and spaced rearwardly from the front wheels;

the axis of rotation of the flywheel is vertically disposed;

the flywheel means further comprise a second flywheel, and means for journaling said second flywheel for counter rotation with respect to the first flywheel within said flywheel chamber, about said vertical axis, and the containment device comprises an upper cover, a casing, and a lower cover, all joined together to define said chamber;

characterized in that the casing is formed by portions of the chassis means, the upper cover is secured to portions of the chassis means, and constitutes a load bearing component of the chassis means; and further characterized in that the flywheels are supported from the upper cover, and in that the means for journaling said first and second flywheels are carried by said upper and lower covers.

18. A self propelled vehicle as in claim 17, further characterized in that the rear wheels are mounted on a portion of the chassis means, which portion is mounted on a rearwardly facing portion of the upper cover.

19. A self propelled vehicle as in claim 17, wherein the regenerative system further includes a drive train for providing a drive connection between the flywheel means and the front wheels, and the drive train includes a variable ratio drive transmission, further characterized in that the variable ratio drive transmission is mounted on and supported by the upper cover of the containment device.

20. A self propelled vehicle as in claim 17, wherein the regenerative system further includes a drive train for drivingly interconnecting the wheel means and the flywheel means, whereby kinetic energy may be transferred to and from the flywheel means, said drive train including a miter gear set, disposed above and supported by the containment device, means for providing a drive connection between said flywheels and said miter gear set, and an input/output shaft connectable with the wheel means to provide a drive connection with said miter gear set.

21. A self propelled vehicle as in claim 20, further characterized in that
the lower cover of the containment device is removable to provide access to the flywheel means, and
the flywheel means are accessible and removable for replacement or repair, once said lower cover is removed.

22. A self propelled vehicle having
wheel means for supporting the vehicle for movement along a surface;
said wheel means comprising
a pair of laterally spaced, front wheels,
a pair of laterally spaced, rear wheels, spaced rearwardly from the front wheels;
electric motor means for powering motive operation of the vehicle;
an electric current source for energizing the motor means,
an occupant compartment including
a driver's seat and a passenger seat in side-by-side relation; and
a regenerative braking system for recapturing energy that would otherwise be lost in decelerating the vehicle, said regenerative system including
flywheel means for storage of kinetic energy, including
a flywheel mounted for rotation about a vertical axis, and on which the electric current source is mounted; and
a flywheel drive train for drivingly interconnecting the front wheels and the flywheel, whereby kinetic energy may be transferred to and from the flywheel,
said flywheel drive train being shiftable between
an engaged state in which energy is transferred between the wheel means and the flywheel and
a disengaged state in which the flywheel may rotate independently of wheel means movement,
characterized in that
a portion of the flywheel drive train overlies the flywheel means and extends between the vertical outlines of the driver's seat the passenger seat.

23. A self propelled vehicle as in claim 22, wherein
the electric current source comprises
a plurality of voltaic cells;
the flywheel is formed, at least in part, by resinous, dielectric material, which material defines chamber means for receiving said voltaic cells, and
said voltaic cells are disposed in said chamber means with the dielectric material functioning as a casing for the voltaic cells, and
further characterized in that
the mass of the voltaic cells constitutes the major portion of the mass of the flywheel.

24. A self propelled vehicle as in claim 22, further comprising
a differential gear set including output shafts for driving the front wheels; and
the motor means include
an electric motor, and
a motor drive input from said motor to said differential gear set; and
said flywheel drive train includes a drive connection with said differential gear set to thereby provide a connection between the flywheel and the front wheels.

25. A self propelled vehicle as in claim 24, further characterized in that
a variable ratio drive transmission is provided in said flywheel drive train, and further includes
selectively actuated means for setting said transmission in
(a) a braking mode in which power is transmitted from the front wheels to the flywheel to thereby transfer kinetic energy of forward motion into stored kinetic energy in the rotating flywheel, or
(b) an energy recovery mode in which power is transmitted from the flywheel to the front wheels to thereby transfer kinetic energy from the flywheel and provide motive energy for vehicle movement.

26. A self propelled vehicle as in claim 22, further characterized in that
a variable ratio drive transmission is provided in said drive train, and
the regenerative braking system further includes
selectively actuated means for setting said transmission in
(a) a braking mode in which power is transmitted from the front wheels to the flywheel to thereby transfer kinetic energy of forward motion into stored kinetic energy in the rotating flywheel, or
(b) an energy recovery mode in which power is transmitted from the flywheel to the front wheels to thereby transfer kinetic energy from the flywheel and provide motive energy for vehicle movement.

27. A self propelled vehicle as in claim 22, wherein
the electric current source comprises
battery means for supplying the electric current; and
the regenerative system includes
means for recharging the battery means, said recharging means including
an alternator,
further characterized
by means for actuating said alternator to thereby generate electricity and recharge the battery means, when the drive train is in its disengaged state.

28. A self propelled vehicle as in claim 27, further comprising
a variable ratio transmission included in said flywheel drive train;
means for shifting the flywheel drive train between engaged and disengaged states comprising
a clutch disposed between the transmission and the front wheels,
said clutch, when engaged, shifting the flywheel drive train to its engaged state,
said clutch, when disengaged, shifting the flywheel drive train to its disengaged state; and
means, disposed between the transmission and the clutch, for driving the alternator.

29. A self propelled vehicle as in claim 28, wherein
a second clutch is provided and disposed between the means for driving the alternator and the variable ratio transmission, and
further comprising
means for selectively engaging and disengaging the first mentioned clutch and said second clutch,
whereby flywheel energy may drive the alternator to recover energy stored in the flywheel or the alternator may be driven from the front wheels to decelerate the vehicle, or flywheel energy may be used to drive the wheel means.

30. A self propelled vehicle as in claim 28, wherein
said flywheel drive train further includes
selectively actuated means for setting said transmission in
(a) a braking mode in which power is transmitted from the front wheels to the flywheel to thereby transfer kinetic energy of forward motion into stored kinetic energy in the rotating flywheel, or (b) an energy recovery mode in which power is transmitted from the flywheel to the front wheels to thereby transfer kinetic energy from the flywheel to provide motive energy of vehicle movement; and further comprising a power demand pedal;

means, responsive to displacement of the demand pedal, for energizing the motor means;

a brake pedal;

friction braking means for deceleration of the vehicle;

means, responsive to displacement of the brake pedal through an initial range of movement from a rest position for engaging said clutch when the transmission in its braking mode, thereby invoking flywheel braking; and means, responsive to displacement of the brake pedal to a position beyond the initial range of movement, for actuating operation of the friction braking means, and disengaging the clutch to thereby terminate flywheel braking.

31. A self propelled vehicle as in claim 28, further comprising a power demand pedal;

means, responsive to displacement of the demand pedal, for energizing the motor means from the electric current source;

friction braking means for effecting deceleration of the vehicle;

a brake pedal;

means, responsive to displacement of the brake pedal, for engaging said clutch to place the flywheel drive train in its engaged state and thereby transfer energy from the wheel means to the flywheel to provide flywheel deceleration of the vehicle;

means for sensing overspeed operation of the flywheel; and means responsive to sensing of overspeed operation of the flywheel, for (a) disengaging said clutch to shift the flywheel drive train to its disengaged state, and (b) simultaneously actuating the friction braking means, whereby there is a seamless and controlled deceleration of the vehicle.

32. A self propelled vehicle as in claim 27, wherein the alternator has a rotor which is rotated to generate electricity, and further characterized in that the rotor of the alternator is incorporated in and forms a portion of the drive train, and the means for actuating the alternator to generate electricity include means for field excitation and means for generating a field excitation signal.

33. A self propelled vehicle as in claim 27, wherein the alternator comprises a rotor and a stator; and further characterized in that the alternator rotor is drivable in response to rotation of said flywheel.

34. A self propelled vehicle as in claim 33, further characterized by means for drivingly engaging the alternator rotor with the flywheel, and the means for actuating the alternator to generate electricity include means for field excitation, and means for generating a field excitation signal.

35. A self propelled vehicle as in claim 33, wherein the alternator rotor is a magnetic component and the alternator stator is a field component, further characterized in that the magnet component is mounted on the flywheel and rotates therewith, and the field component is mounted in relatively fixed relation with respect to the magnet component and in electromagnetic reaction relation therewith, and the means for actuating the alternator to generate electricity include means for field excitation and means for generating a field excitation signal.

36. A self propelled vehicle as in claim 35, wherein the flywheel means further comprises a containment device defining a chamber in which the flywheel is mounted, and further wherein the field component of the alternator is mounted on the containment device.

37. A self propelled vehicle as in claim 22, further comprising a power demand pedal;

means, responsive to displacement of the demand pedal, for energizing the motor means from the electric current source;

friction braking means for effecting deceleration of the vehicle;

a brake pedal;

means, responsive to displacement of the brake pedal, for shifting the flywheel drive train to its engaged state and transferring energy from the wheel means to the flywheel to thereby provide flywheel deceleration of the vehicle, means for sensing overspeed operation of the flywheel; and means responsive to sensing of overspeed operation of the flywheel, for (a) shifting the flywheel drive train in its disengaged state, and (b) simultaneously actuating the friction braking means, whereby there is a seamless and controlled deceleration of the vehicle.

38. A self propelled vehicle as in claim 22, further comprising a power demand pedal;

means, responsive to displacement of the demand pedal, for energizing the motor means;

friction braking means for decelerating the vehicle;

a brake pedal;

means, responsive to displacement of the brake pedal through an initial range of movement, for shifting the flywheel drive train to its engaged state and transferring energy from the wheel means to the flywheel, thereby providing flywheel braking; and means responsive to displacement of the brake pedal to a position beyond the initial range of movement, for actuating the friction braking means.

39. A self propelled vehicle as in claim 22, wherein the electric current source comprises battery means for supplying the electric current;

the regenerative system further includes means for recharging the battery means including an alternator; and alternator braking means including a selectively actuatable alternator driving connection from the wheel means to the alternator;

and further comprises friction braking means for decelerating the vehicle; and selectively actuatable means for:
  a. placing the flywheel drive train in an engaged state to transfer energy from the wheel means to the flywheel, thereby invoking flywheel braking,
  b. actuating the alternator driving connection, to thereby invoke alternator braking, and
  c. actuating the friction braking means to provide a more positive rate of deceleration,
whereby a full range of braking capability is provided, while maximizing the amount of energy that can be recaptured for operation of the vehicle.

40. A self propelled vehicle as in claim 39, further comprising
a clutch, which, when engaged, shifts the flywheel drive train to its engaged state;
a brake pedal;
means, responsive to displacement of the brake pedal through an initial range of movement, for engaging said clutch;
means responsive to displacement of the brake pedal through a further range of movement for actuating said alternator means; and
means, responsive to displacement of the brake pedal beyond said further range of movement, for actuating the friction braking means.

41. A self propelled vehicle as in claim 40, further comprising
means for sensing flywheel speed, and
means responsive to sensing of flywheel speed exceeding a predetermined maximum, for disengaging said clutch to thereby prevent further increases in flywheel speed.

42. A self propelled vehicle as in claim 39, wherein
the alternator driving connection, at least in part, is included in the flywheel drive train, and further includes
a first clutch disposed between the alternator driving connection and the wheel means; and
a second clutch disposed between the flywheel and the alternator driving connection;
  said flywheel drive train being in its engaged state when both of said clutches are engaged; and
said vehicle further comprises
a brake pedal;
means, responsive to displacement of the brake pedal through an initial range of movement, for engaging both of said clutches;
means responsive to displacement of the brake pedal through a further range of movement for actuating said alternator driving connection; and
means, responsive to displacement of the brake pedal beyond said further range of movement, for
  (a) disengaging at least one of said clutches and
  (b) actuating the friction braking means.

43. A self propelled vehicle as in claim 39, further comprising
an electrodynamic device having
  (a) a motor mode which provides said electric motor means, and
  (b) an alternator mode which provides said alternator means;
the flywheel drive train and the motor drive train are provided at least in part by
a bidirectional drive connection between the electrodynamic device and the front wheels,
a power demand pedal;
means responsive to displacement of the power demand pedal for
  (a) placing the electrodynamic device in its motor mode, and
  (b) connecting said device to said current source thereby powering operation of the vehicle;
a clutch, which, when engaged, shifts the flywheel drive train to its engaged state,
a brake pedal;
means, responsive to displacement of the brake pedal through an initial range of movement, for engaging said clutch;
means responsive to displacement of the brake pedal through a further range of movement for placing the electrodynamic device in its alternator mode; and
means, responsive to displacement of the brake pedal beyond said further range of movement, for actuating the friction braking means.

44. A self propelled vehicle comprising
wheel means for supporting the vehicle for movement along a surface,
electric motor means for powering motive operation of the vehicle;
an electric current source for energizing the motor means; and
a regenerative braking system for recapturing energy that would otherwise be lost in decelerating the vehicle, and said system including
flywheel means comprising
a pair of flywheels
  counter-rotatable about a vertical axis,
  with each flywheel having a portion of the electric current source carried thereon,
a drive train for drivingly interconnecting the wheel means and the flywheels, and
a containment device defining a chamber in which said flywheels are disposed,
wherein said drive train includes
a central flywheel shaft to which the lower flywheel is attached,
a tubular flywheel shaft disposed concentrically of the central flywheel shaft and to which the upper flywheel is attached,
a horizontal input/output shaft for transmitting power to and from the flywheels, said input/output shaft being vertically offset to one side of the flywheels, and
gear means, also disposed to said one side of the flywheels, for transmitting power between the flywheel shafts and the input/output shaft.

45. A self propelled vehicle as in claim 44, further including
a sealed lubrication chamber in which the gear means are disposed,
characterized in that
the lubrication chamber is defined by
an upper portion of the containment device and
a housing mounted thereon.

46. A self propelled vehicle as in claim 44, wherein
the containment device comprises
a top cover,
a casing, and
a bottom cover,
and further characterized in that
the tubular shaft is journaled on and supported by the top cover,
the central shaft is journaled within and supported by the tubular shaft,
the lower cover is removable from the casing to provide access to the flywheels, the lower flywheel is removable from the central shaft to provide access to the upper flywheel, and the upper flywheel is removable from the tubular shaft, whereby the flywheels may be accessed for repair and replacement.

47. A self propelled vehicle as in claim 46, further comprising a chassis for structurally supporting functional components of the vehicle, and the top cover is supported by and forms a structural portion of the chassis.

48. A self propelled vehicle comprising wheel means for supporting the vehicle for movement along a surface;

electric motor means for powering motive operation of the vehicle;

an electric current source for energizing the motor means; and a regenerative braking system for recapturing energy that would otherwise be lost in decelerating the vehicle, and which includes a rotatable flywheel on which the electric current source is mounted; and a flywheel drive train connectable to the wheel means to provide a drive connection with the flywheel;

said vehicle further including friction braking means for decelerating the vehicle comprising a brake pedal;

said regenerative braking system further including means, responsive to displacement of the brake pedal from a rest position, for connecting said flywheel drive train to the wheel means and thereby effecting deceleration of the vehicle, as vehicle kinetic energy is transformed into rotational kinetic energy in the flywheel;

means for sensing overspeed operation of the flywheel; and means, responsive to the sensing of overspeed operation, for preventing transfer of further energy to the flywheel, and invoking friction braking as the means of vehicle deceleration in response to displacement of the brake pedal.

49. A self propelled vehicle as in claim 48, wherein the means for preventing transfer of energy and invoking friction braking comprise means, operative when the drive train is connected to the flywheel, for disconnecting the drive train from the wheel means and means, operative when the drive train is disconnected from the wheel means, for preventing the drive train from being connected to the wheel means.

50. A self propelled vehicle as in claim 48, further comprising means, operative in response to displacement of the brake pedal beyond an initial range of movement, for invoking friction braking as the means of vehicle deceleration in response to displacement of the brake pedal.

51. A self propelled vehicle as in claim 48, wherein the drive train includes, a variable ratio transmission;

the means for connecting the drive train to the wheel means comprise a clutch engageable to connect the drive train to the wheel means;

the means responsive to displacement of said brake pedal include means for engaging said clutch, and means for adjusting the ratio across of said transmission in direct proportion to the extent to which the brake pedal is displaced through an initial range of movement; and the friction braking means exerts a deceleration force also proportional to the extent to which the brake pedal is displaced, thereby further facilitating a seamless and controlled deceleration of the vehicle.

52. A self propelled vehicle as in claim 51, further including means for preventing reengagement of said clutch prior to the brake pedal returning to its rest position.

53. A self propelled vehicle as in claim 48, wherein the electric current source comprises batteries;

the regenerative braking system further comprises alternator means for recharging the batteries; and means for actuating said alternator means to invoke alternator braking and provide an additional deceleration force as braking energy is transformed into chemical energy.

54. A self propelled vehicle as in claim 53, further comprising an electrodynamic device having a motor mode, which provides said motor means, and an alternator mode which provides said alternator means.

55. A self powered vehicle as in claim 48, further including a power demand pedal;

means, responsive to displacement of the demand pedal, for providing a power demand signal, which signal is proportionate to the extent to which the demand pedal is displaced;

means, operative in response to said power demand signal, for connecting said flywheel drive train to said wheel means and employing flywheel energy as motive power for the vehicle; and means, operative in response to said power demand signal, for powering vehicle from the electric motor means, when the kinetic energy of the flywheel is insufficient to provide the power input established by the power demand signal.

56. A self propelled vehicle as in claim 48 wherein the wheel means include a laterally spaced pair of front wheels; and further comprises a differential gear set interconnecting said front wheels; and means for connecting the flywheel drive train to the differential gear set; and further wherein the electric motor means for powering the vehicle include a drive connection from said motor means to said differential gear set.

57. A self propelled vehicle comprising wheel means for supporting the vehicle for movement along a surface;

electric motor means for powering motive operation of the vehicle;

an electric current source for energizing the motor means, a regenerative braking system for decelerating the vehicle and recapturing energy that would otherwise be lost in deceleration of the vehicle;

said regenerative system including, a rotatable flywheel, and
means for providing a drive connection from the wheel means to the flywheel
and thereby transferring vehicle kinetic energy to rotational kinetic energy in the flywheel, thus effecting deceleration of the vehicle;
further comprising
friction braking means for deceleration of the vehicle;
a brake pedal;
means, responsive to displacement of the brake pedal through an initial range of movement from a rest position, for engaging the means for providing a drive connection from the wheel means to the flywheel and thereby invoking flywheel braking; and
means responsive to displacement of the brake pedal to a position beyond the initial range of movement, for actuating operation of the friction braking means.

58. A self propelled vehicle as in claim 57, further characterized by
means, responsive to displacement of the brake pedal beyond said initial range of movement, for disengaging the drive train connection to said wheel means; and
means preventing subsequent connection of the drive train to the wheel means prior to the brake pedal returning to its rest position.

59. A self propelled vehicle comprising
wheel means for supporting the vehicle for movement along a surface;
electric motor means for powering motive operation of the vehicle;
battery means for energizing the motor means; and
a regenerative braking system for recapturing energy that would otherwise be lost in deceleration of the vehicle;
said regenerative system including,
alternator means for generating electricity to be used in recharging the battery means, and
means for providing alternator braking, including
means for effecting an alternator drive connection from the wheel means to the alternator means to invoke alternator braking,
wherein vehicle kinetic energy is transformed into electrical energy in effecting deceleration of the vehicle;
a rotatable flywheel; and
means, independent of the alternator drive connection and the motor means, for establishing a flywheel drive connection from the wheel means to the flywheel to invoke flywheel braking
whereby vehicle kinetic energy is transformed into rotational kinetic energy in the flywheel in effecting deceleration of the vehicle;
said vehicle further including
friction braking means for decelerating the vehicle; and
means for selectively invoking
a. alternator braking,
b. flywheel braking, and
c. friction braking;
thereby providing a full range of braking capability, while maximizing the amount of energy that can be recaptured for operation of the vehicle.

60. A self propelled vehicle as in claim 59, further comprising
a brake pedal; and wherein
said selectively invoking means include
means, responsive to displacement of the brake pedal through a given range of movement for invoking flywheel braking and alternator braking, and
means responsive to displacement of the brake pedal beyond said given range of movement for invoking friction braking.

61. A self propelled vehicle as in claim 60, wherein
the means, responsive to displacement of the brake pedal through a given range of movement, include
means, responsive to initial displacement of the brake pedal, for first invoking flywheel braking.

62. A self propelled vehicle as in claim 61, wherein
the means for establishing a flywheel drive connection comprises
a variable ratio transmission, and
further including
means for adjusting the variable ratio transmission to transfer energy to the flywheel at a rate proportionate to the extent of the brake pedal displacement.

63. A self propelled vehicle as in claim 61, further comprising
means for detecting rotation of said flywheel at a predetermined speed which is designated as the maximum safe operating speed; and
means, responsive to detection of the flywheel speed reaching the maximum safe operating speed, for preventing further transfer of energy to the flywheel.

64. A self propelled vehicle as in claim 63, further comprising
means, operative after the flywheel speed has reached said maximum safe operating speed, for preventing flywheel braking to be subsequently invoked, until the flywheel speed has been reduced to a predetermined speed below said maximum safe operating speed,
thereby preventing a hunting action between flywheel braking and friction braking.

65. A self propelled vehicle as in claim 59, further including
a control system having an off state and an on state; and
means for recharging said battery means when the control system is switched from its on state to its off state when there is rotational energy in said flywheel,
said means including
at least a portion of the alternator means, and
means, operative in response to the control system being switched from on to off, for powering at least a portion of said alternator means from the flywheel.

66. A self propelled vehicle as in claim 65, further comprising
an electrodynamic device having an alternator mode and a motor mode; and
means for providing a bidirectional drive connection between the wheel means and the electrodynamic device;
wherein
said motor means including the electrodynamic device when it is in its motor mode;
said alternator means comprise
said electrodynamic device when it is in its alternator mode, and
a secondary alternator powered from the flywheel when the control system is in its off state.

67. A self propelled vehicle as in claim 65, further comprising
a drive train for establishing a drive connection between the flywheel and the wheel means, and wherein
the alternator means comprises an alternator drivingly connectable to said wheel means, and
said alternator is powered from said flywheel when the control system is switched to its off state.

68. A self propelled vehicle as in claim 59, further including
- a power demand pedal;
- means, responsive to displacement of the demand pedal, for providing a power demand signal, which signal is proportionate to the extent to which the demand pedal is displaced;
- means, operative in response to said power demand signal, for connecting said flywheel drive connection to said wheel means and employing flywheel energy as motive power input for the vehicle; and
- means, operative in response to said power demand signal, for powering the vehicle from the electric motor means, when the kinetic energy of the flywheel is insufficient to provide the power input established by the power demand signal,
- whereby battery charge/discharge cycles are minimized as regenerative braking is first invoked as a transfer of kinetic energy to the flywheel and then that kinetic energy is recaptured in providing motive power for the vehicle.

69. A self propelled vehicle as in claim 68, further comprising
- a second flywheel contra-rotatable coaxially of said first mentioned flywheel; and
- the wheel means include
  - a pair of laterally spaced, front wheels; and
- further including
  - a differential gear set to which the front wheels are drivingly connected;
  - means providing a drive input from said electric motor means to said differential, and
  - further wherein
  - the means for establishing a drive connection from the wheel means includes a drive connection between said differential gear set and both of said flywheels.

70. A self propelled vehicle as in claim 59, wherein the battery means are carried by the flywheel.

71. A self propelled vehicle comprising
- wheel means for supporting the vehicle for movement along a surface;
- electric motor means for powering motive operation of the vehicle;
- an electric current source for energizing the motor means;
- a motor drive train for providing, when actuated, a drive input from said motor means to the wheel means to thereby power movement of the vehicle; and
- a regenerative braking system, which recaptures energy that would otherwise be lost in decelerating the vehicle, said regenerative system including,
  - flywheel means for storage of kinetic energy, and
  - a regenerative drive train, independent of the motor drive train, and
  - connectable to the wheel means, to selectively provide one of either
    - (a) a flywheel braking mode in which power is transmitted from the wheel means to the flywheel means to thereby transfer kinetic energy of forward motion into stored kinetic energy in the flywheel means, or
    - (b) an energy recovery mode in which power is transmitted from the flywheel means to the wheel means to thereby transfer kinetic energy from the flywheel means to provide motive energy for vehicle movement; and
- further characterized in that
  - at least a substantial portion of the electric current source is carried by the flywheel means so that the mass of the flywheel means includes at least a substantial portion of the mass of the electric current source.

72. A self propelled vehicle as in claim 71, wherein
- said wheel means comprise
  - a pair of front wheels and
  - a pair of rear wheels; and
- further including
  - a differential gear set including output shafts for driving one pair of said pair of wheels, and further wherein
  - the regenerative drive train and the motor drive train are both connectable to said one pair of wheels through the differential gear set.

73. A self propelled vehicle as in claim 71, wherein
- the flywheel means comprise
  - a flywheel formed, at least in part, by resinous, dielectric material, which defines annular chamber means for receiving the current source, and
- the electric current source comprises
  - a plurality of voltaic cells disposed in said annular chamber means with the dielectric material functioning as a casing therefor.

74. A self propelled vehicle as in claim 71, wherein
- the electric current source is in the form of a direct current source; and
- the flywheel wheel means comprise
  - a flywheel
    - mounted for rotation about a flywheel axis disposed in fixed, spaced
      - relation from the motor means, and
        - having means for mounting the direct current source thereon; and
- further comprising
  - conductive means for providing an electrical connection between the electrical current source and the motor means, said conductive means comprising
    - a pair of axially spaced, circumferential, conductive rails mounted for rotation with the flywheel, and
  - further
    - means for electrically interconnecting said direct current source and said rails, to establish one of said rails at a positive potential relative to the other rail;
    - shoe support structure having a fixed relation relative to said rails,
    - a pair of conductive shoes mounted on said shoe support structure, and, respectively engaging each of said rails, and
    - means for transferring the potential across the rotating rails from the shoes to the motor means.

75. A self propelled vehicle as in claim 71, in the form of a subcompact car,
- further comprising
  - an occupant compartment including
    - a driver's seat and a passenger seat in side by side relation; and
- wherein
  - the wheel means comprise
    - a pair of laterally spaced, front wheels, and
    - a pair of laterally spaced, rear wheels, spaced rearwardly from the front wheels; and
  - the flywheel means are
    - disposed in the lowermost portions of the car and mounted for rotation about a vertical axis;
  - characterized in that
    - the seats overlie, a forward portion of the flywheel means, and the forward portion of the occupant compartment is at a level beneath the upper level of the flywheel means, to provide leg room and support the feet of occupants.

76. A self propelled vehicle as in claim 71 in the form of a subcompact car,
further comprising
an occupant compartment which includes
a drivers seat and a passenger seat in side by side relation; and
wherein
the wheel means comprise
a pair of laterally spaced, front wheels, and
a pair of laterally spaced, rear wheels, spaced rearwardly from the front wheels;
characterized in that
the motor drive train and regenerative drive train are disposed horizontally in a lower portion of the vehicle;
the flywheel means is disposed in a lowermost portion of the vehicle;
has a vertically disposed rotational axis; and
the diameter of the flywheel means approximates the lateral spacing between said front and rear wheels, thereby enabling maximization of the electrical capacity of the electric current source, with a low vehicle profile.

77. A self propelled vehicle as in claim 71, further comprising
chassis means for providing structural support for the functional components of the vehicle;
wherein
said wheel means are supported by the chassis means, and
the flywheel means comprise
a flywheel, a containment device defining a chamber, and means for journaling said flywheel for rotation within the containment device characterized in that
the containment device is defined, at least in part, by a portion of the chassis means and at least a portion of the containment device forms part of the load bearing structure of the chassis means.

78. A self propelled vehicle as in claim 71, wherein
the wheel means comprise
a pair of laterally spaced, front wheels, and
a pair of laterally spaced, rear wheels, spaced rearwardly from the front wheels; and
further comprising
an occupant compartment including
a driver's seat and a passenger seat in side-by-side relation; and
characterized in that
a portion of the regenerative drive train overlies the flywheel means and extends between the vertical outline of the driver's seat and the passenger seat.

79. A self propelled vehicle as in claim 71 wherein
the wheel means comprise
a pair of laterally spaced, front wheels, and
a pair of laterally spaced, rear wheels, spaced rearwardly from the front wheels; and
further comprising
an occupant compartment including
a driver's seat and a passenger seat in side-by-side relation; and characterized in that
a portion of the regenerative drive train overlies the flywheel means and extends between the vertical outline of the driver's seat the passenger seat;
the flywheel means comprise
a pair of flywheels counter rotatable about a vertical axis, and
a containment device defining a chamber in which said flywheels are disposed; and
wherein said regenerative drive train includes
a central flywheel shaft to which the lower flywheel is attached,
a tubular flywheel shaft
disposed concentrically of the central shaft,
supported from the containment device, and
to which the upper flywheel is attached,
an input/output shaft for transmitting power to and from the flywheels, and
gear means for transmitting rotation between the flywheel shafts and the input/output shaft.

80. A self propelled vehicle as in claim 71 wherein
the flywheel means comprise
a pair of flywheels counter rotatable about a vertical axis, and
further comprising
a containment device defining a chamber in which said flywheels are disposed; and
further wherein said regenerative drive train includes
a central flywheel shaft to which the lower flywheel is attached,
a tubular flywheel shaft to which the upper flywheel is attached,
said tubular flywheel shaft being rotatably mounted on and supported from the containment device,
said central flywheel shaft being disposed within said tubular shaft, rotatably mounted thereon and supported therefrom,
an input/output shaft for transmitting power to and from the flywheels, and
gear means for transmitting rotation between the flywheel shafts and the input/output shaft.

81. A self propelled vehicle as in claim 71, further comprising
friction braking means for decelerating the vehicle; and
a brake pedal; and
wherein
the regenerative braking system includes
means, responsive to displacement of the brake pedal from a rest position, for connecting said regenerative drive train to the wheel means, thereby invoking flywheel braking as vehicle kinetic energy is transformed into rotational kinetic energy in the flywheel means;
means for sensing overspeed operation of the flywheel means; and
means, responsive to the sensing of overspeed operation, for preventing transfer of further energy to the flywheel means, and
invoking friction braking as the means of vehicle deceleration in response to displacement of the brake pedal.

82. A self propelled vehicle as in claim 71 further comprising
friction braking means for deceleration of the vehicle;
a brake pedal;
means, responsive to displacement of the brake pedal through an initial range of movement from a rest position, for connecting the regenerative drive train to wheel means,
thereby invoking flywheel braking as vehicle kinetic energy is transformed into rotational kinetic energy in the flywheel; and means, responsive to displacement of the brake pedal to a position beyond the initial range of movement, for invoking operation of the friction braking means.

83. A self propelled vehicle as in claim 71, wherein
the electric current source comprises battery means for energizing the motor means; and
said regenerative braking system further includes,
alternator means for generating electricity to be used in recharging the battery means, and
means for providing alternator braking, including
means for effecting a drive connection from the wheel means to the alternator means so that vehicle kinetic energy is transformed into electrical energy in effecting deceleration of the vehicle; and
the vehicle further includes
friction braking means for deceleration of the vehicle; and
means for selectively invoking
a. alternator braking,
b. flywheel braking, and
c. the friction braking,
thereby providing a full range of braking capability, while maximizing the amount of energy that can be recaptured for operation of the car.

84. A self propelled vehicle as in claim 83, further comprising
a brake pedal, and wherein
said means for selectively invoking include
means, responsive to displacement of the brake pedal through a given range of movement for invoking flywheel braking and alternator braking, and
means responsive to displacement of the brake pedal beyond said given range of movement for invoking friction braking.

85. A self propelled vehicle as in claim 71, further including
a power demand pedal;
means, responsive to displacement of the demand pedal, for providing a power demand signal, which signal is proportionate to the extent to which the demand pedal is displaced;
means, operative in response to said power demand signal, for connecting said regenerative drive train to said wheel means in its energy recovery mode thereby employing flywheel energy as motive power for the vehicle; and
means, operative in response to said power demand signal, for powering the vehicle from the electric motor means, when the kinetic energy of the flywheel is insufficient to provide the power input established by the power demand signal,
whereby battery charge/discharge cycles are minimized as regenerative braking is first invoked as a transfer of kinetic energy to the flywheel and then that kinetic energy is recaptured in providing motive power for the vehicle.

86. A self propelled vehicle as in claim 85, further comprising
means, operative
(a) in the absence of displacement of the power demand pedal and
(b) when the flywheel speed exceeds a predetermined intermediate value, for transforming flywheel energy into chemical energy through recharging the battery means,
whereby the flywheel speed may be maintained at a value providing both an energy reserve for powering the vehicle and a reservoir for receiving energy to provide a braking function.

87. A self propelled vehicle as in claim 71 wherein
the electrical energy source comprises battery means for energizing the motor means, and
further including
a control system having an off state and an on state;
means driven from the flywheel means for recharging the battery means; and
means for actuating said battery recharging means in response to the control system being switched from its on state to its off state when there is rotational energy in said flywheel.

88. A self propelled vehicle as in claim 71, wherein
the electric current source comprises battery means for energizing the motor means;
the regenerative drive train is disconnectable from said wheel means; and
the regenerative braking system includes
means for recharging the battery means, said recharging means including
an alternator driven from the regenerative drive train,
further characterized
by means, for powering said alternator from the flywheel means, when the drive train is disconnected from the wheel means, to thereby recapture braking energy as chemical energy.

89. A self propelled vehicle as in claim 88 further characterized by
a variable ratio transmission in said regenerative drive train;
means for connecting the regenerative drive train to the wheel means, comprising
a clutch disposed between the transmission and the front wheels,
said clutch, when engaged, connecting the drive train to the wheel means,
said clutch, when disengaged, disconnecting the drive train from the wheel means; and
means, disposed between the transmission and the clutch, for driving the alternator.

90. A self propelled vehicle as in claim 89, further comprising
a second clutch disposed between the means for driving the alternator and the variable ratio transmission; and
means for selectively engaging and disengaging the first mentioned clutch and said second clutch,
whereby flywheel energy may drive the alternator to recover energy stored in the flywheel means or the alternator may be driven from the front wheels to decelerate the vehicle, or flywheel energy may be used to drive the wheel means.

91. A self propelled vehicle as in claim 90 wherein
the alternator has a rotor which is rotated to generate electricity, and
further characterized in that
the rotor of the alternator is incorporated in and forms a portion of the regenerative drive train, and
the means for actuating the alternator to generate electricity include field excitation means and means for generating a field excitation signal.

92. A self propelled vehicle as in claim 88, further characterized in that
the alternator is driven in response to rotation of said flywheel means.

93. A self propelled vehicle as in claim 92, wherein
the alternator has a stator and rotor, and
further characterized by means for drivingly engaging the alternator rotor with the flywheel means.

94. A self propelled vehicle as in claim 92, wherein
the alternator comprises a field component and a magnet component,
further characterized in that
the magnet component is mounted on the flywheel means and rotates therewith
and the field component is mounted in relatively fixed relation with respect to the magnet component and in electromagnetic reaction relation therewith.

95. A self propelled vehicle as in claim 94, wherein the flywheel means further comprises
a containment device defining a chamber in which the flywheel means are mounted, and
further wherein
the field component of the alternator is mounted on the containment device.

96. A self propelled vehicle as in claim 71, wherein
the electric current source comprises
battery means; and further including
an electrodynamic device having
an alternator mode, and
a motor mode; and
means for recharging said battery means, wherein
the motor drive train includes
means for utilizing the electrodynamic device, when it is in its motor mode, as
the motor means for powering the vehicle; and
the recharging means include
means for driving the electrodynamic device through the motor drive train,
when it is in its alternator mode, from the wheel means, to thereby provide alternator braking as an additional form of regenerative braking.

97. A self propelled vehicle as in claim 96, wherein
the regenerative system further comprises
a secondary alternator; and
means for
selectively driving the secondary alternator from the flywheel means, and
recharging the battery means from current generated by the secondary alternator.

98. A self propelled vehicle as in claim 96,
said wheel means comprise
a pair of front wheels and
a pair of rear wheels; and
further including
a differential gear set including means for driving one pair of said pair of wheels;
a mechanical integrator having
a bidirectional drive connection with said differential,
a bidirectional drive connection with said electrodynamic device, and
a bidirectional drive connection with the regenerative drive train; and
means for selectively actuating said mechanical integrator in
(a) a motor powered mode in which the electrodynamic device is in its motor mode and power is transmitted to the differential gear set to power operation of the vehicle,
(b) a flywheel power delivery mode in which kinetic energy from the flywheel means is transmitted to the differential gear set to power operation of the vehicle,
(c) a flywheel braking mode in which vehicle energy from the differential powers the regenerative drive train,
(d) an alternator braking mode in which vehicle energy from the differential powers the electromagnetic device when it is in its alternator mode.

99. A self propelled vehicle as in claim 98 further comprising
means for selectively actuating said mechanical integrator in a hybrid delivery mode in which
the electrodynamic device is in its motor mode and power is transmitted to the differential gear set, and
kinetic energy from the flywheel means is also transmitted to the differential gear set,
to power operation of the vehicle.

100. A self propelled vehicle as in claim 98, further comprising
means for actuating said mechanical integrator in a battery recharging mode in which
flywheel energy is transmitted to the electrodynamic device, when it is in its alternator mode, to thereby recharge the battery means.

101. A self propelled vehicle as in claim 98, further comprising
friction braking means,
a brake pedal, and
means responsive to initial displacement of the brake pedal for
(a) invoking the flywheel braking mode,
(b) invoking alternator braking mode, when a substantial quantum of energy has been transferred to the flywheel means, including means for selectively actuating said mechanical integrator in a dual braking mode wherein vehicle energy from the differential powers the electromagnetic device when it is in its alternator mode and also powers the flywheel means;
means for disengaging the regenerative drive connection with said mechanical integrator to thereby prevent further transfer of kinetic energy to the flywheel means when the flywheel means has reached a maximum safe operating speed; and
means responsive to additional movement of said pedal for actuating the friction braking means.

102. A self propelled vehicle as in claim 101, further comprising
a power demand pedal, and
means, responsive to displacement of the power demand pedal, for selectively actuating said mechanical integrator in
(a) its flywheel power delivery mode when there is substantial kinetic energy in the flywheel means, and
(b) also in its motor powered mode when flywheel energy is insufficient to meet a power demand established by displacement of the power demand pedal.

103. A self propelled vehicle as in claim 96, wherein
said wheel means comprise
a pair of front wheels and
a pair of rear wheels; and
further including
a differential gear set including means for driving one pair of said pair of wheels;
the means for utilizing the electrodynamic device as the motor means includes means for providing a power input from the electrodynamic device to the differential and the means for driving the electrodynamic device from the wheel means includes means for driving the electrodynamic device from the differential.

104. A self propelled vehicle as in claim 71, wherein
the electric current source comprises an array of batteries and an array of fuel cells.

105. A self propelled vehicle as in claim 104, wherein
the battery array is carried by the flywheel means so that the mass of the flywheel means includes the mass of the battery array; and
further comprising
a power demand pedal; and
means responsive to displacement of the power demand pedal for
(a) energizing said motor means from said fuel cell array,
(b) actuating said energy recovery mode, and
(c) also energizing the motor means from the battery array to provide additional energy for acceleration of the vehicle.

106. A self propelled vehicle comprising
wheel means for supporting the vehicle for movement along a surface,
said wheel means comprising
a pair of front wheels, and
a pair of rear wheels;
a differential gear set including output shafts for driving one pair of said pair of wheels;
electric motor means for powering motive operation of the vehicle;
an electric current source for energizing the motor means;
a motor drive train for providing, when actuated, a drive input from said motor means to said differential gear set to thereby power movement of the vehicle; and
a regenerative braking system for recapturing energy that would otherwise be lost in decelerating the vehicle;
said regenerative system including,
flywheel means comprising a flywheel rotatable independently of the motor means for storage of kinetic energy, and
a regenerative drive train, connectable to said differential to selectively provide
(a) a flywheel braking mode in which power is transmitted from the wheel means to the flywheel means to thereby transfer kinetic energy of forward motion into stored kinetic energy in the flywheel means, and
(b) an energy recovery mode in which power is transmitted from the flywheel means to the wheel means to thereby transfer kinetic energy from the flywheel means to provide motive energy for vehicle movement; and
further wherein
the electric current source is carried by the flywheel means so that the mass of the flywheel means includes the mass of the electric current source.

107. A self propelled vehicle as in claim 106, wherein
the electric current source comprises
battery means; and
further including
an electrodynamic device having
an alternator mode, and
a motor mode;
means for powering operation of the vehicle including
means for actuating the motor drive train when the electrodynamic device in its motor mode; and
means for recharging said battery means, including
means for driving the electrodynamic device, when it is in its alternator mode, from the differential to thereby provide alternator braking as an additional form of regenerative braking.

108. A self propelled vehicle as in claim 107, further comprising
a secondary alternator, and
flywheel powered means for driving said secondary alternator and recharging said battery means.

109. A self propelled vehicle as in claim 108, further comprising
an ignition system having
an on position in which signals are generated to control operation of the vehicle, and
an off position in which the vehicle is out of service; and
means, responsive to the ignition system being switched from its on position to its off position, for actuating the flywheel powered recharging means.

110. A self propelled vehicle as in claim 107, further comprising
a mechanical integrator, and
wherein
the motor drive train includes means for transmitting power from the electrodynamic device to the differential;
the means for driving the wheel means includes means for transmitting power from the differential to the electrodynamic device; and
the regenerative drive train includes means for transmitting power between the differential and the flywheel means, through the mechanical integrator.

111. A self propelled vehicle as in claim 110, further comprising
a secondary alternator, and
flywheel powered means for driving said secondary alternator and recharging said battery means,
said flywheel powered means including means for transmitting power from the flywheel means through the mechanical integrator when the electrodynamic device is in its alternator mode.

112. A self propelled vehicle as in claim 107, further wherein
the electric current source further comprises an array of fuel cells;
the battery means are carried by the flywheel means so that the mass of the flywheel means includes the mass of the battery means; and
further comprising
a power demand pedal,
means responsive to displacement of the power demand pedal for
(a) energizing said motor means from said fuel cell array,
(b) actuating said energy recovery mode, and
(c) energizing the motor means from the battery array to provide additional energy for acceleration of the vehicle.

113. A self propelled vehicle as in claim 112
at least a portion of the fuel cell array is mounted on the flywheel means; and
further comprising
a source of gaseous hydrogen remote from the flywheel means;
passageway means extending from hydrogen source to the fuel cell array which is mounted on the flywheel means; and means for discharging from the flywheel means, water which results from the generation of electricity by the fuel cell array.

114. A self propelled vehicle as in claim 106 wherein
the electric current source comprises battery means for energizing the motor means; and
further comprising
a secondary alternator;
flywheel powered means for driving said secondary alternator and recharging said battery means; and
an ignition system having
an on position in which signals are generated to control operation of the vehicle, and
an off position in which the vehicle is out of service; and
means, responsive to the ignition system being switched from its on position to its off position, for actuating the flywheel powered means for driving the secondary alternator.

115. A self propelled vehicle comprising
wheel means for supporting the vehicle for movement along a surface;
electric motor means for powering motive operation of the vehicle;
an electric current source for energizing the motor means;
a motor drive train for providing, when actuated, a drive input from said motor means to the wheel means to thereby power movement of the vehicle; and
a regenerative braking system which recaptures energy that would otherwise be lost in decelerating the vehicle; said regenerative system including
flywheel means for storing kinetic energy, and
a regenerative drive train, connectable to the wheel means, to provide
(a) a braking mode in which power is transmitted from the wheel means to the flywheel means to thereby transfer kinetic energy of forward motion into stored kinetic energy in the rotating flywheel means, or
(b) an energy recovery mode in which power is transmitted from the flywheel means to the front wheels to thereby transfer kinetic energy from the flywheel means to provide motive energy of vehicle movement; and
further wherein
the electric current source comprises
an array of batteries, and
an array of fuel cells, and
the battery array is carried by the flywheel means so that the mass of the flywheel means includes the mass of the battery array; and
further comprising
a power demand pedal; and
means responsive to displacement of the power demand pedal for
(a) energizing said motor means from said fuel cell array,
(b) connecting the regenerative drive train to the wheel means in said energy recovery mode to thereby employ rotational kinetic energy of the flywheel to power motive operation of the vehicle, and
(c) energizing the motor means from the battery array to provide additional energy for acceleration of the vehicle.

116. A self propelled vehicle as in claim 115 further comprising
means for generating a differential signal indicating the magnitude of the difference between the actual speed of the vehicle and the magnitude of desired speed, as reflected by the extent of displacement of said demand pedal, and
means responsive to said differential signal for energizing said motor means from said battery array.

117. A self propelled vehicle as in claim 115, further comprising
means for recharging the batteries by employing electricity from the fuel cell array.

118. A self propelled vehicle as in claim 117, wherein
the regenerative braking system further comprises
an alternator, selectively driven from the wheel means, for recharging the batteries to provide an additional deceleration force as braking energy, and further wherein
the recharging means includes means for limiting the extent of battery recharging thereby to less than a fully charged state,
whereby alternator braking can be effective in transforming kinetic energy into chemical energy.

119. A self propelled vehicle as in claim 115 wherein
the flywheel means comprise
a pair of flywheels, and
the battery and fuel cell arrays are mounted on said flywheels.

120. A self propelled vehicle as in claim 119 wherein
said pair of flywheels are counter-rotatable about a vertical axis, and
wherein said regenerative drive train includes
a central flywheel shaft to which the lower flywheel is attached,
a tubular flywheel shaft to which the upper flywheel is attached,
an input/output shaft for transmitting power to and from the flywheels, and
gear means for transmitting rotation between the flywheel shafts and the input/output shaft; and
further comprising
a source of gaseous hydrogen remote from the flywheel means;
a hydrogen passageway, extending from the hydrogen source, axially downward through said central shaft, to the fuel cell array; and
a discharge passageway, extending from said fuel cell array, downward through said central shaft, for discharging water which results from the generation of electricity by the fuel cell array.

121. A self propelled vehicle as in claim 115, wherein
the flywheel means comprise a rotatable flywheel; and
at least a portion of the fuel cell array is mounted on the flywheel; and
further comprising
a source of gaseous hydrogen remote from the flywheel
a hydrogen passageway extending from the hydrogen source to the fuel cell array which is mounted on the flywheel; and
means for discharging water, which results from the generation of electricity by the fuel cell array, from the flywheel.

122. A self propelled vehicle as in claim 121 further comprising
a containment device in which the flywheel is disposed, and
wherein
the means for discharging water comprise
a circumferential gutter formed on the flywheel, a passageway leading from the fuel cell array to the gutter, and vacuum means for extracting water from said gutter and directing it outwardly of said containment device.

123. A self propelled vehicle comprising wheel means for supporting the vehicle for movement along a surface;

electric motor means for powering motive operation of the vehicle;

an electric current source for energizing the motor means;

a motor drive train for providing, when actuated, a drive input from said motor means to the wheel means to thereby power movement of the vehicle; and flywheel means for the storage of kinetic energy, including a rotatable flywheel;

wherein the electric current source comprises an array of fuel cells energizing the motor for steady state operation, and an array of batteries providing additional motor energy during increased operative loading; and characterized in that the fuel cell array is mounted on the flywheel; and further comprising means for recharging the batteries by employing electricity from the fuel cell array; and further characterized by a source of gaseous hydrogen remote from the flywheel means;

a hydrogen passageway extending from said hydrogen source to the fuel cell array which is mounted on the flywheel; and means for discharging water, which results from the generation of electricity by the fuel cell array, from the flywheel means.

124. A self propelled vehicle as in claim 123, further comprising a regenerative braking system which includes an alternator, selectively driven from the wheel means, to invoke alternator braking and recharge the battery array, and further wherein the recharging means includes means for limiting the extent of battery recharging thereby to less than a fully charged state, whereby alternator braking can be effective in transforming kinetic energy into chemical energy.

125. A self propelled vehicle as in claim 123 wherein the flywheel means comprise a pair of flywheels, and the battery and fuel cell arrays are mounted on said flywheels.

126. A self propelled vehicle as in claim 125 further comprising a regenerative braking system which recaptures energy that would otherwise be lost in decelerating the vehicle; and wherein said pair of flywheels comprise a portion of a regenerative braking system, and further wherein said pair of flywheels are counter-rotatable about a vertical axis, and said regenerative braking system also includes a central flywheel shaft to which the lower flywheel is attached, a tubular flywheel shaft to which the upper flywheel is attached, an input/output shaft for transmitting power to and from the flywheels, and gear means for transmitting rotation between the flywheel shafts and the input/output shaft; and also wherein said hydrogen passageway includes a passageway extending axially downward through said central shaft, to the fuel cell array; and the means for discharging water includes a passageway extending from said fuel cell array downward through said central shaft.

127. A self propelled vehicle as in claim 126 further wherein the means for discharging water further include a circumferential gutter formed peripherally of the lower surface of the flywheel on which the fuel cell array is mounted, a passageway leading from the fuel cell array to the gutter, and vacuum means for extracting water from said gutter and directing it outwardly of said containment device, while also reducing the pressure within the containment device to also reduce windage losses.

128. A self propelled vehicle as in claim 123, further wherein the flywheel means comprise a containment device in which the flywheel is disposed; and the means for discharging water from the flywheel means includes vacuum means for facilitating the discharge of water outwardly of said containment device and simultaneously reducing the pressure within said containment device to thereby minimize windage losses.

129. A self propelled vehicle as in claim 128, wherein the means for discharging water further comprise a circumferential gutter formed peripherally of a lower surface of the flywheel, passageway means leading from the fuel cell array to the gutter, and the vacuum means extracts water from said gutter.

130. A self propelled vehicle comprising wheel means for supporting the vehicle for movement along a surface;

electric motor means for powering motive operation of the vehicle;

battery means for energizing said motor means;

a regenerative braking system, which recaptures energy that would otherwise be lost in decelerating the vehicle;

said regenerative system including, flywheel means, comprising a flywheel rotatable independently of the motor means, for storing kinetic energy, a regenerative drive train, connectable to the wheel means, to selectively provide a flywheel braking mode in which power is transmitted from the wheel means to the flywheel means to thereby transfer kinetic energy of forward motion into stored kinetic energy in the rotating flywheel means; and means for returning stored flywheel energy as kinetic motive power for the vehicle;

wherein at least a substantial portion of the battery means is carried by the rotatable flywheel means so that the mass of the flywheel means includes at least a substantial portion of the mass of the battery means; and further comprising
  means, powered from the flywheel means, for recharging the battery means;
  a control system having
    an on state in which motive control signals are generated to control motive operation of the vehicle, and
    an off state in which the vehicle is out of service; and
  means, responsive to the control system being switched from its on state to its off state, for
    terminating the generation of motive control signals, and
    effecting a drive connection between the flywheel means and the battery recharging means.

131. A self propelled vehicle as in claim 130 further comprising
  means for generating a speed signal proportionate to rotational speed of the flywheel means; and
  means responsive to said speed signal indicating a usable quantum of flywheel energy for maintaining the drive connection between the flywheel means and the battery recharging means.

132. A self propelled vehicle as in claim 131 wherein the means for recharging the battery comprise
  a separate alternator responsive only to the control system being switched from its on state to its off state.

133. A self propelled vehicle as in claim 130 wherein the means for recharging the battery means comprise
  means for providing a low trickle rate of charge.

* * * * *